(12) United States Patent
Sugiyama et al.

(10) Patent No.: US 8,639,404 B2
(45) Date of Patent: Jan. 28, 2014

(54) WORKING MACHINE

(75) Inventors: Yuta Sugiyama, Yokosuka (JP); Hideaki Yuasa, Yokosuka (JP); Kiminori Sano, Chiba (JP)

(73) Assignees: Sumitom Heavy Industries, Ltd., Tokyo (JP); Sumitomo (S.H.I.) Construction Machinery Co., Ltd., Tokyo (JP)

( * ) Notice: Subject to any disclaimer, the term of this patent is extended or adjusted under 35 U.S.C. 154(b) by 282 days.

(21) Appl. No.: 13/129,623

(22) PCT Filed: Nov. 17, 2009

(86) PCT No.: PCT/JP2009/069485
§ 371 (c)(1),
(2), (4) Date: Jun. 15, 2011

(87) PCT Pub. No.: WO2010/058768
PCT Pub. Date: May 27, 2010

(65) Prior Publication Data
US 2012/0130576 A1    May 24, 2012

(30) Foreign Application Priority Data

| | | |
|---|---|---|
| Nov. 18, 2008 | (JP) | P2008-294664 |
| Nov. 18, 2008 | (JP) | P2008-294669 |
| Nov. 19, 2008 | (JP) | P2008-295836 |
| Jan. 14, 2009 | (JP) | P2009-005940 |
| Mar. 5, 2009 | (JP) | P2009-052297 |
| Mar. 19, 2009 | (JP) | P2009-068010 |
| Mar. 19, 2009 | (JP) | P2009-068016 |
| Mar. 23, 2009 | (JP) | P2009-070091 |

(51) Int. Cl.
*B66F 9/24* (2006.01)
*B60W 20/00* (2006.01)

(52) U.S. Cl.
USPC ............................................. 701/22; 701/50

(58) Field of Classification Search
None
See application file for complete search history.

(56) References Cited

U.S. PATENT DOCUMENTS

| | | | | |
|---|---|---|---|---|
| 6,496,393 | B1 * | 12/2002 | Patwardhan | 363/70 |
| 7,911,079 | B2 * | 3/2011 | Hoff et al. | 307/10.1 |
| 2007/0103002 | A1 * | 5/2007 | Chiao et al. | 307/10.1 |

FOREIGN PATENT DOCUMENTS

| | | |
|---|---|---|
| JP | S60223792 A | 11/1985 |
| JP | 3-222602 | 10/1991 |

(Continued)

OTHER PUBLICATIONS

Japanese OA, Application No. 2008-294664, Dated Nov. 20, 2012.

(Continued)

*Primary Examiner* — Michael J Zanelli
(74) *Attorney, Agent, or Firm* — Squire Sanders (US) LLP

(57) ABSTRACT

Provided is a working machine capable of decreasing a voltage of a DC busbar (DC bus) with a configuration suppressing a degradation in reliability. A hybrid type construction machine as a working machine includes: a DC bus which is connected to a rotation motor via an inverter circuit, a battery which is connected to the DC bus via a step-up/step-down converter and a switch, a controller which drives the inverter circuit and the step-up/step-down converter, a cooling liquid circulating system which includes a pump motor, and an inverter circuit which is connected to the DC bus and driving the pump motor. The controller includes a mode used for decreasing the voltage of the DC bus, and in that mode, the switch enters a disconnection state and the inverter circuit is operated to consume electricity in the pump motor.

25 Claims, 49 Drawing Sheets

(56) References Cited

FOREIGN PATENT DOCUMENTS

| | | |
|---|---|---|
| JP | 5-68331 | 3/1993 |
| JP | 06024279 A | 2/1994 |
| JP | 8126346 A | 5/1996 |
| JP | H8-168103 A | 6/1996 |
| JP | 09215340 A | 8/1997 |
| JP | 9-233830 | 9/1997 |
| JP | 09-266601 A | 10/1997 |
| JP | 10-164709 | 6/1998 |
| JP | 10-224902 | 8/1998 |
| JP | 2001023700 A | 1/2001 |
| JP | 2002330554 A | 11/2002 |
| JP | 2004-106619 | 4/2004 |
| JP | 2004168149 A | 6/2004 |
| JP | 2004-222361 | 8/2004 |
| JP | 2005-73399 | 3/2005 |
| JP | 2005-229689 | 8/2005 |
| JP | 2005297714 A | 10/2005 |
| JP | 2005299102 A | 10/2005 |
| JP | 2005304206 A | 10/2005 |
| JP | 2005-335695 | 12/2005 |
| JP | 2005344524 A | 12/2005 |
| JP | 2006021749 A | 1/2006 |
| JP | 2007050887 A | 3/2007 |
| JP | 2007155586 A | 6/2007 |
| JP | 2007220976 A | 8/2007 |
| JP | 2008-72818 A | 3/2008 |
| JP | 2008062853 A | 3/2008 |
| JP | 2008-169613 | 7/2008 |
| JP | 2008187047 A | 8/2008 |
| JP | 2008206243 A | 9/2008 |
| JP | 2008211964 A | 9/2008 |
| JP | 2008239079 A | 10/2008 |
| JP | 2008-273381 A | 11/2008 |
| JP | 2008-306795 | 12/2008 |
| JP | 2009035126 A | 2/2009 |
| JP | 2009154757 A | 7/2009 |
| JP | 2010013058 A | 1/2010 |
| WO | 2008015798 A1 | 2/2008 |
| WO | WO2008/111649 A1 * | 9/2008 |
| WO | 2008/120682 | 10/2008 |
| WO | WO2008/120682 A1 * | 10/2008 |

OTHER PUBLICATIONS

Japanese OA, Application No. 2009-281812, Dated Nov. 20, 2012.
JP Office Action for JP Application No. 2008-294669, dated Jan. 8, 2013.
Japanese Office Action application No. P2009-052297 dated Mar. 21, 2012.
International Search Report, PCT/JP2009/069485, Japanese Patent Office, Feb. 23, 2010, a total of 2 pages.
International Search Report application No. PCT/JP2009/069485 dated Jun. 30, 2011.
Japanese Office Action, Application No. P2009-052297, Dated May 30, 2012.
Japanese Office Action Dated Sep. 11, 2012 for Corresponding Japanese Application No. 2008-294664.
Notice of Allowance dated Jul. 2, 2013 in corresponding JP Patent Application No. P2009-068010.
Japanese Office Action application No. P2009-070091 dated May 14, 2013.
JP Office Action for JP Application No. 2008-295836, dated Apr. 23, 2013.

* cited by examiner

Fig.19
(a)
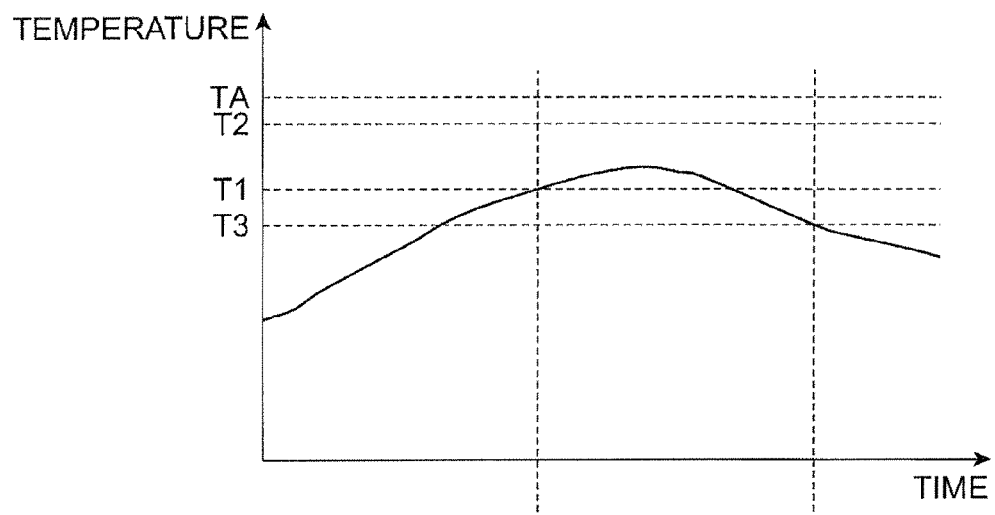
(b)
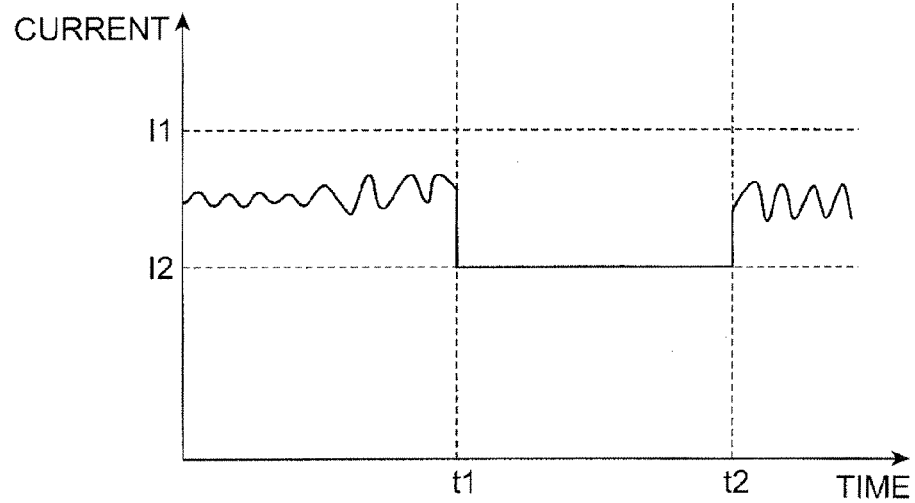

Fig.20
(a)
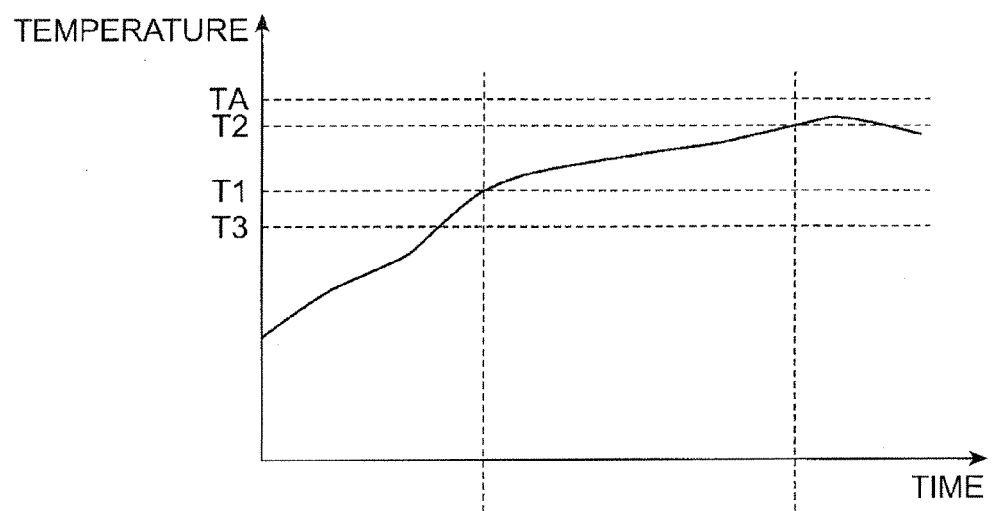
(b)
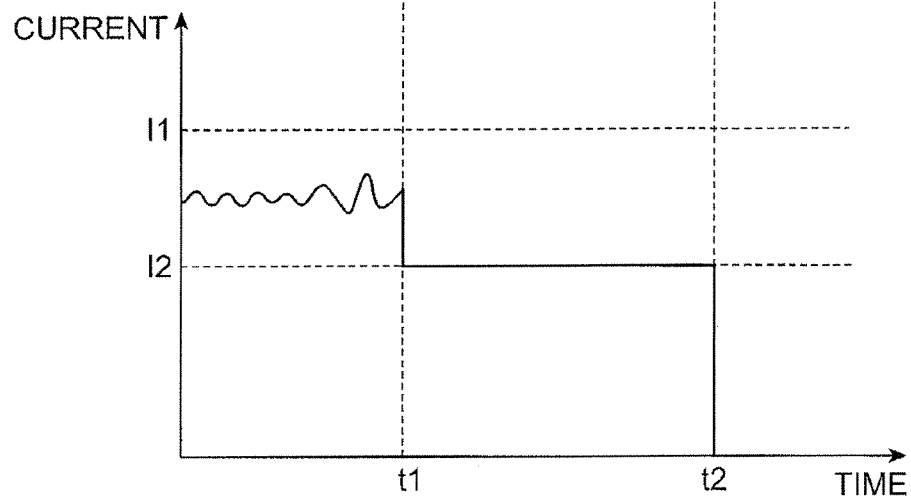

Fig.34
(a)
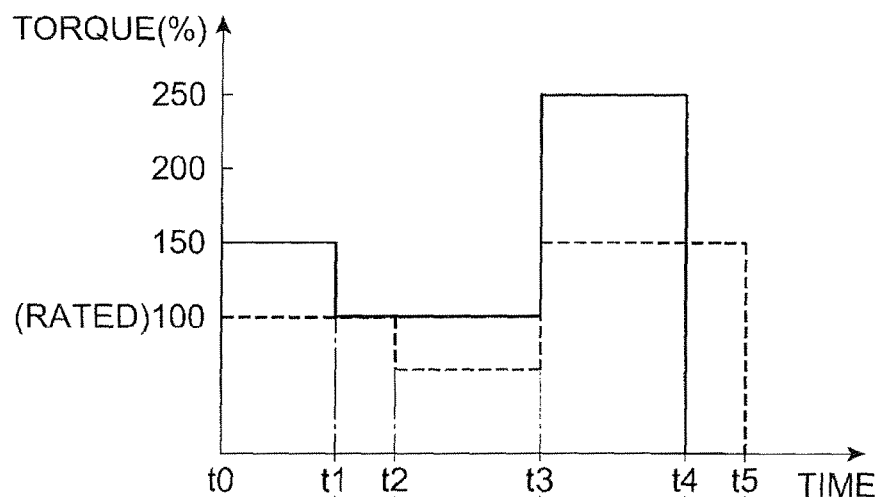
(b)
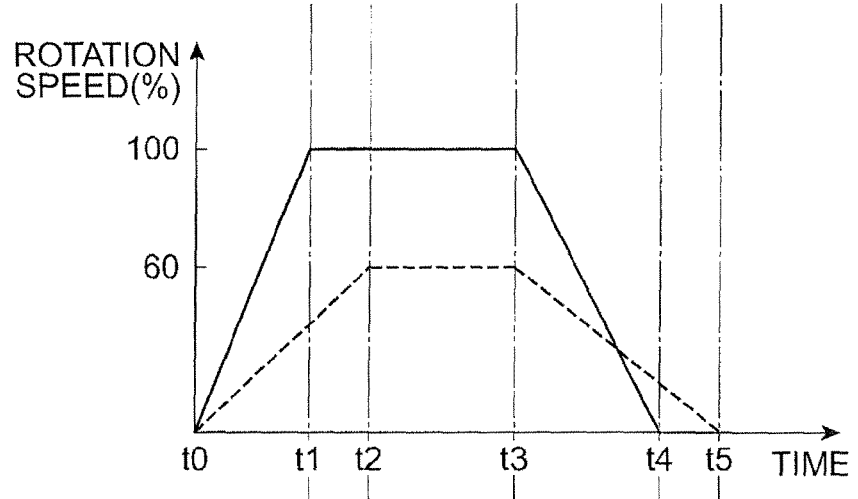
(c)
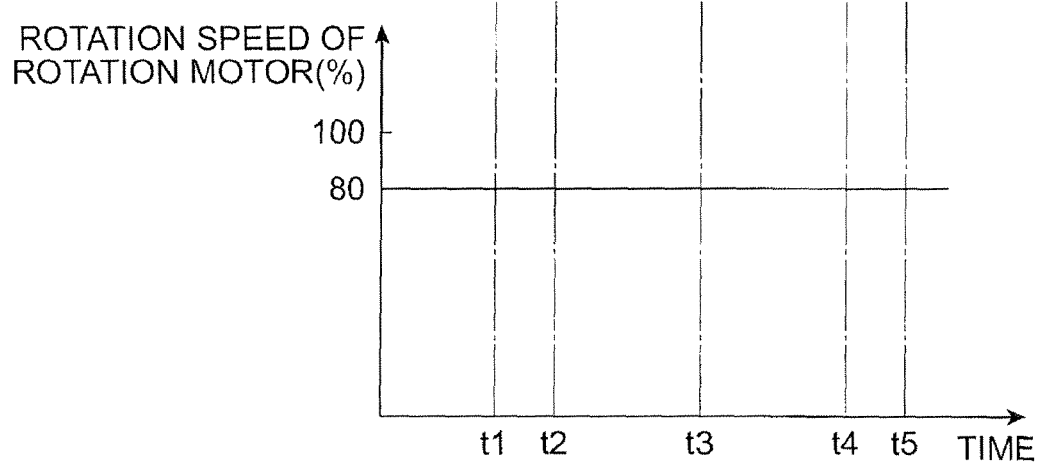

WORKING MACHINE

TECHNICAL FIELD

The present invention relates to a working machine.

BACKGROUND ART

Hitherto, a working machine in which a part of a driving mechanism is designed to be electrically operated has been proposed. Such a working machine includes a hydraulic pump which hydraulically drives movable portions, for example, a boom, an arm, and a bucket, and an AC motor (an electrical generator) is connected to an internal combustion engine (an engine) driving the hydraulic pump to assist a driving force of the engine and to return electricity obtained by the generation of electricity to a DC bus (a DC busbar) via an inverter.

Furthermore, the working machine includes, for example, king component such as an upper rotation body of a construction machine in many cases. In such a case, the working machine includes a working motor assisting the hydraulic motor in addition to the hydraulic motor driving the working component. For example, when the upper rotation body is rotated, the driving of the hydraulic motor is assisted by the AC motor while the rotation is accelerated, a regenerative operation is performed in the AC motor while the rotation is decelerated, and the generated electricity is returned to the DC bus via the inverter.

A storage battery (a battery) is connected to the DC bus via a converter, and the battery is charged by the electricity generated by the AC motor. Alternatively, the electricity is received and transmitted between the DC bus and the AC motor connected thereto.

In the working machine, the voltage of the DC bus is set to be as high as, for example, several hundred volts in order to drive a large working component, but it is desirable to decrease the voltage of the DC bus for the operator's safety during the maintenance thereof. For example, in the device disclosed in PTL 1, the voltage of the DC bus is consumed by resistance in a manner such that a resistor and a switch are connected in series to each other between the positive and negative interconnections of the DC bus.

CITATION LIST

Patent Literature

[PTL 1] JP-A-2005-335695

SUMMARY OF INVENTION

Technical Problem

In the method of consuming the voltage of the DC bus by using resistance, it is necessary to insert the switch to be connected in series to the resistor as disclosed in PTL 1 in order to consume the voltage of the DC bus in accordance with necessity. However, as described above, the voltage of the DC bus is as high as several hundred volts, and a mechanical switch such as a relay is adopted as the switch used for that purpose in many cases. A mechanical switch has the disadvantages of low reliability and short life span, and these disadvantages affect the reliability of the working machine.

An object of the invention is to provide a working machine capable of decreasing the voltage of a DC busbar (DC bus) with a configuration suppressing a degradation in reliability.

Solution to Problem

In order to solve the above-described problem, provided is a working machine including: a working motor which is driven by an operator's operation; a DC busbar which is connected to the working motor via a first inverter circuit; a storage battery which is connected to the DC busbar via a DC voltage converter and a switch; a control unit which controls the first inverter circuit, the DC voltage converter, and the switch; a cooling motor which drives a cooling fan and/or a cooling liquid circulating pump used for cooling at least one of the first inverter circuit, the DC voltage converter, and the control unit; and a cooling motor driving circuit which is connected between the cooling motor and the DC busbar and is controlled by the control unit to drive the cooling motor, wherein the control unit includes a busbar voltage lowering mode decreasing the voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode.

The control unit may stop the operation of the cooling motor driving circuit when the voltage of the DC busbar becomes a predetermined value or less in the busbar voltage lowering mode.

The control unit may charge the storage battery by driving the DC voltage converter before the switch enters a disconnection state when the voltage of the DC busbar is higher than that of the storage battery upon starting the busbar voltage lowering mode.

The control unit may start the busbar voltage lowering mode whenever the operation of the working machine is stopped. Alternatively, the control unit may start the busbar voltage lowering mode when there is an input from the operator while the operation of the working machine is stopped.

The working machine may further include an internal combustion engine; a first cooling liquid circulating system which includes a first heat exchanger cooling the internal combustion engine; and a second cooling liquid circulating system which includes a second heat exchanger provided separately from the first cooling liquid circulating system to cool the first inverter circuit and the DC voltage converter.

The working machine further includes an electrical generator which is connected to the internal combustion engine and generates electricity by a driving force of the internal combustion engine and a second inverter circuit of which one end is connected to the terminal of the electrical generator, wherein the second cooling liquid circulating system may further cool the electrical generator and the second inverter circuit.

The second cooling liquid circulating system includes a temperature sensor, and the control unit may restrict the output of at least one of the electrical generator and the working motor on the basis of the detection value of the temperature sensor.

The second cooling liquid circulating system may further cool the working motor.

In the second cooling liquid circulating system, after the cooling liquid is delivered from the second heat exchanger, the cooling liquid may pass the electrical generator and the working motor via the first inverter circuit, the second inverter circuit, and the DC voltage converter.

The working machine may further include a third cooling liquid circulating system including a third heat exchanger provided separately from the first and second cooling liquid circulating systems to cool the electrical generator and the working motor.

The electrical generator may assist a driving force of an internal combustion engine generator by its own driving force.

The DC voltage converter may include a reactor, and the second cooling liquid circulating system may cool the reactor.

The working machine may further include a temperature sensor which detects the temperature of the reactor.

The second cooling liquid circulating system may include a cooling pipe and a thermal conductive plate, and the reactor may be disposed on the thermal conductive plate.

The DC voltage converter includes an intelligent power module which controls a charging and discharging operation of the storage battery, and the intelligent power module may be disposed on the thermal conductive plate.

The DC voltage converter may be formed as a sealed casing, and a thermal conductive plate may be disposed on one surface of the casing.

The working machine may further include a plurality of driver units which includes an inverter unit having the first inverter circuit with an intelligent power module and a step-up/step-down converter unit having the DC voltage converter with an intelligent power module, wherein the plurality of driver units may include a second temperature sensor which is provided outside the intelligent power module to detect the temperature of the intelligent power module in addition to a first temperature sensor built in the intelligent power module, and wherein when a temperature detection result obtained by the second temperature sensor is higher than a predetermined first threshold value lower than a temperature where an overheat protection function of the intelligent power module is operated by the first temperature sensor, the control unit may decrease a maximum driving current to the working motor when the driver unit is the inverter unit and decrease a maximum discharging current from the storage battery and/or a maximum charging current to the storage battery when the driver unit is the step-up/step-down converter unit.

When the temperature detection result obtained by the second temperature sensor is lower than a temperature where the overheat protection function of the intelligent power module is operated by the first temperature sensor and is higher than the second threshold value larger than the first threshold value, the control unit may stop the operation of the inverter circuit when the unit is the inverter unit and stop the operation of the DC voltage converter when the unit is the step-up/step-down converter unit.

The plurality of units may include a thermal conductive plate having a heat radiation surface thermally coupled to the intelligent power module, and the second temperature sensor may be disposed on the heat radiation surface of the thermal conductive plate.

The thermal conductive plate may be disposed to extend along the up and down direction of the construction machine, and the second temperature sensor may be disposed above the intelligent power module inside the heat radiation surface of the thermal conductive plate.

The plurality of driver units may each include a casing accommodating the first inverter circuit or the DC voltage converter and be disposed in parallel along a predetermined direction, and the casings of the adjacent driver units may be fixed to each other by a fastening tool.

The inside of the plurality of the driver units may become a sealed space during the operation of the working machine.

The working machine may include a control unit which serves as the control unit, and the control unit may be placed on the plurality of driver units and be attached to be rotatable about a support shaft provided along the predetermined direction in one end of the plurality of driver units in the direction intersecting the predetermined direction.

The support tool may support the control unit while the control unit is opened about the support shaft with respect to the plurality of driver units.

In each casing of the plurality of driver units, the surface facing the control unit may be opened.

The working machine may further include a pedestal having a bottom plate on which the plurality of driver units is placed and side plates which have the plurality of driver units interposed therebetween in a predetermined direction, where the casing of the driver unit located at both ends of the plurality of driver units may be detachably fixed to the side plate of the pedestal by a fastening tool.

The working machine may further include a control unit which serves as the control unit, wherein the control unit may include a casing which has a sealing structure, a plurality of CPUs which is provided inside the casing and controls the DC voltage converters and the inverter circuits of the plurality of driver units, and a cooling pipe which is thermally coupled to the plurality of CPUs and cools the plurality of CPUs by introducing a cooling liquid from the outside of the casing.

The control unit may be placed on the plurality of driver units, and the cooling pipe may be disposed between the driver unit and the CPU.

The control unit may further include a thermal conductive plate provided between the CPU and the cooling pipe to be thermally coupled to the CPU and the cooling pipe.

The working machine may include the plurality of driver units, each of the plurality of CPUs may be provided to correspond to each of the plurality of driver units inside the casing, and the plurality of CPUs may be mounted on one substrate.

The cooling pipe may have a shape in which a plurality of pipe portions extending in a first direction and provided in parallel in a second direction intersecting the first direction is alternately connected to each other at one end side and the other end side thereof, the thermal conductive plate may include a plurality of cooling areas extending in the first direction and arranged in the second direction, each of the plurality of cooling areas is thermally coupled to two adjacent pipe portions among the plurality of pipe portions, and in the plurality of CPUs, one CPU may be thermally coupled to one cooling area.

The working machine may further include a thermal conductive sheet which includes an elastic material and is disposed between the CPU and the thermal conductive plate.

The working machine may further include a cooling liquid circulating system, wherein at least a part of the cooling liquid of the cooling liquid circulating system delivered from the heat exchanger may pass the control unit, the driver unit, and the AC motor in this order.

The working machine may include a casing which fixes the inverter unit and the step-up/step-down converter unit, and the input terminal of the inverter unit and the input terminal of the step-up/step-down converter unit may be connected to a DC bus formed as a busbar.

The inverter unit and the step-up/step-down converter unit each may have a rectangular external shape, and may be fixed while being arranged in the first direction. In the inverter unit and the step-up/step-down converter unit, a notch portion may be provided in the side plate adjacent to the peripheral unit, and the DC bus may be provided in the notch portion along the first direction.

The working machine may include three or more driver units having any one of the inverter unit and the step-up/step-down converter unit, and in one unit disposed between two different driver units, the DC bus may be provided to penetrate the one unit.

The DC bus may have a positive electrode and a negative electrode, and one of the positive electrode and the negative electrode may be formed to cover the other electrode.

The DC bus may be disposed in a completely sealed space.

The DC bus may not contact the frame of each of the units.

The inverter unit may include a smoothing capacitor, and the DC bus may be directly connected to the smoothing capacitor.

Preferably, the working machine may further include a cooling device which cools the first inverter circuit; and a temperature detection means which detects the temperature of a refrigerant in the cooling device, wherein the first inverter circuit may include a mechanism which stops a supply of current for driving the working motor when detecting that the temperature of the first inverter circuit becomes a predetermined operation stop temperature or higher, wherein when the temperature of the refrigerant obtained from the temperature detection means is higher than a predetermined output suppressing temperature, the control unit may compare the state with the case where the temperature of the refrigerant is the output suppressing temperature or lower and control the first inverter circuit to decrease an upper limit value of a current supplied to the working motor, and wherein the output suppressing temperature may be lower than the operation stop temperature.

The control unit may control the first inverter circuit so that the upper limit value of the current supplied to the working motor decreases by restricting the upper limit value of the torque generated by the working motor.

The working machine may further include an electrical generator connected to an internal combustion engine and a second inverter circuit controlling the driving of the electrical generator. The cooling device may cool the first and second inverter circuits. The control unit may control the first and second inverter circuits. When the temperature of the refrigerant obtained from the temperature detection means is greater than a predetermined output suppressing temperature, the control unit may control the first and second inverter circuits so that the upper limit value of the current supplied to the working motor and the electrical generator decreases by the comparison with the case where the temperature of the refrigerant is the output suppressing temperature or less.

Advantageous Effects of Invention

According to the invention, the voltage of the DC busbar (the DC bus) may be decreased with a configuration suppressing a decrease in reliability.

BRIEF DESCRIPTION OF DRAWINGS

FIG. 6 is a perspective view illustrating a connection state of each of cooling pipes 62a to 66a.

FIG. 19A is a graph illustrating an example of a temporal change in temperature of an IPM constituting the step-up/step-down converter 100 and the inverter circuits IBA, 20A, and 20B, and FIG. 19B is a graph illustrating an example of a temporal change in current flowing to the step-up/step-down converter 100 and the inverter circuits 18A, 20A, and 20B.

FIG. 20A is a graph illustrating an example of a temporal change in temperature of the IPM constituting the step-up/step-down converter 100 and the inverter circuits 18A, 20A, and 20B, and FIG. 20B is a graph illustrating an example of a temporal change in current flowing to the step-up/step-down converter 100 and the inverter circuits 18A, 20A, and 20B.

FIG. 34A is a graph illustrating a state of a torque changing in time by a driving operation, FIG. 34B is a graph illustrating a rotation speed of a rotation body 1004, and a FIG. 34C is a graph illustrating a rotation speed of a rotation motor 1021.

DESCRIPTION OF EMBODIMENTS

Figure 1:
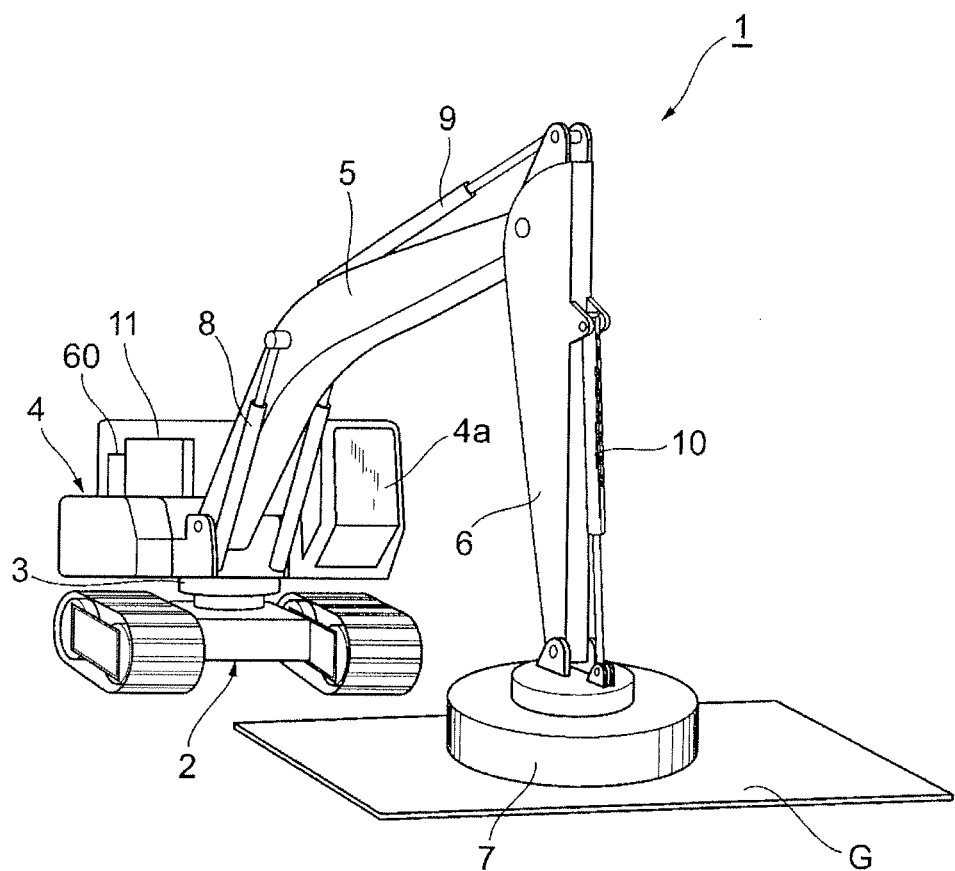
FIG. 1 is a perspective view illustrating an external shape hybrid type construction machine 1 as a first embodiment of a working machine according to the invention.

Hereinafter, embodiments of a working machine of the invention will be described in detail by referring to the accompanying drawings. Furthermore, regarding the description of the drawings, the same reference numerals will be given to the same components and the repetitive description thereof will be omitted.

First Embodiment

FIG. 1 is a perspective view illustrating an external shape of a hybrid type construction machine 1 as an example of a working machine according to the invention. As shown in FIG. 1, the hybrid type construction machine 1 is a so-called lifting magnet vehicle, and includes a running mechanism 2 which has a caterpillar track and a rotation body 4 which is rotatably mounted on the upper portion of the running mechanism 2 via a rotation mechanism 3. To the rotation body 4 is attached a boom 5, an arm 6 link-connected to the front end of the boom 5, and a lifting magnet 7 link-connected to the front end of the arm 6. The lifting magnet 7 is equipment which is used to adsorb and catch a load G such as steel by a magnetic force. The boom 5, the arm 6, and the lifting magnet 7 are hydraulically driven by, respectively, a boom cylinder 8, an arm cylinder 9, and a bucket cylinder 10. Furthermore, the rotation body 4 is provided with an operation room 4a accommodating an operator performing an operation of adjusting the position of the lifting magnet 7 or a magnetization operation and a release operation or a power source such as an engine (an internal combustion engine) 11 used for generating a hydraulic pressure. The engine 11 is configured as, for example, a diesel engine.

Furthermore, the hybrid type construction machine 1 includes a servo control unit 60. The servo control unit 60 controls an AC motor driving a working component such as the rotation mechanism 3 or the lifting magnet 7 or an electrical generator assisting the engine 11 and a charging and discharging operation of an electrical storage device (a battery, a capacitor, the like). The servo control unit 60 includes an inverter unit driving an AC motor or an electrical generator by converting DC power into AC power, a plurality of driver units such as a step-up/step-down converter unit controlling a charging and discharging of the battery, and a control unit controlling the plurality of driver units.

Figure 2:
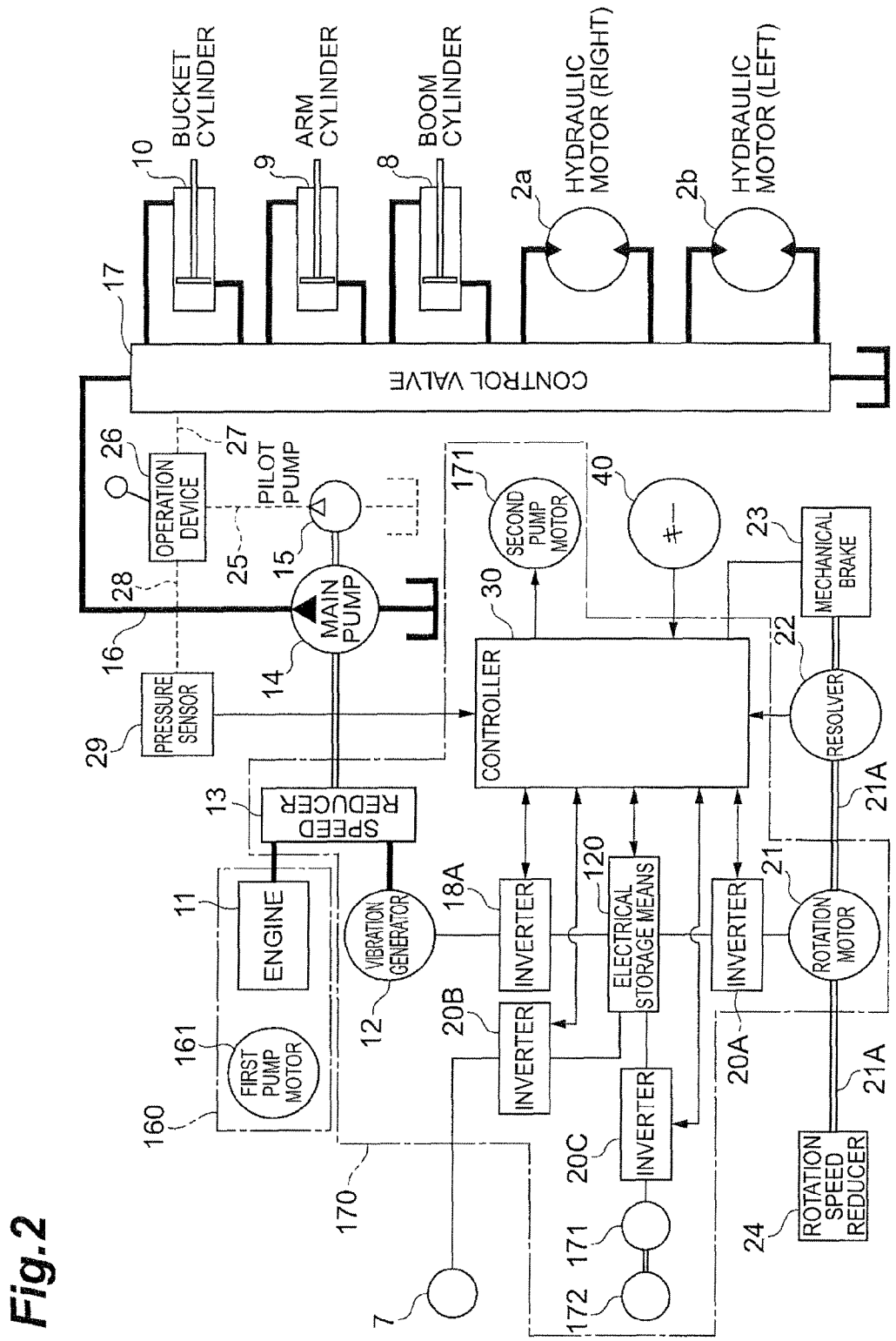
FIG. 2 is a block diagram illustrating an internal configuration such as an electrical system or a hydraulic system of the hybrid type construction machine 1 of the first embodiment.
Figure 3:
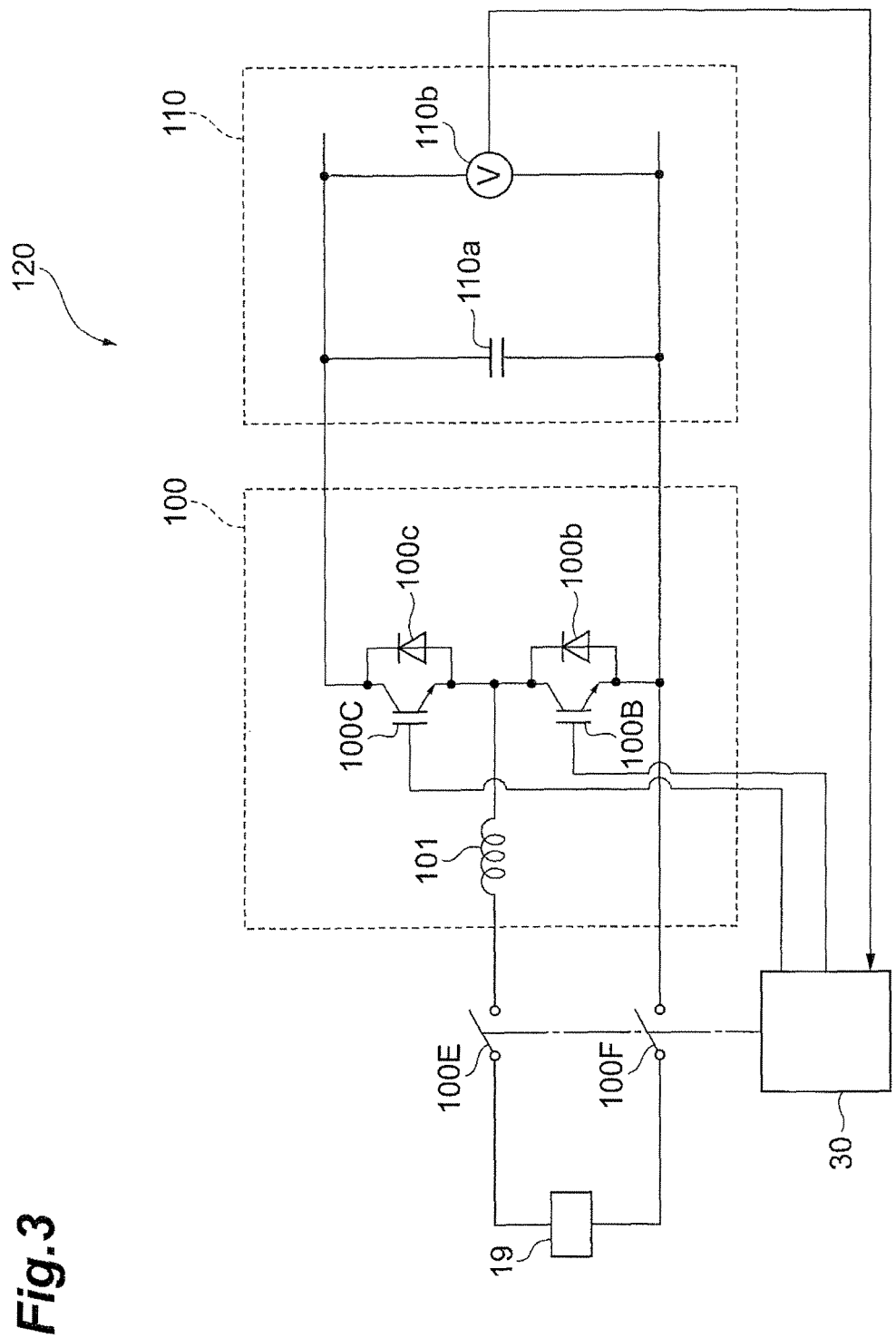
FIG. 3 is a diagram illustrating an internal configuration of an electrical storage means 120 of FIG. 2.

FIG. 2 is a block diagram illustrating an internal configuration such as an electric system or a hydraulic system of the hybrid type construction machine 1 of the embodiment. Furthermore, in FIG. 2, the system mechanically transferring power is depicted by a double line, the hydraulic system is depicted by the thick solid line, the operation system is depicted by the dashed line, and the electrical system is depicted by the thin solid line. Furthermore, FIG. 3 is a diagram illustrating an internal configuration of an electrical storage means (an electrical storage unit) 120 of FIG. 2.

As shown in FIG. 2, the hybrid type construction machine 1 includes an electrical generator (an AC motor) 12 and a speed reducer 13, and the rotary shafts of the engine 11 and the electrical generator 12 are all connected to the input shaft of the speed reducer 13, so that the rotary shafts are connected to each other. When the load of the engine 11 is large, the electrical generator 12 assists the driving force of the engine 11 by driving the engine 11 as the working component, so that the driving force of the electrical generator 12 is transferred to a main pump 14 via the output shaft of the speed reducer 13. On the other hand, when the load of the engine 11 is small, the driving force of the engine 11 is transferred to the electrical generator 12 via the speed reducer 13, so that electricity is generated by the electrical generator 12. The electrical generator 12 is configured as, for example, an IPM (Interior Permanent Magnetic) motor in which a magnet is embedded in a rotor. The driving and the generation of electricity of the electrical generator 12 are switched by a controller 30 controlling the driving of the electrical system in the hybrid type construction machine 1 in accordance with the load or the like of the engine 11.

The main pump 14 and a pilot pump 15 are connected to the output shaft of the speed reducer 13, and a control valve 17 is connected to the main pump 14 via a high pressure hydraulic line 16. The control valve 17 is a device that controls the hydraulic system of the hybrid type construction machine 1. The boom cylinder 8, the arm cylinder 9, and the bucket cylinder 10 are connected to the control valve 17 via the high pressure hydraulic line in addition to hydraulic motors 2a and 2b driving the running mechanism 2 shown in FIG. 1, and the control valve 17 controls the hydraulic pressure supplied thereto in accordance with the operation input from the operator. Here, the speed reducer 13 accelerates the rotation of the engine and transmits the accelerated rotation to the electrical generator 12. Then, the speed reducer decelerates the rotation of the electrical generator 12 and assists the rotation of the engine.

An output terminal of an inverter circuit 18A is connected to the electrical terminal of the electrical generator 12. The inverter circuit 18A is a second inverter circuit of the embodiment. The input terminal of the inverter circuit 18A is connected to the electrical storage means 120. As shown in FIG. 3, the electrical storage means 120 includes a DC bus 110 which is a DC busbar, a step-up/step-down converter (a DC voltage converter) 100, and a battery 19. That is, the input terminal of the inverter circuit 18A is connected to the input terminal of the step-up/step-down converter 100 via the DC bus 110. The battery 19 as a storage battery is connected to the output terminal of the step-up/step-down converter 100. The battery 19 is configured as, for example, a capacitor type storage battery.

The inverter circuit 18A controls the operation of the electrical generator 12 on the basis of the instruction from the controller 30. That is, when the inverter circuit 18A performs a power running operation of the electrical generator 12, the necessary electricity is supplied from the battery 19 and the step-up/step-down converter 100 to the electrical generator 12 via the DC bus 110. Furthermore, when the regenerative operation of the electrical generator 12 is performed, the battery 19 is charged by the electricity generated by the electrical generator 12 via the DC bus 110 and the step-up/step-down converter 100. Furthermore, the step-up operation and the step-down operation of the step-up/step-down converter 100 are switched by the controller 30 on the basis of the DC bus voltage value, the battery voltage value, and the battery current value. Accordingly, the DC bus 110 may be maintained at a state where a predetermined constant voltage value is stored.

The lifting magnet 7 is connected to the DC bus 110 of the electrical storage means 120 via an inverter circuit 20B. The lifting magnet 7 includes an electromagnet that generates a magnetic force magnetically adsorbing a metallic substance, and electricity is supplied from the DC bus 110 via the inverter circuit 20B. When the electromagnet enters an on state on the basis of the instruction from the controller 30, the inverter circuit 20B supplies the electricity necessary for the lifting magnet 7 from the DC bus 110. Furthermore, when the electromagnet enters an off state, the regenerated electricity is supplied to the DC bus 110.

Furthermore, the inverter circuit 20A is connected to the electrical storage means 120. A rotation motor (an AC motor) 21 as a working motor is connected to one end of the inverter circuit 20A, and the other end of the inverter circuit 20A is connected to the DC bus 110 of the electrical storage means 120. The rotation motor 21 is a power source for the rotation mechanism 3 that rotates the rotation body 4. A resolver 22, a mechanical brake 23, and a rotation speed reducer 24 are connected to a rotary shaft 21A of a rotation motor 21. Furthermore, the inverter circuit 20A is a first inverter circuit of the embodiment.

When the power running operation of the rotation motor 21 is performed, the rotation force generated by the rotation driving force of the rotation motor 21 is amplified by the rotation speed reducer 24, and the rotation body 4 rotates while being controlled to be accelerated and decelerated. Furthermore, the rpm is increased at the rotation speed reducer 24 by the inertia rotation of the rotation body 4 and the rotation is transferred to the rotation motor 21, thereby generating regenerative electricity. The rotation motor 21 is AC-driven by the inverter circuit 20A on the basis of the PWM (Pulse Width Modulation) control signal. As the rotation motor 21, for example, an IPM motor embedded with a magnet may be appropriately used.

The resolver 22 is a sensor which detects the rotation position and the rotation angle of the rotary shaft 21A of the rotation motor 21, and detects the rotation angle and the rotation direction of the rotary shaft 21A by being mechanically connected to the rotation motor 21. Since the resolver 22 detects the rotation angle of the rotary shaft 21A, the rotation angle and the rotation direction of the rotation mechanism 3 are derived. The mechanical brake 23 is a brake device which generates a mechanical brake force, and mechanically stops the rotary shaft 21A of the rotation motor 21 on the basis of the instruction from the controller 30. The rotation speed reducer 24 is a speed reducer which decreases the rotation speed of the rotary shaft 21A of the rotation motor 21 and mechanically transfers the decreased rotation speed to the rotation mechanism 3.

Furthermore, since the electrical generator 12, the rotation motor 21, and the lifting magnet 7 are connected to the DC bus 110 via the inverter circuits 18A, 20A, and 20B, the electricity generated by the electrical generator 12 may be directly supplied to the lifting magnet 7 or the rotation motor 21, the electricity regenerated by the lifting magnet 7 may be supplied to the electrical generator 12 or the rotation motor 21, or the electricity regenerated by the rotation motor 21 may be supplied to the electrical generator 12 or the lifting magnet 7.

Since the inverter circuits 18A, 20A, and 20B control a large amount of electricity, the heating amount thereof considerably increases. Furthermore, the heating amount greatly increases even in a reactor 101 (refer to FIG. 3) included in the step-up/step-down converter 100. Accordingly, there is a need to cool the inverter circuits 18A, 20A, and 20B, and the step-up/step-down converter 100. Therefore, the hybrid type construction machine 1 of the embodiment includes a cooling liquid circulating system which is provided separately from the cooling liquid circulating system for the engine 11 to cool the step-up/step-down converter 100 and the inverter circuits 18A, 20A, and 20B.

As shown in FIG. 2, the hybrid type construction machine 1 includes a first cooling liquid circulating system 160 for the internal combustion engine and a second cooling liquid circulating system 170 for the electrical system, which are independent from each other. The first cooling liquid circulating system 160 is driven by a pump motor 161, and cools the engine 11. The second cooling liquid circulating system 170 includes a step-up/step-down converter 100, a pump (a cooling liquid circulating pump) 172 which circulates a cooling liquid supplied to the inverter circuits 18A, 20A, and 20B, and a pump motor (a cooling motor) 171 which drives the pump 172. The pump motor 171 is connected to the electrical storage means 120 via the inverter circuit 20C. The inverter circuit 20C serves as a cooling motor driving circuit of the embodiment, and supplies electricity necessary for the pump motor 171 when cooling the step-up/step-down converter 100 on the basis of the instruction from the controller 30. The cooling liquid circulating system 170 of the embodiment cools the step-up/step-down converter 100, the inverter circuits 18A, 20A, and 20B, and the controller 30. Furthermore, the cooling liquid circulating system 170 cools the electrical generator 12, the speed reducer 13, and the rotation motor 21.

An operation device 26 is connected to the pilot pump 15 via a pilot line 25. The operation device 26 is an operation device which is used to operate the rotation motor 21, the running mechanism 2, the boom 5, the arm 6, and the lifting magnet 7, and is operated by the operator. The control valve 17 is connected to the operation device 26 via a hydraulic line 27, and the pressure sensor 29 is connected thereto via a hydraulic line 28. The operation device 26 converts a hydraulic pressure (a primary hydraulic pressure) supplied via the pilot line 25 into a hydraulic pressure (a secondary hydraulic pressure) in accordance with an amount operated by the operator. The secondary hydraulic pressure output from the operation device 26 is supplied to the control valve 17 via the hydraulic line 27 and is detected by the pressure sensor 29 and the outputs the converted hydraulic pressure. The hydraulic oil transferred to the boom cylinder 8, the arm cylinder 9, and the like is controlled by switching the electromagnetic valve or the switching valve inside the control valve 17. Here, the rotation motor 21 is exemplified as the working motor, but the running mechanism 2 may be electrically driven by the working motor. Further, when the invention is applied to the forklift, the lifting device may be electrically driven by the working motor.

When an operation for rotating the rotation mechanism 3 is input to the operation device 26, the pressure sensor 29 detects the operation amount as a change in hydraulic pressure inside the hydraulic line 28. The pressure sensor 29 outputs an electrical signal representing the hydraulic pressure inside the hydraulic line 28. The electrical signal is input to the controller 30, and is used to control the driving of the rotation motor 21.

The controller 30 constitutes the control unit of the embodiment. The controller 30 includes a calculation processing device having a CPU (Central Processing Unit) and an internal memory, and is realized by executing the driving control program stored in the internal memory via the CPU. Furthermore, the power supply of the controller 30 is a battery (for example, 24 V of an in-vehicle battery) different from the battery 19. The controller 30 converts a signal representing an operation amount for rotating the rotation mechanism 3 among the signals input from the pressure sensor 29 into a speed instruction, and controls the rotation motor 21 by driving the inverter circuit 20A on the basis of the speed instruction. Furthermore, the controller 30 executes an operation control (switching an assisting operation and an electricity generation operation) of the electrical generator 12 by driving the inverter circuit 18A, executes the driving control (switching magnetization and demagnetization) of the lifting magnet 7 by driving the inverter circuit 20B, and executes the charging and discharging control of the battery 19 by controlling the driving of the step-up/step-down converter 100.

Furthermore, the controller 30 of the embodiment has a DC bus voltage lowering mode (a busbar voltage lowering mode) for decreasing the voltage of the DC bus 110 (specifically, consuming the electrical charge stored in a smoothing capacitor or the like connected to the DC bus 110) when the maintenance of the hybrid type construction machine 1 is performed. In the DC bus voltage lowering mode, the controller 30 stops the operation of all the inverter circuits 18A, 20A, and 20B, and the step-up/step-down converter 100, and decrease the voltage of the DC bus 110 by driving the inverter circuit 20C to consume the electricity in the pump motor 171 after a switch (to be described later) provided between the step-up/step-down converter 100 and the battery 19 enters a disconnection state. The DC bus voltage lowering mode is started when the operation of the hybrid type construction machine 1 is stopped (specifically, when the engine 11 is about to be stopped by the operator operating the key 40) or an input related to the start of the DC bus voltage lowering mode is performed by the operator via the operation panel inside the operation room 4a (refer FIG. 1).

Furthermore, when the inverter circuits 18A, 20A, and 20B, and the step-up/step-down converter 100 are driven, the controller 30 of the embodiment restricts the current flowing to the circuit in accordance with the temperature of the IPM included in the circuit. That is, when the temperature of the IPM is the first threshold value T1 or lower, the controller 30 sets the maximum current value that does not disturb the normal operation, and drives the circuit (any one of the inverter circuits 18A, 20A, and 20B, and the step-up/step-down converter 100) so as not to be higher than the maximum current value. Then, when the temperature of the IPM becomes higher than the first threshold value T1 (in the case of the abnormal temperature), the maximum current value to the circuit is set to be smaller than the maximum current value in the normal case, and the circuit is driven so as not to be higher than the maximum current value in the case of the abnormal temperature. Furthermore, when the temperature of the IPM becomes equal to or lower than a third threshold value T3(<T1) lower than the first threshold value T1 through the abnormal temperature, the controller 30 returns the maximum current value to the circuit to the maximum current value not disturbing the normal operation. In this manner, the reason why the temperature T3 is set when returning to the normal operation to be lower than the temperature T1 determined as the abnormal temperature is because reliable control may be realized by giving hysteresis to the abnormal determination.

Furthermore, when the temperature of the IPM becomes higher than the second threshold value T2(>T1) higher than the first threshold value T1, the controller 30 stops the operation of the circuit (any one of the inverter circuits 18A, 20A, and 20B, and the step-up/step-down converter 100) including the IPM. Furthermore, the second threshold value T2 is set to be lower than the temperature at which the overheat protection function embedded in the IPM is operated.

Here, the step-up/step-down converter 100 of the embodiment will be described in detail. As shown in FIG. 3, the step-up/step-down converter 100 has a step-up/step-down type switching control mode, and includes a reactor 101 and transistors 100B and 100C. The transistor 100B is a step-up switching element, and the transistor 100C is a step-down switching element. The transistors 100B and 100C are each configured as, for example, an IGBT (Insulated Gate Bipolar Transistor), and are connected to each other in series.

Specifically, the collector of the transistor 100B and the emitter of the transistor 100C are connected to each other, the emitter of the transistor 100B is connected to the negative terminal of the battery 19 and the negative interconnection of the DC bus 110 via the switch 100F, and the collector of the transistor 100C is connected to the positive interconnection of the DC bus 110. Then, in the reactor 101, one end thereof is connected to the collector of the transistor 100B and the emitter of the transistor 100C, and the other end thereof is connected to the positive terminal of the battery 19 via the switch 100E. A PWM voltage is applied from the controller 30 to the gates of the transistors 100B and 100C. The connection states of the switches 100E and 100F are controlled by the instruction from the controller 30.

Furthermore, a diode 100b as a rectifying element is reversely connected in parallel between the collector and the emitter of the transistor 100B. In the same manner, a diode 100c is reversely connected in parallel between the collector and the emitter of the transistor 100C. A smoothening capacitor 110a is connected between the collector of the transistor 100C and the emitter of the transistor 100B (that is, between the positive interconnection and the negative interconnection of the DC bus 110), and the capacitor 110a smoothens the voltage output from the step-up/step-down converter 100, the voltage generated from the electrical generator 12, or the voltage regenerated from the rotation motor 21. A voltage sensor 110b is provided between the positive interconnection and the negative interconnection of the DC bus 110 to detect the voltage of the DC bus 110. The voltage detection result obtained by the voltage sensor 110b is provided for the controller 30.

In the step-up/step-down converter 100 with such a configuration, when DC power is supplied from the battery 19 to the DC bus 110, a PWM voltage is applied to the gate of the transistor 100B on the basis of the instruction from the controller 30 while the switches 100E and 100F are connected to each other. Then, an induced electromotive force generated in the reactor 101 with the on/off of the transistor 100B is transferred via the diode 100c, and the electricity is smoothed by the capacitor 110a. Furthermore, when DC power is supplied from the DC bus 110 to the battery 19, a PWM voltage is applied to the gate of the transistor 100C on the basis of the instruction from the controller 30 while the switches 100E and 100F are connected to each other, and the current output from the transistor 100C is smoothened by the reactor 101.

Figure 4:
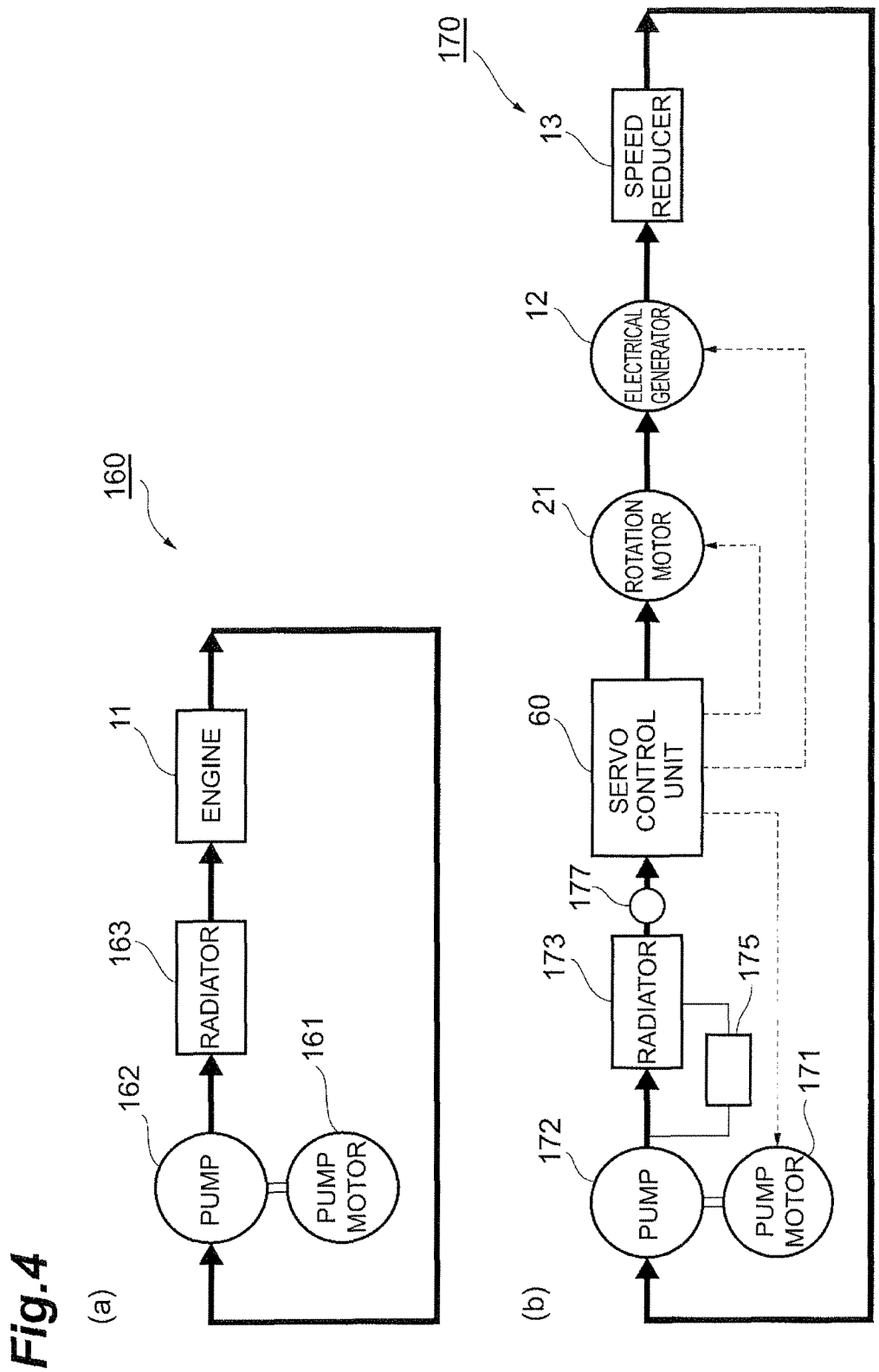
FIG. 4A is a block diagram illustrating a first cooling liquid circulating system 160 of the hybrid type construction machine 1.
FIG. 4B is a block diagram illustrating a second cooling liquid circulating system 170 of the hybrid type construction machine 1.

FIG. 4 is a block diagram illustrating the cooling liquid circulating system in the hybrid type construction machine 1. As shown in FIG. 4A, the first cooling liquid circulating system 160 includes a pump 162 driven by the pump motor 161 and a radiator 163, where the cooling liquid circulated by the pump 162 radiates heat by the radiator 163, and is supplied to the cooling pipe of the engine 11. Furthermore, the radiator 163 is an example of a first heat exchanger of the invention.

Furthermore, as shown in FIG. 4B, the second cooling liquid circulating system 170 includes a pump 172 driven by the pump motor 171, a radiator 173, and a servo control unit 60. The cooling liquid circulated by the pump 172 radiates heat by the radiator 173, and is supplied to the servo control unit 60. The servo control unit 60 accommodates a plurality of modules respectively constituting the step-up/step-down converter 100, the inverter circuits 18A, 20A, and 20B, and the controller 30, and has a pipe cooling the modules. The cooling liquid passing the pipe of the servo control unit 60 is returned from the pump 172 to the radiator 173 after sequentially cooling the rotation motor 21, the electrical generator 12, and the speed reducer 13 in this order. Furthermore, the radiator 173 is an example of a second heat exchanger of the invention. Furthermore, it is desirable that the inlet of the servo control unit 60 is provided with a temperature sensor 177 detecting the temperature of the cooling liquid. Furthermore, it is more desirable that a display device displaying the detected temperature is provided. Accordingly, when the cooling performance is degraded due to the blocking of the radiator 173, a control device inside a control unit 600 (to be described later) may control the output from any one of the rotation motor 21 and the electrical generator 12 on the basis of the detection value. As a result, a continuous operation may be performed, and continuous work may be performed without stopping the hybrid type construction machine.

Figure 5:
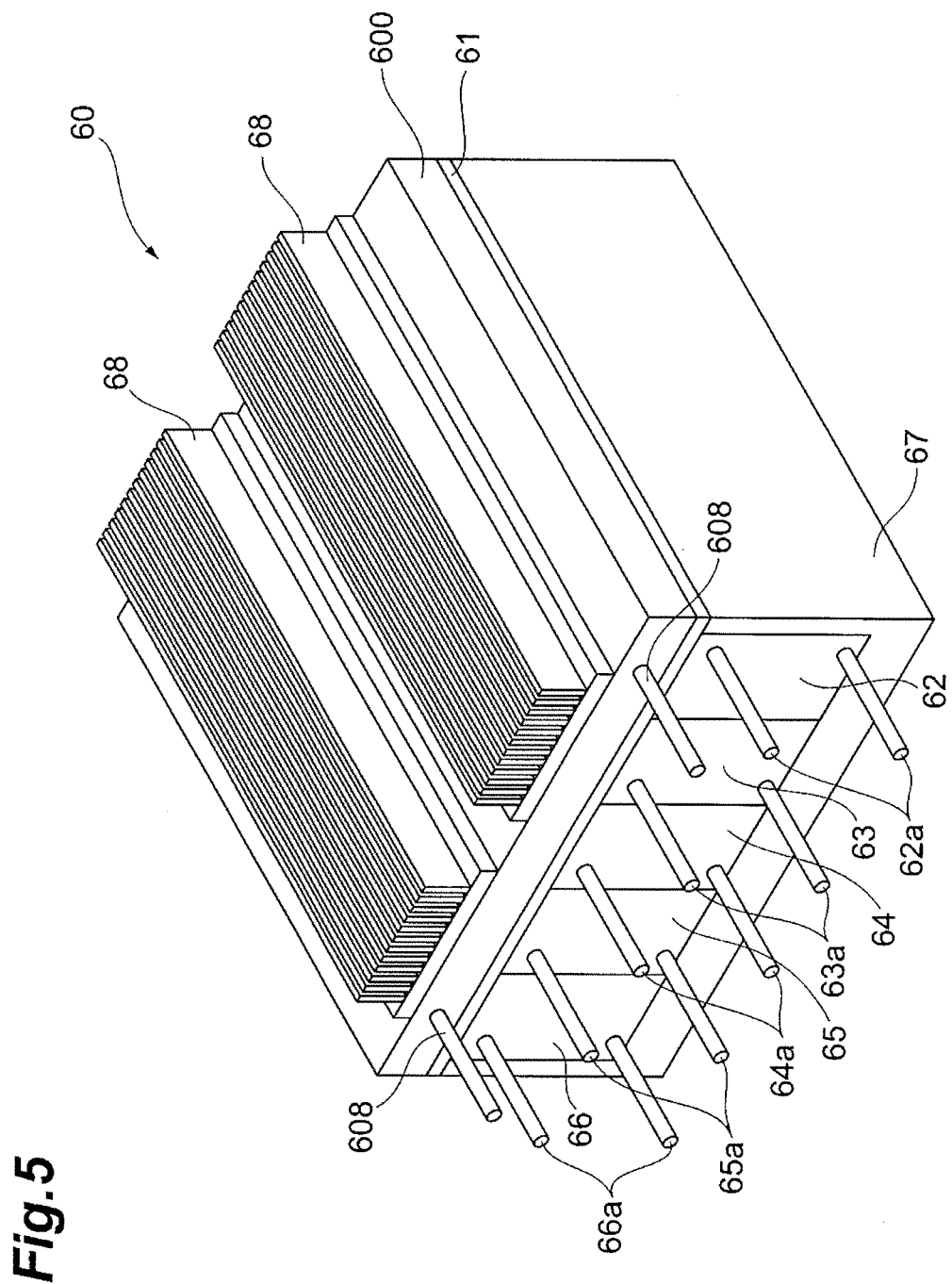
FIG. 5 is a perspective view illustrating an external shape of a servo control unit 60.

Next, the servo control unit 60 will be described by referring to FIG. 5. FIG. 5 is a perspective view illustrating an external shape of the servo control unit 60. The servo control unit 60 is a device that controls the electrical generator 12, the rotation motor 21, and the battery 19. The servo control unit 60 has a substantially rectangular shape when seen from the outside thereof, and includes the control unit 600 accommodating the controller 30, a step-up/step-down converter unit 66, and inverter units 62 to 65. The step-up/step-down converter unit 66 and the inverter units 62 to 65 constitute a plurality of driver units of the embodiment. The step-up/step-down converter unit 66 accommodates the step-up/step-down converter 100, and the inverter units 62 to 65 accommodate, for example, the inverter circuits 18A, 20A, 203, and the other inverter circuits.

Each of the step-up/step-down converter unit 66 and the inverter units 62 to 65 has a rectangular metallic container which is elongated in the depth direction. The units 62 to 66 are installed inside a plate-like pedestal 67 of which a metallic upper surface is opened while the units are arranged in the direction intersecting the length direction thereof, and are respectively fixed to the plate-like pedestal 67 by bolts. Then, a control unit bottom plate 61 as an upper cover is provided on the units 62 to 66 to cover the upper surfaces of the units 62 to 66, and the control unit 600 is placed on the control unit bottom plate 61. Further, a heat sink 68 is attached to the upper surface of the control unit 600 for the purpose of air cooling. The upper surface sides of the units 62 to 66 are sealed by the control unit bottom plate 61.

The control unit 600 accommodates a controller controlling the step-up/step-down converter unit 66 and the inverter units 62 to 65. The controller includes an electronic circuit or a calculation processing device including a CPU and an internal memory, and is realized by executing a driving control program stored in the internal memory by the CPU.

Furthermore, a cooling pipe 608 is built in the control unit 600. In the same manner, a cooling pipe 66a is built in the step-up/step-down converter unit 66, and cooling pipes 62a to 65a are respectively built in the inverter units 62 to 65.

Figure 6:
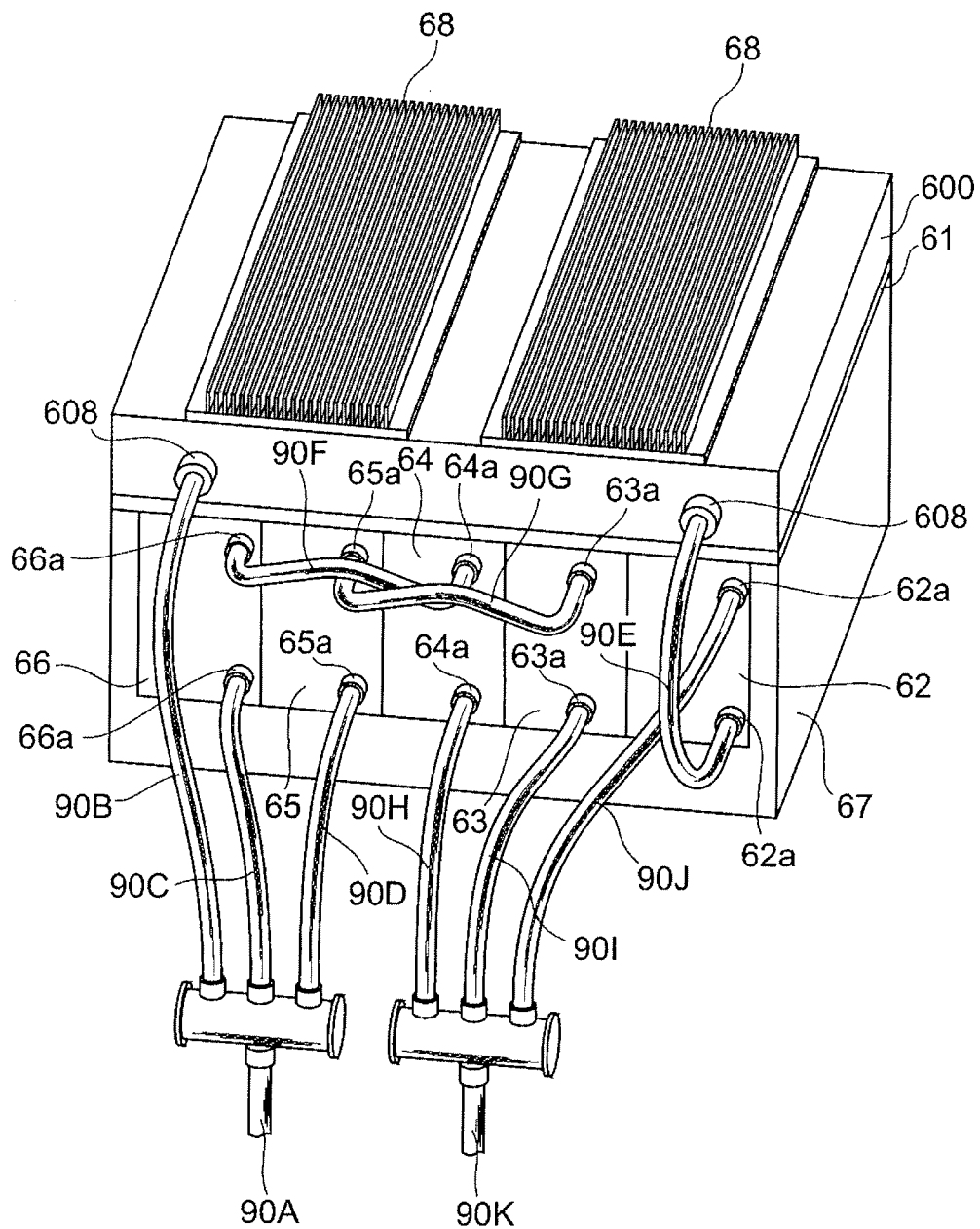

FIG. 6 is a perspective view illustrating a state where the cooling pipes 62a to 66a are connected. A pipe 90A extending from the radiator 173 (refer to FIG. 4) is divided into three pipes 90B to 90D. Among the pipes, the pipe 90B is connected to one end of the cooling pipe 608 of the control unit 600, and the other end of the cooling pipe 608 is connected to one end of the cooling pipe 62a of the inverter unit 62 via another pipe 90E. Furthermore, the pipe 90C is connected to one end of the cooling pipe 66a of the step-up/step-down converter unit 66, and the other end of the cooling pipe 66a is connected to one end of the cooling pipe 64a of the inverter unit 64 via the pipe 90F. Furthermore, the pipe 90D is connected to one end of the cooling pipe 65a of the inverter unit 65, and the other end of the cooling pipe 65a is connected to one end of the cooling pipe 63e of the inverter unit 63 via the pipe 90G.

Then, the pipes 90J, 90I, and 90H are respectively connected to the other ends of the cooling pipes 62a to 64a of the inverter units 62 to 64. The pipes 90J, 90I, and 90H are connected to one pipe 90K, and the pipe 90K extends to, for example, another cooling target component such as the rotation motor 21.

Next, the configuration of the control unit 60C will be described in detail. FIG. 7A is a plan cross-sectional view illustrating the control unit 600, FIG. 7B is a side cross-sectional view taken along the line I-I of FIG. 7A, FIG. 7C is a side cross-sectional view taken along the line II-II of FIG. 7A, and FIG. 7D is a side cross-sectional view taken along the line of FIG. 7A. Furthermore, FIG. 8A is a side cross-sectional view taken along the line IV-IV of FIG. 7A, and FIG. 8B is a side view when the control unit 600 is seen from the same direction as that of FIG. 8A.

The control unit 600 includes a casing 601 having a casing container 601a and a casing cover 601b, and the electronic circuit of the controller or the like is accommodated inside the casing 601.

The casing 601 of the control unit 600 has a rectangular external shape, and is provided on the step-up/step-down converter unit 66 and the inverter units 62 to 65 as a plurality of driver units. Furthermore, the casing 601 has a substantially rectangular internal space on a bottom surface having a substantially rectangular planar shape. The internal space is isolated from the external air, and the casing 601 of the control unit 600 is sealed. Furthermore, the arrangement direction of the units 62 to 66 is aligned with the width direction of the control unit 600, and the direction corresponds to the up and down direction of the paper surface of FIG. 7A. Furthermore, the direction intersecting the arrangement direction of the plurality of units 62 to 66 is aligned with the length direction of the control unit 600, and the direction corresponds to the left/right direction of the paper surface of FIG. 7A.

A card plate 602 having a rectangular planar shape is provided on the bottom surface inside the casing 601. The card plate 602 is disposed so that the length direction and the width direction of the card plate 602 are respectively aligned with the length direction and the width direction of the control unit 600. The card plate 602 is provided with a substantially rectangular planar opening.

At the inside of the opening of the card plate 602, a heat sink (a thermal conductive plate) 603 having substantially the same planar shape as that of the opening and a substantially rectangular external shape is provided on the bottom surface inside the casing 601. The heat sink 603 is used to cool an electronic component provided inside the casing 601, and the cooling pipe 608 is thermally coupled to the heat sink 603 (for example, in a contact state). The heat sink 603 is cooled by the cooling liquid circulating in the cooling pipe 608. The cooling liquid is, for example, water.

A control card 604 as a substrate with a substantially rectangular planar shape is provided on the heat sink 603. The control card 604 is a substrate on which various electronic components are mounted, and the rear surface thereof is disposed to face the heat sink 603. A plurality of CPUs 605a to 605e as one type of electronic components is mounted on the rear surface of the control card 604. The plurality of CPUs 605a to 605e respectively corresponds to the plurality of units 62 to 66, and controls an on/off state of the transistors included in the inverter circuits of the units respectively corresponding to the units 62 to 66. Furthermore, the plurality of CPUs 605a to 605e is thermally coupled to the heat sink 603.

That is, the heat sink 603 is provided between the plurality of CPUs 605a to 605e and the cooling pipe 608.

Furthermore, a plurality of field effect transistors (FETs) 620 as one type of electronic components is mounted on the front surface of the control card 604. The plurality of FETs 620 transmits a switching signal to the electromagnetic valve of the control valve 17 in order to control the operations of the boom 5, the arm 6, and the like. The plurality of FETs 620 is disposed around a connector 607 in consideration of the interconnection inside the control unit 600. A heat transfer plate 621 made of aluminum contacts the rear surface of each FET 62C, and the end portion of the heat transfer plate 621 is fixed to the inner surface of the casing container 601a by a screw.

A plurality of cooling fans 606a is disposed on the card plate 602 in the width direction of the control unit 600. The plurality of cooling fans 606a is provided to respectively correspond to the CPUs 605a to 605e in order to solve the temperature gradient inside the casing by mixing air heated by heat generated from the CPUs 605a to 605e, and generates an air stream toward each of the CPUs 605a to 605e.

The bottom surface inside the casing 601 is provided with a card plate 613 having a rectangular planar shape as well as the card plate 602. A power supply card 609 is provided on the card plate 613. Two power supply ICs (power supply units) 610 are provided on the power supply card 609. Each power supply IC 610 is provided with a heat sink 611 that air-cools the power supply IC. Furthermore, a thermal conductive plate 614 is provided to contact the inner surface of the casing 601, and the power supply IC 610 and the heat sink 611 come into plane contact with the thermal conductive plate 614. For this reason, a part of the heat generated from the power supply IC 610 may be radiated. Furthermore, two cooling fans 606b are provided on the card plate 613. The cooling fans 606b are provided to solve the temperature gradient inside the casing by mixing the air heated by heat generated from the power supply IC 610, and generate an air stream toward the power supply IC 610.

The input/output portion of the electronic component mounted on the control card 604 is connected to the connector 607, and for example, an instruction signal for operating the units 62 to 66 or an output signal from the electronic component is input and output via the connector 607. The connector 607 is connected to a control unit (not shown) controlling, for example, the servo control unit 60 by an interconnection.

The connector 607 is provided in a concave recess portion in the side surface of the casing 601, and the recess portion is covered by the packing 616. The packing 616 is covered by a packing pressing member 617 with the casing cover 601b interposed therebetween. The packing 616 realizes waterproofing and dustproofing of the connector 607.

Figure 9:
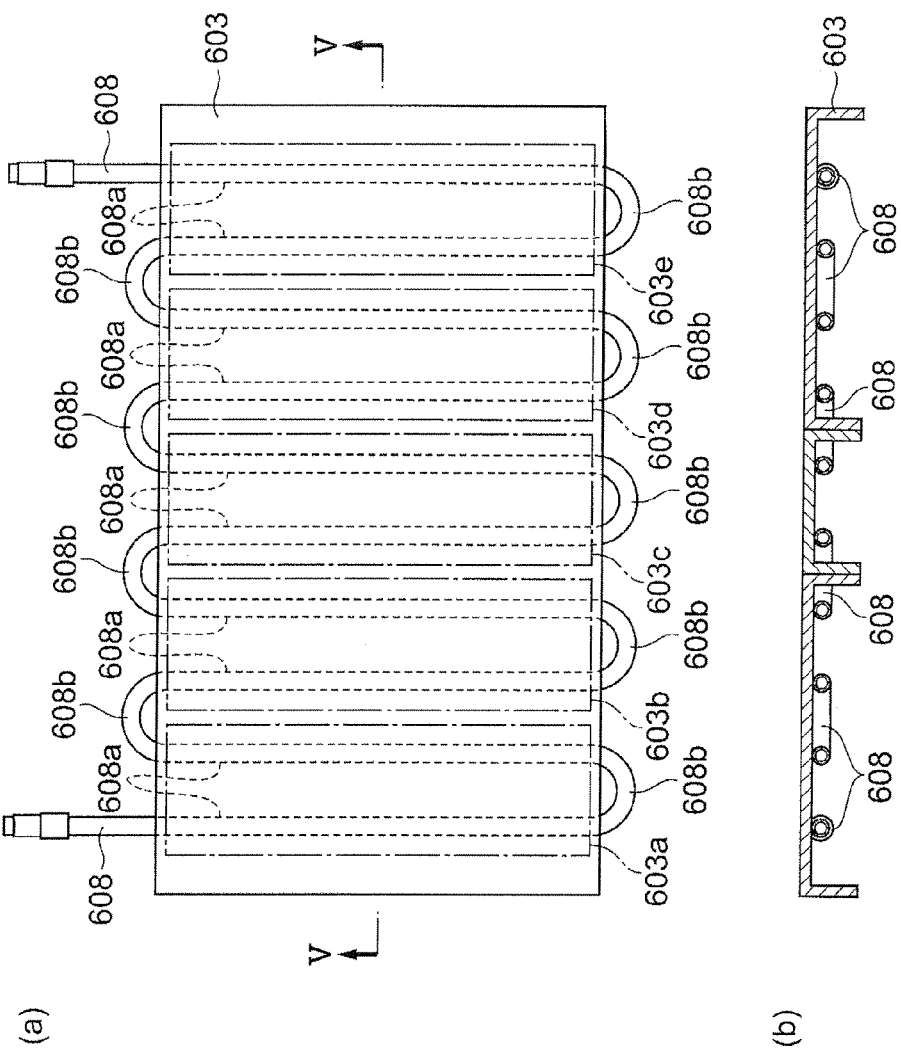
FIG. 9A is a plan view illustrating a heat sink 603 and a cooling pipe 608.
FIG. 9B is a side cross-sectional view taken along the line V-V of FIG. 9A.
Figure 10:
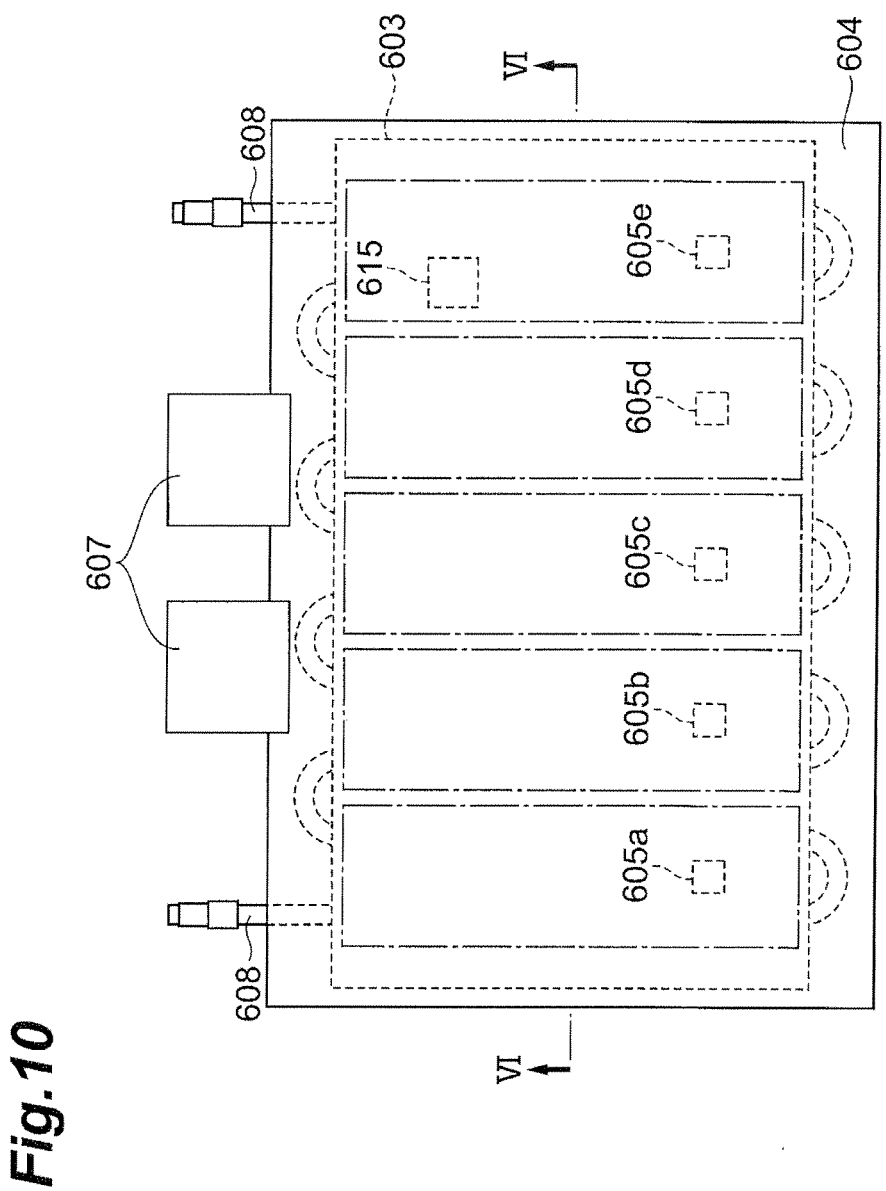
FIG. 10 is a plan view illustrating a control card 604 that is disposed to cover the heat sink 603 and the cooling pipe 608.
Figure 11:
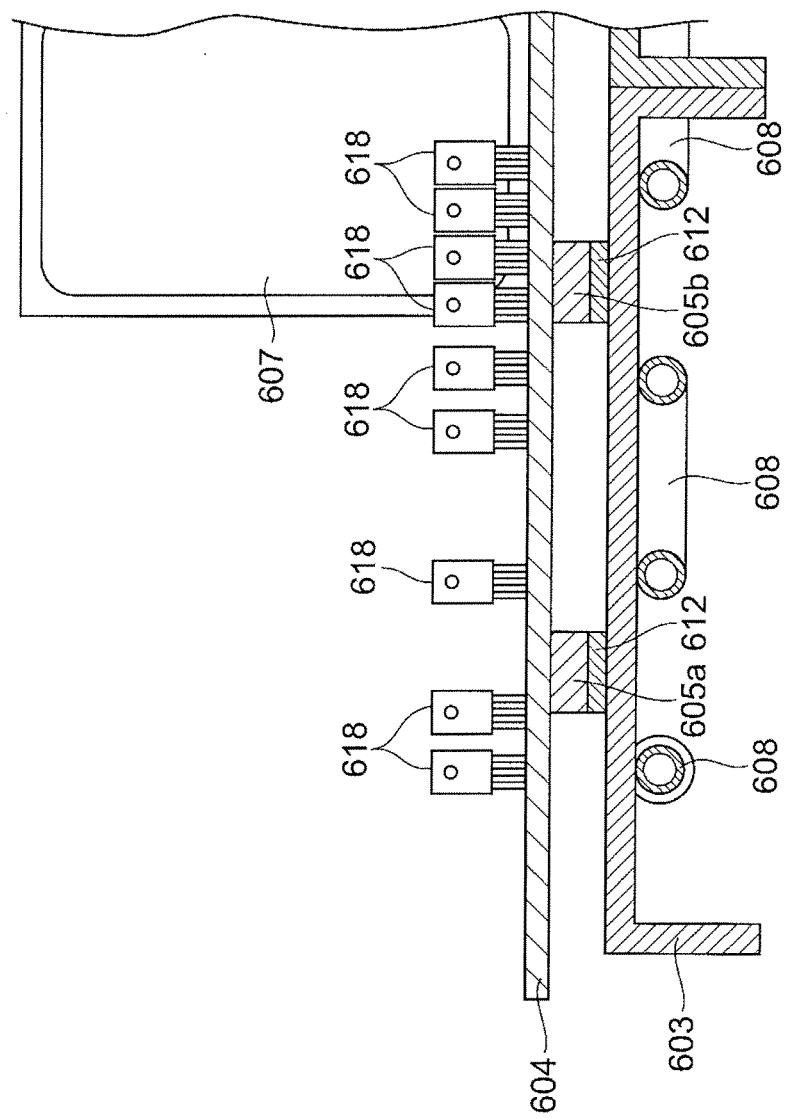
FIG. 11 is a side cross-sectional view illustrating a part of a cross-section taken along the line VI-VI of FIG. 10.

Here, the water cooling structure of the control unit 600 will be described in more detail. FIGS. 9 to 11 are diagrams illustrating the cooling structure. FIG. 9A is a plan view illustrating the heat sink 603 and the cooling pipe 600, and FIG. 9B is a side cross-sectional view taken along the line V-V of FIG. 9A. Furthermore, FIG. 10 is a plan view illustrating the control card 604 disposed to cover the heat sink 603 and the cooling pipe 608. Furthermore, FIG. 11 is a side cross-sectional view illustrating a part of the cross-section taken along the line VI-VI of FIG. 10.

As shown in FIGS. 9A and 9B, the cooling pipe 608 of the embodiment is molded in a hair-pin pipe shape, and is bonded and fixed to the rear surface side of the heat sink 603. More specifically, the cooling pipe 608 includes a plurality of pipe portions 608a. Each of the plurality of pipe portions 608a extends in the width direction (in the embodiment, a first direction) of the heat sink 603, and the pipe portions are provided in parallel with a predetermined interval in the length direction (in the embodiment, a second direction) of the heat sink 603 intersecting the width direction. Then, one end side and the other end side of the plurality of pipe portions 608*a* are alternately connected by U-shaped pipe portions 608*b*, thereby forming a single pipe as an entirety.

The heat sink 603 includes a plurality of rectangular cooling areas 603*a* to 603*e* extending in the width direction (the first direction) of the heat sink 603 and arranged in the length direction (the second direction) of the heat sink 603. In each of the plurality of cooling areas 603*a* to 603*e*, two adjacent pipe portions 608*a* among the plurality of pipe portions 608*a* are thermally coupled to each other. In other words, each of the plurality of cooling areas 603*a* to 603*e* is defined to include two pipe portions 608*a* in the plan view.

Furthermore, by referring to FIGS. 10 and 11, as described above, the plurality of CPUs 605*a* to 605*e* is mounted on the rear surface of the control card 604, and a plurality of electrical components such as an electrical contact 618 is provided on the front surface of the control card to generate an electrical signal to an electromagnetic valve or a switching valve. Then, the plurality of CPUs 605*a* to 605*e* is connected to each other by a pattern interconnection formed on the control card 604, and performs communication therebetween. The CPUs 605*a* to 605*e* are arranged in the length direction (the second direction) of the heat sink 603, and are respectively disposed on the cooling areas 603*a* to 603*e* of the heat sink 603. Then, the CPU 605*a* is thermally coupled to the cooling area 603*a* of the heat sink 603 via a thermal conductive sheet 612, and the CPU 605*b* is thermally coupled to the cooling area 603*b* via the thermal conductive sheet 612 (refer to FIG. 11). In the same manner, the CPUs 605*c* to 605*e* are thermally coupled to the cooling areas 603*c* to 603*e* via the thermal conductive sheet. That is, in the embodiment, in the plurality of CPUs 605*a* to 605*e*, one CPU is thermally coupled to one cooling area.

Furthermore, for example, as shown in FIG. 10, a CPU 615 is mounted on the control card 604 separately from the CPUs 605*c* to 605*e*. The CPU 615 is, for example, an upper-level CPU that generally controls the plurality of CPUs 605*a* to 605*e*. Since the heating amount of the CPU is not greater than those of the CPUs 605*c* to 605*e* controlling the inverter circuit or the like, the CPU is disposed at an arbitrary position on the control card 604 regardless of the cooling areas 603*c* to 603*e*.

Furthermore, as described above, the CPUs 605*a* to 605*e* are thermally coupled to the heat sink 603 via a thermal conductive sheet 612 disposed between the CPUs 605*a* to 605*e* and the heat sink 603. It is desirable that the thermal conductive sheet 612 includes an elastic material capable of absorbing a vibration transferred from the heat sink 603 to the CPUs 605*a* to 605*e* and is formed of, for example, silicon rubber.

Figure 12:
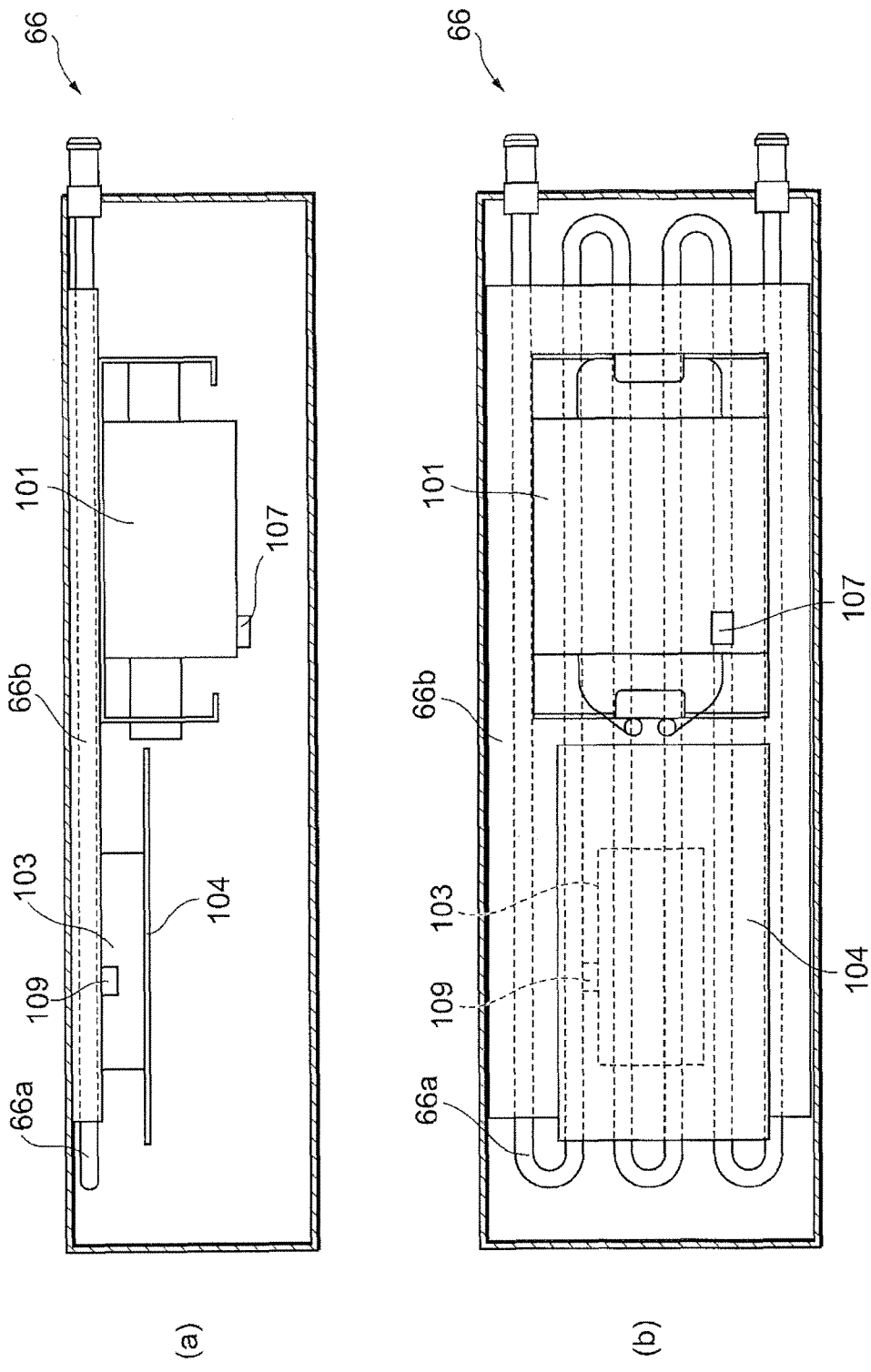
FIG. 12A is a plan view illustrating an internal configuration of a step-up/step-down converter unit 66.
FIG. 12B is a side view illustrating an internal configuration of the step-up/step-down converter unit 66.

Next, the water-cooling structure of the step-up/step-down converter unit 66 and the inverter units 62 to 65 will be described in detail. FIG. 12A is a plan view illustrating an internal configuration of the step-up/step-down converter unit 66. Furthermore, FIG. 12B is a side view illustrating an internal configuration of the step-up/step-down converter unit 66. Furthermore, in the drawings, the ceiling plate or the side plate of the casing is detached so that the internal configuration of the step-up/step-down converter unit 66 may be understood.

The step-up/step-down converter unit 66 includes therein an IPM (Intelligent Power Module) 103 obtained by assembling the transistors 100B and 100C (refer to FIG. 3) of the step-up/step-down converter 100, the reactor 101, and the cooling pipe 66*a*. The IPM 103 is mounted on the interconnection substrate 104. The cooling pipe 66*a* is disposed in a two-dimensional shape along the side surface of the step-up/step-down converter unit 66. Specifically, the cooling pipe 66*a* is accommodated in a metallic container 66*b* with a rectangular cross-section while being bent several times and made as long as possible inside the step-up/step-down converter unit 66, and contacts the inner surface of the metallic container 66*b*. The metallic container 66*b* constitutes the thermal conductive plate of the embodiment, and is disposed to extend along the up and down direction of the hybrid type construction machine 1. As shown in FIG. 12A, the reactor 101 and the IPM 103 are disposed to contact the outer surface of the metallic container 66*b*, and the outer surface of the metallic container 66*b* serves as a heat radiation surface that is thermally coupled to the reactor 101 and the IPM 103. That is, the metallic container 66*b* transfers the heat generated from the reactor 101 and the IPM 103 to the cooling pipe 66*a*. Accordingly, the reactor 101 and the IPM 103 are cooled. Here, the metallic container 66*b* has an area wider than that of the reactor 101. Furthermore, the metallic container has an area wider than that of the IPM 103. In this manner, since the metallic container 66*b* has a sufficiently wide contact area with respect to the reactor 101 and the IPM 103, the heat generated from the reactor 101 and the IPM 103 may be transferred thereto.

Furthermore, it is desirable that the reactor 101 is provided with a temperature sensor 107 detecting the temperature of the reactor 101. Accordingly, an abnormal temperature of the reactor 101 may be monitored. Accordingly, when heat is excessively generated from the reactor 101, the charging and discharging of the battery 19 may be restricted. As a result, since the short-circuiting of the reactor 101 is prevented, the continuous operation may be performed, and the continuous work may be performed without stopping the hybrid type construction machine.

Furthermore, the step-up/step-down converter unit 66 includes a temperature sensor 109 which detects the temperature of the IPM 103. The temperature sensor 109 is a second temperature sensor of the embodiment, and is provided at the outside of the IPM 103 separately from the temperature sensor (the first temperature sensor) built in the IPM 103. The temperature sensor 109 is disposed in the vicinity of the IPM 103 (desirably, adjacent to the IPM 103) on the outer surface of the metallic container 66*b*. Specifically, the temperature sensor is disposed on an area located at the upper side of the IPM 103 (that is, between the IPM 103 and the control unit 600) inside the outer surface of the metallic container 66*b*.

Figure 13:
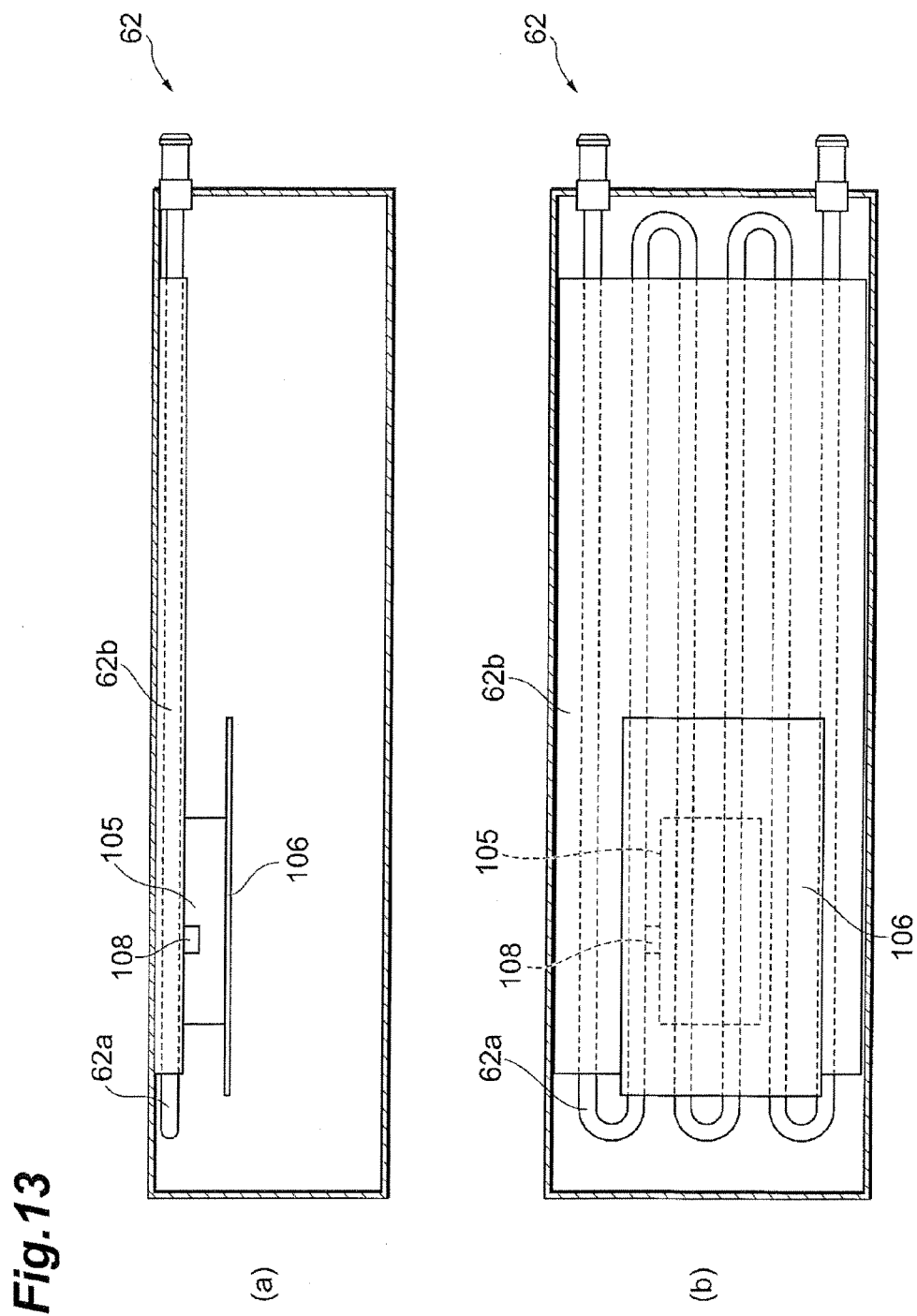
FIG. 13A is a plan view illustrating an internal configuration of an inverter unit 62.
FIG. 13B is a side view illustrating an internal configuration of the inverter unit 62.

FIG. 13A is a plan view illustrating an internal configuration of the inverter unit 62. Furthermore, FIG. 13B is a side view illustrating an internal configuration of the inverter unit 62. Furthermore, in the drawings, as in FIG. 12, the ceiling plate or the side plate of the casing is detached so that the internal configuration of the inverter unit 62 may be understood. Furthermore, the internal configurations of the inverter units 63 to 65 are the same as that of the inverter unit 62 shown in FIG. 13 except for the configuration of the inverter circuit.

The inverter unit 62 includes therein an IPM 105 obtained by assembling the transistor of the inverter circuit 20A and the cooling pipe 62*a*. The IPM 105 is mounted on the interconnection substrate 106. The cooling pipe 62*a* is disposed in the step-up/step-down converter unit 66 in the same manner as the cooling pipe 66*a*. The cooling pipe 62*a* is accommodated in a metallic container 62*b* with a rectangular cross-section, and contacts the inner surface of the metallic container 62*b*. The metallic container 62*b* constitutes the thermal conductive plate of the embodiment, and is disposed to extend along the up and down direction of the hybrid type construction machine 1. As shown in FIG. 13A, the outer surface of the metallic container 62b is provided with the IPM 105 in a contact manner, and the outer surface of the metallic container 62b serves as a heat radiation surface that is thermally coupled to the IPM 105. That is, the metallic container 62b transfers the heat from the IPM 105 to the cooling pipe 62a. Accordingly, the IPM 105 is cooled.

Furthermore, the inverter unit 62 includes a temperature sensor 108 which detects the temperature of the IPM 105. The temperature sensor 108 is a second temperature sensor of the embodiment, and is provided at the outside of the IMP 105 separately from the temperature sensor (the first temperature sensor) built in the IPM 105. The temperature sensor 108 is disposed in the vicinity of the IPM 105 (desirably, adjacent to the IPM 105) on the outer surface of the metallic container 62b. Specifically, the temperature sensor is disposed on an area located at the upper side of the IPM 105 (that is, between the IPM 105 and the control unit 600) inside the outer surface of the metallic container 62b.

Figure 14:
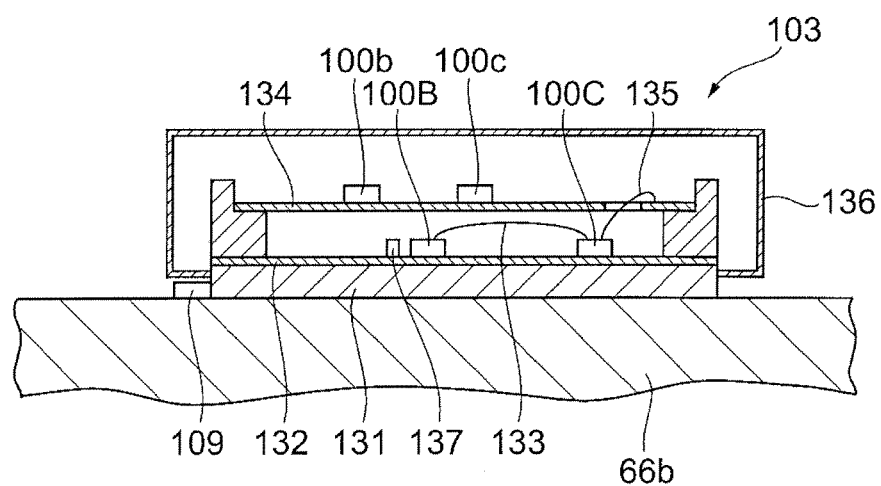
FIG. 14 is a side cross-sectional view illustrating an internal configuration of an IPM 103.

Here, the example of the internal configuration of the IPM such as the IPMs 103 and 105 will be described. FIG. 14 is a side cross-sectional view illustrating an internal configuration of the IPM 103. Furthermore, since the internal configuration of the IPM 105 is substantially the same as that of the IPM 103, the detailed description thereof will be omitted.

The IPM 103 includes a planar metallic base 131 which is made of metal, for example, copper or aluminum having high thermal conductivity, an insulation substrate 132 which is provided on one surface of the metallic base 131, and transistors 100B and 100C which are mounted on the insulation substrate 132. The transistors 100B and 100C are connected to each other by a pattern interconnection or a bonding wire 133 disposed on the insulation substrate 132. Furthermore, a part of the terminals of the transistors 100B and 100C are connected to the interconnection substrate 134 disposed above the transistors 100B and 100C via a bonding wire 135. Various electronic components such as diodes 100b and 100c are mounted on the interconnection substrate 134 to be connected to the transistors 100B and 100C.

The insulation substrate 132, the transistors 100B and 100C, the interconnection substrate 134, and the electronic component such as the diodes 100b and 100c are sealed by a package 136. Then, the other surface of the metallic base 131 is exposed from the package 136, and the IPM 103 is fixed while the surface contacts the metallic container 66b.

Furthermore, a temperature sensor 137 is disposed on the insulation substrate 132 to detect the temperature of the transistors 100B and 100C. The temperature sensor 137 is a first temperature sensor of the embodiment, and the IPM 103 determines whether its own operation is stopped on the basis of the temperature detection result of the temperature sensor 137 in the overheat protection function as the own protection function. Furthermore, for example, as shown in FIG. 14, the temperature sensor 109 (the second temperature sensor) disposed at the outside of the IPM 103 is disposed adjacent to the metallic base 131.

Figure 15:
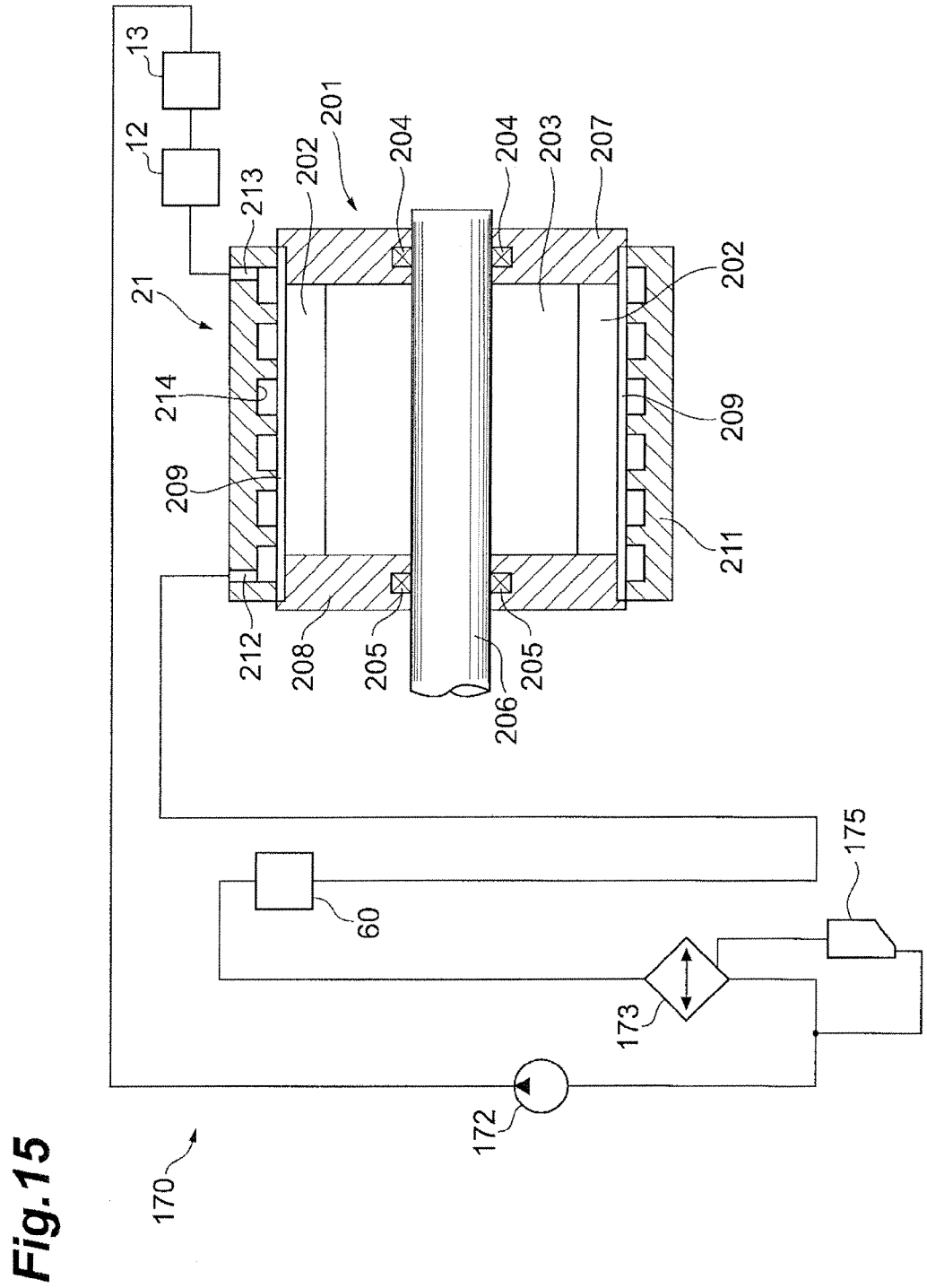
FIG. 15 is a diagram illustrating a method of cooling a rotation motor 21 by a cooling liquid circulating system 170.

FIG. 15 is a diagram illustrating a method of cooling the rotation motor 21 using the cooling liquid circulating system 170. Furthermore, since the method of cooling the electrical generator 12 is also the same as that of the rotation motor 21, herein, only the rotation motor 21 will be representatively described.

As shown in FIG. 15, the rotation motor 21 includes a driving unit casing 201, a stator 202 which is attached to the driving unit casing 201, a rotor 203 which is disposed to be rotatable at the inside of the stator 202 in the radial direction, and an output shaft 206 which extends to penetrate the rotor 203 and is disposed to be rotatable by bearings 204 and 205 with respect to the driving unit casing 201. The driving unit casing 201 includes side plates 207 and 208, and a cylindrical motor frame 209 attached between the side plates 207 and 208 and extending in the axial direction, where the bearing 204 is attached to the side plate 207, the bearing 205 is attached to the side plate 208, and the stator 202 is attached to the motor frame 209.

The stator 202 includes a coil (not shown). When a predetermined current is supplied to the coil, the rotation motor 21 is driven, and the rotor 203 rotates at a rotation speed corresponding to the magnitude of the current. Then, the rotation of the rotor 203 is transferred to the output shaft 206 attached with the rotor 203.

In order to radiate the heat generated with the driving of the rotation motor 21 and to cool the rotation motor 21, a jacket 211 is attached to the outer periphery of the driving unit casing 201. The jacket 211 includes a cooling liquid supply port 212 to which the cooling liquid is supplied, a cooling liquid discharge port 213 from which the cooling liquid having a high temperature after cooling the rotation motor 21 is discharged, and one cooling liquid passage 214 which connects the cooling liquid supply port 212 and the cooling liquid discharge port 213 to each other and extends in a spiral shape or a meander shape. The cooling liquid supplied from the pump 172 to the cooling liquid supply port 212 via the radiator 173 and the servo control unit 60 flows inside the cooling liquid passage 214 in a meandering manner, and cools the rotation motor 21 in the meantime. Then, the cooling liquid is discharged from the cooling liquid discharge port 213. Furthermore, as shown in FIG. 15, it is desirable that the second cooling liquid circulating system is provided with an auxiliary tank 75 that supplements the cooling liquid.

Here, the DC bus voltage lowering mode of the controller 30 will be described further. As described above, the DC bus voltage lowering mode indicates an operation mode for decreasing the voltage of the DC bus 110 while the operation of the hybrid type construction machine 1 is stopped. Then, in this mode, the inverter circuits 18A, 20A, and 20B, and the step-up/step-down converter 100 are all stopped, the switches 100E and 100F provided between the step-up/step-down converter 100 and the battery 19 enters a disconnection state, and the inverter circuit 20C is driven to consume the electricity in the pump motor 171, thereby decreasing the voltage of the DC bus 110.

Figure 16:
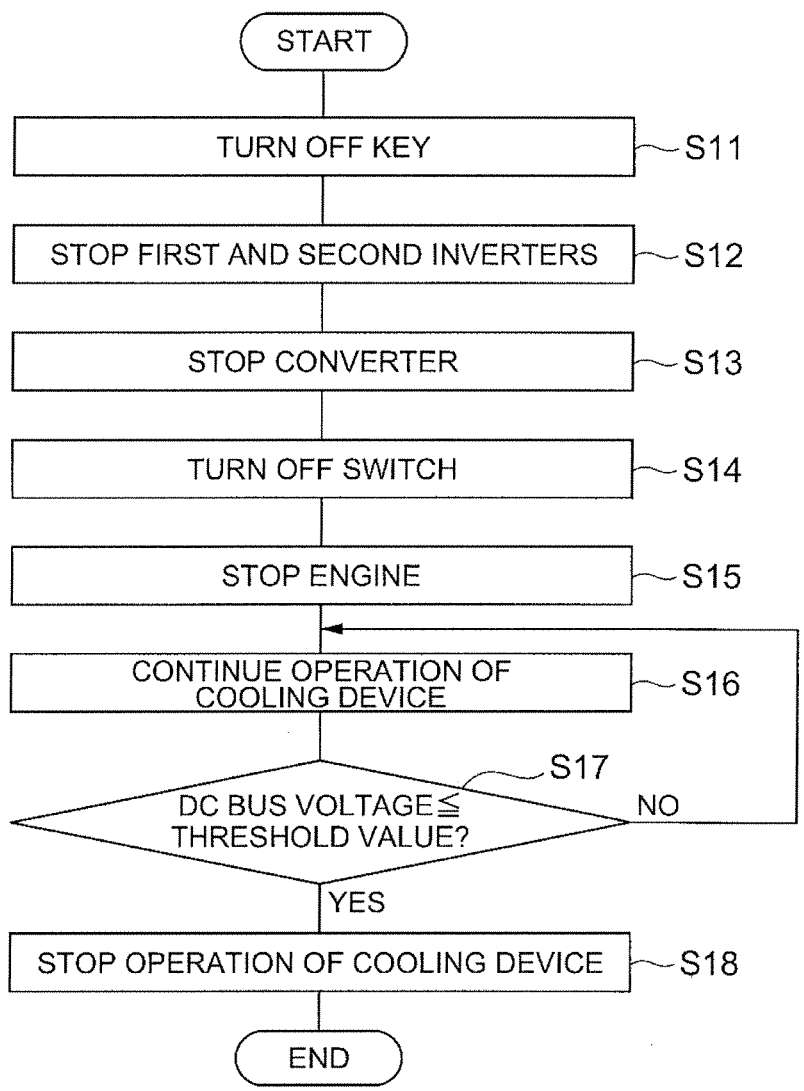
FIG. 16 is a flowchart illustrating an operation of the hybrid type construction machine 1 in a DC bus voltage lowering mode.

FIG. 16 is a flowchart illustrating an operation of the hybrid type construction machine 1 in the DC bus voltage lowering mode. First, an ignition key 40 is operated by the operator to stop the operation of the hybrid type construction machine 1 (step S11). In the embodiment, the controller 30 starts the DC bus voltage lowering mode whenever the operation of the hybrid type construction machine 1 is stopped in this manner. That is, the controller 30 stops the driving of the inverter circuits 18A, 20A, and 20B when receiving the operation of the key 40 (step S12). Accordingly, the supply of the electricity to the electrical generator 12, the rotation motor 21, and the lifting magnet 7 is stopped. Next, the controller 30 stops the driving of the step-up/step-down converter 100 (step S13). Then, the controller 30 allows the switches 100E and 100F (refer to FIG. 3) between the step-up/step-down converter 100 and the battery 19 to be in a disconnection state (step S14). Accordingly, the DC bus 110 and the battery 19 are electrically separated from each other. Then, the controller 30 instructs the ECU or the like of the engine 11 to stop the engine 11 (step S15).

At this time, the inverter circuit 20C continuously drives the pump motor 171 as the cooling motor, and the cooling liquid continuously circulates inside the cooling liquid circulating system 170 by the pump motor 171. The controller 30 continuously operates the pump motor 171 by continuously driving the inverter circuit 200 (step S16). The inverter circuit 20C is continuously driven until the voltage of the DC bus 110 detected by the voltage sensor 110*b* of FIG. 3 becomes a predetermined threshold value or less (step S17; No).

Then, when the voltage of the DC bus 110 becomes a predetermined threshold value or less (step S17; Yes), the controller 30 stops the driving of the inverter circuit 20C (step S18). Accordingly, the operation of the pump motor 171 is stopped, so that the DC bus voltage lowering mode is finished, and the operation of the hybrid type construction machine 1 is completely stopped.

Figure 17:
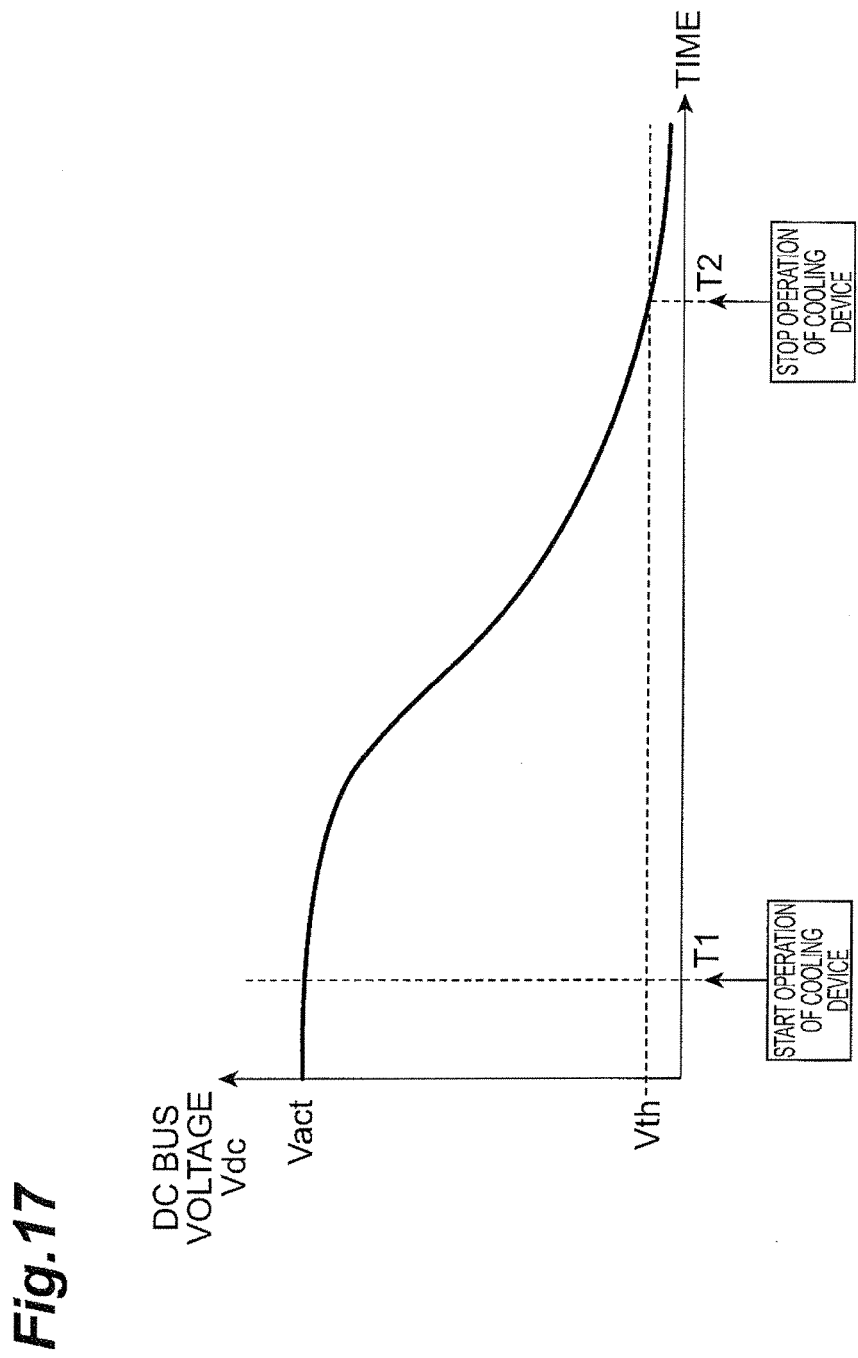
FIG. 17 is a graph illustrating an example of a transition of a voltage of a DC bus 110 in the DC bus voltage lowering mode.

FIG. 17 is a graph illustrating an example of a transition of the voltage of the DC bus 110 in the DC bus voltage lowering mode. When the switches 100E and 100F (refer to FIG. 3) enter a disconnection state while the pump motor 171 is continuously driven (the timing T1 of the drawing), the voltage Vdc of the DC bus 110 gradually decreases from the preceding voltage Vact. The decreasing speed is dependent on the consumption electricity of the pump motor 171. Then, the voltage Vdc of the DC bus 110 becomes less than a predetermined threshold value Vth (the timing T2 of the drawing), and the operation of the pump motor 171 is stopped, so that the decreasing speed of the voltage Vdc becomes smooth.

The effect obtained by the hybrid type construction machine 1 of the embodiment will be described. As described above, the hybrid type construction machine 1 includes a cooling liquid circulating pump 172 that cools the inverter units 62 to 65, the step-up/step-down converter unit 66, or the control unit 600. Then, when the voltage of the DC bus 110 is decreased with the necessity of maintenance, the controller 30 drives the pump motor 171 driving the pump 172 by the voltage of the DC bus 110, so that the voltage of the DC bus 110 is consumed. Originally, the pump 172 is mounted on the hybrid type construction machine 1 to cool the inverter units 62 to 65 or the step-up/step-down converter unit 66. Therefore, according to this method, a new component such as a resistor or a switch may not be further provided for only the DC bus voltage lowering mode. Accordingly, according to the hybrid type construction machine 1 of the embodiment, the voltage of the DC bus 110 may be decreased with a configuration suppressing a degradation in reliability.

Furthermore, the pump motor 171 is different from, for example, the electrical generator 12 driving the hydraulic pump or the working motor such as the rotation motor 21 driving the working component such as the rotation body 4. Even when the pump motor 171 is driven, the cooling liquid just circulates inside the pipe without applying a driving force to the movable portion, the working component, or the like. Therefore, according to the hybrid type construction machine 1 of the embodiment, since the voltage of the DC bus 110 may be decreased without applying a driving force to a work component or the like, the voltage of the DC bus 110 may be safely decreased.

Furthermore, in the embodiment, the controller 30 starts the DC bus voltage lowering mode whenever the operation of the hybrid type construction machine 1 is stopped. Accordingly, when the operation of the hybrid type construction machine 1 is stopped, the voltage of the DC bus 110 is decreased at all times, and the work of decreasing the voltage of the DC bus 110 during the maintenance may be omitted.

Furthermore, in the embodiment, the cooling liquid circulating system 170 including the pump motor 171 and the pump 172 cools the inverter units 62 to 65 (the inverter circuits 18A, 20A, and 20B), the step-up/step-down converter unit 66 (the step-up/step-down converter 100), and the control unit 600 (the controller 30), but even in the pump and the pump motor cooling at least one of these, the voltage of the DC bus 110 may be appropriately decreased by driving the pump motor.

Figure 7:
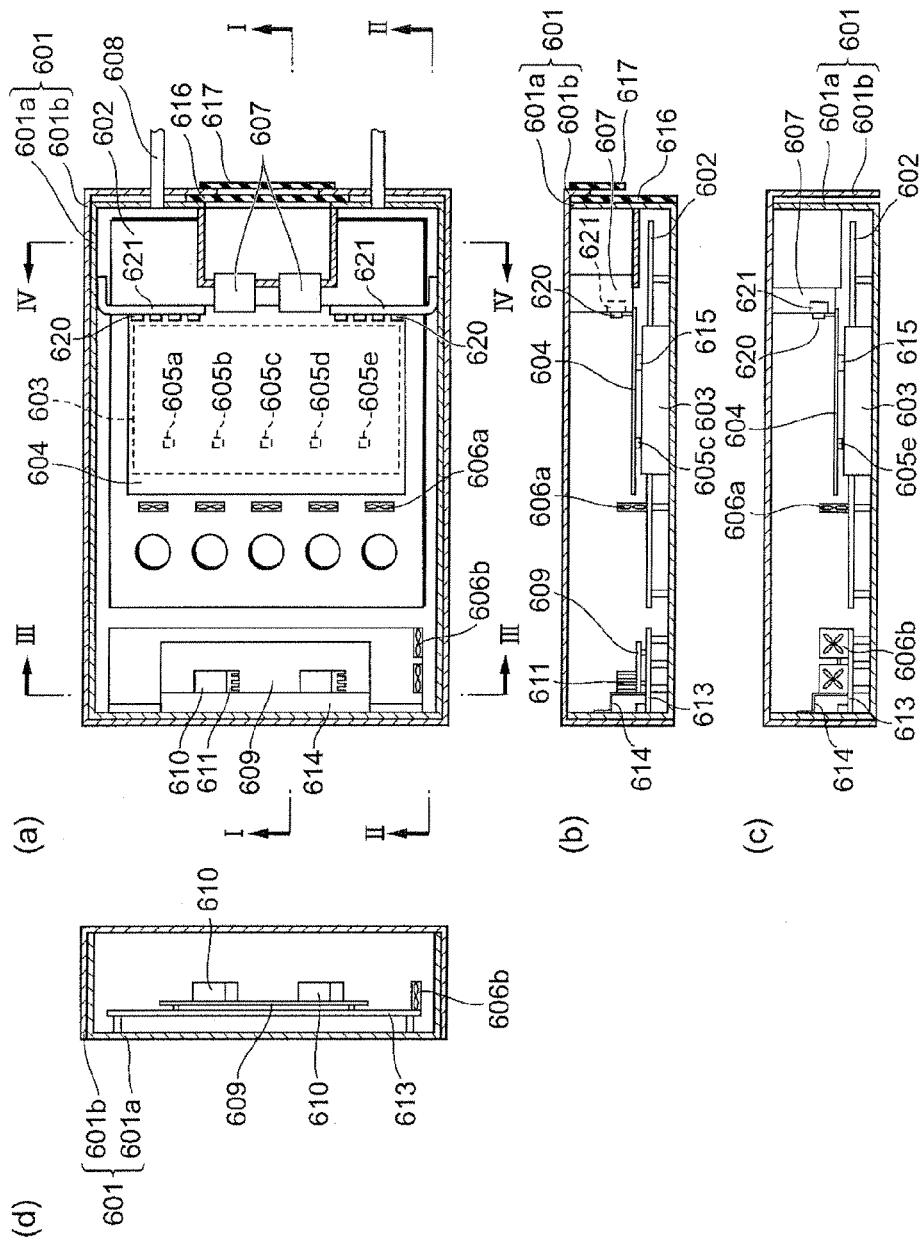
FIG. 7A is a plan cross-sectional view illustrating a control unit 600.
FIG. 7B is a side cross-sectional view taken along the line I-I of FIG. 7A.
FIG. 7C is a side cross-sectional view taken along the line II-II of FIG. 7A.
FIG. 7D is a side cross-sectional view taken along the line of FIG. 7A.
Figure 8:
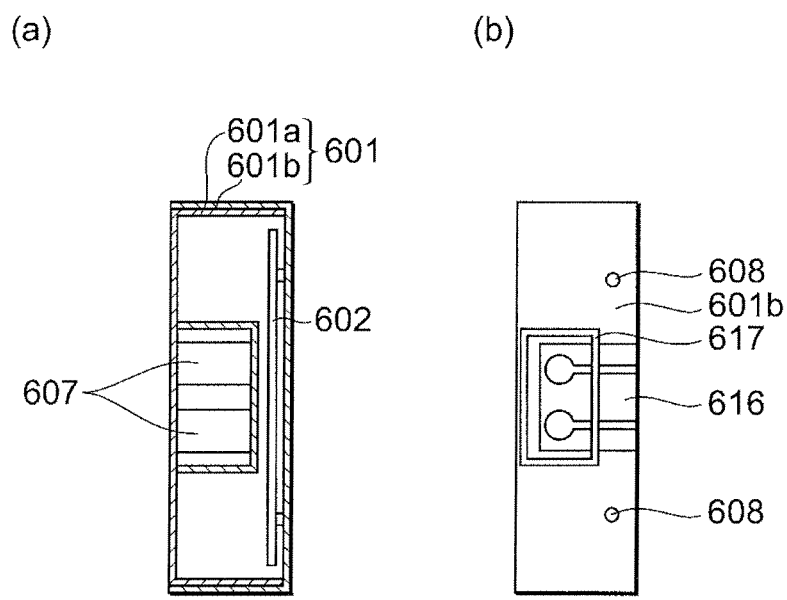
FIG. 8A is a side cross-sectional view taken along the line IV-IV of FIG. 7A.
FIG. 8B is a side view when the control unit 600 is seen from the same direction as that of FIG. 8A.

Furthermore, in the embodiment, the pump motor 171 is driven to decrease the voltage of the DC bus 110, the cooling fans 606*a* and 606*b* shown in FIG. 7 may be rotated to decrease the voltage of the DC bus 110, or such methods may be used together. Specifically, a circuit (a cooling motor driving circuit) driving a motor (that is, a cooling motor) driving the cooling fans 606*a* and 606*b* is provided between the DC bus 110 and the motor, and the circuit is controlled by the controller 30. Then, in the DC bus voltage lowering mode, the controller 30 rotates the motor by the circuit, so that the voltage of the DC bus 110 is consumed. Furthermore, in the embodiment, the cooling fan is provided only at the control unit 600, but the cooling fan may be built in any one of the inverter units 62 to 65 (the inverter circuits 18A, 20A, and 20B), the step-up/step-down converter unit 66 (the step-up/step-down converter 100), and the control unit 600 (the controller 30).

Furthermore, in the exiting hybrid type construction machine, the AC power obtained by the electrical generator needs to be converted into the DC power in order to charge the storage battery. Alternatively, the DC power of the storage battery needs to be converted into the AC power in order to drive the electrical generator. Accordingly, the inverter circuit is connected to the rear stage of the electrical generator. Furthermore, the DC voltage converter (the step-up/step-down converter) needs to be provided between the inverter circuit and the storage battery in order to control the charging and discharging of the storage battery. Furthermore, another inverter circuit is provided between the motor and the inverter circuit of the electrical generator in order to control the power running operation and the regenerative operation of the rotation motor.

Since the inverter circuit or the DC voltage converter includes a plurality of transistors for large amounts of electricity, the heating amount thereof increases. Accordingly, although it is necessary to cool the circuit component, it is difficult to ensure the sufficient cooling capability in the air-cooling method using the heat sink. Furthermore, since the cooling water of the engine has a high temperature due to the heat emitted from the engine, it is difficult to cool the circuit component by using the cooling water. Further, when the engine is stopped, the fan of the radiator is stopped, so that the radiator may not be used.

The hybrid type construction machine 1 of the embodiment includes the second cooling liquid circulating system 170 which is provided to cool the step-up/step-down converter 100 or the inverter circuits 18A, 20A, and 20B separately from the first cooling liquid circulating system 160 cooling the engine 11. Accordingly, a sufficient cooling performance may be ensured compared to the air-cooling method, and the cooling liquid may be maintained at a low temperature compared to the engine cooling liquid, so that the step-up/step-down converter 100, and the inverter circuits 18A, 20A, and 20B may be effectively cooled. Furthermore, even when the engine 11 is stopped, the step up/step-down converter and the inverter circuits may be continuously cooled as long as the pump motor 171 and the radiator 173 are operated.

Furthermore, in the embodiment, the second cooling liquid circulating system 170 cools not only the step-up/step-down converter 100 and the inverter circuits 18A, 20A, and 20B, but also the electrical generator 12 and the rotation motor 21. In the invention, this method is more desirable, whereby the electrical generator 12 and the rotation motor 21 may also be effectively cooled. Furthermore, in the second cooling liquid circulating system 170 of the embodiment, the cooling liquid is delivered from the radiator 173, passes the driver units 62 to 66 of the servo control unit 60 accommodating the step-up/step-down converter 100 and the inverter circuits 18A, 20A, and 20B, and then passes the electrical generator 12 and the rotation motor 21. In this manner, the driver units 62 to 66 each having a comparatively low temperature are cooled first, and the electrical generator 12 and the rotation motor 21 each having a comparatively high temperature are cooled, thereby further improving the cooling efficiency of the second cooling liquid circulating system 70.

Furthermore, when the DC voltage converter includes the reactor, heat is generated in the reactor when the charging and discharging of the storage battery is repeated. Then, when the temperature of the reactor increases too much, the resistivity of the reactor increases, and the conversion efficiency of the DC voltage converter is degraded. For this reason, the reactor has been air-cooled by the contact of the heat sink or the like from the past, but in the construction machine, it is difficult to sufficiently cool the reactor by using the cooling method.

That is, a working machine such as a construction machine or a carrying/unloading machine is used in lands under various climates from tropical regions to polar regions, and is also used in places where large amounts of sand dust is generated. Accordingly, it is desirable that the electrical equipment such as the DC voltage converter is accommodated in the sealed container to be isolated from the external air. However, when the DC voltage converter (particularly, the reactor) is accommodated in the sealed container in this manner, it is difficult to sufficiently cool the reactor by using the existing air-cooling method.

The hybrid type construction machine 1 of the above-described embodiment includes the cooling liquid circulating system 170 that cools the reactor 101 of the step-up/step-down converter 100. Accordingly, even when the reactor 101 is accommodated in the sealed casing of the step-up/step-down converter unit 66, the reactor 101 may be effectively cooled, and the conversion efficiency of the step-up/step-down converter 100 may be maintained while suppressing an increase in resistivity of the reactor 101.

Furthermore, the hybrid type construction machine 1 of the embodiment includes the cooling liquid circulating system 170 that is provided to cool the reactor 101 of the step-up/step-down converter 100 separately from the cooling liquid circulating system 160 cooling the engine 11. Accordingly, a sufficient cooling performance may be ensured, and the cooling liquid may have a low temperature compared to the engine cooling liquid, so that the reactor 101 may be effectively cooled. Furthermore, even when the engine 11 is stopped, the reactor 101 may be continuously cooled as long as the pump motor 171 and the radiator 173 are operated.

Furthermore, in the embodiment, the cooling liquid circulating system 170 cools not only the reactor 101, but also the electrical generator 12 and the rotation motor 21. In the invention, this method is more appropriate, whereby the electrical generator 12 and the rotation motor 21 may also be cooled more effectively. Furthermore, in the cooling liquid circulating system 170 of the embodiment, the cooling liquid is delivered from the radiator 173, passes the driver unit 174 accommodating the step-up/step-down converter 100, and then passes the electrical generator 12 and the rotation motor 21. In this manner, the step-up/step-down converter 100 having a comparatively low temperature is cooled first, and the electrical generator 12 and the rotation motor 21 each having a comparatively high temperature are cooled, thereby further improving the cooling efficiency of the cooling liquid circulating system 170.

Figure 18:
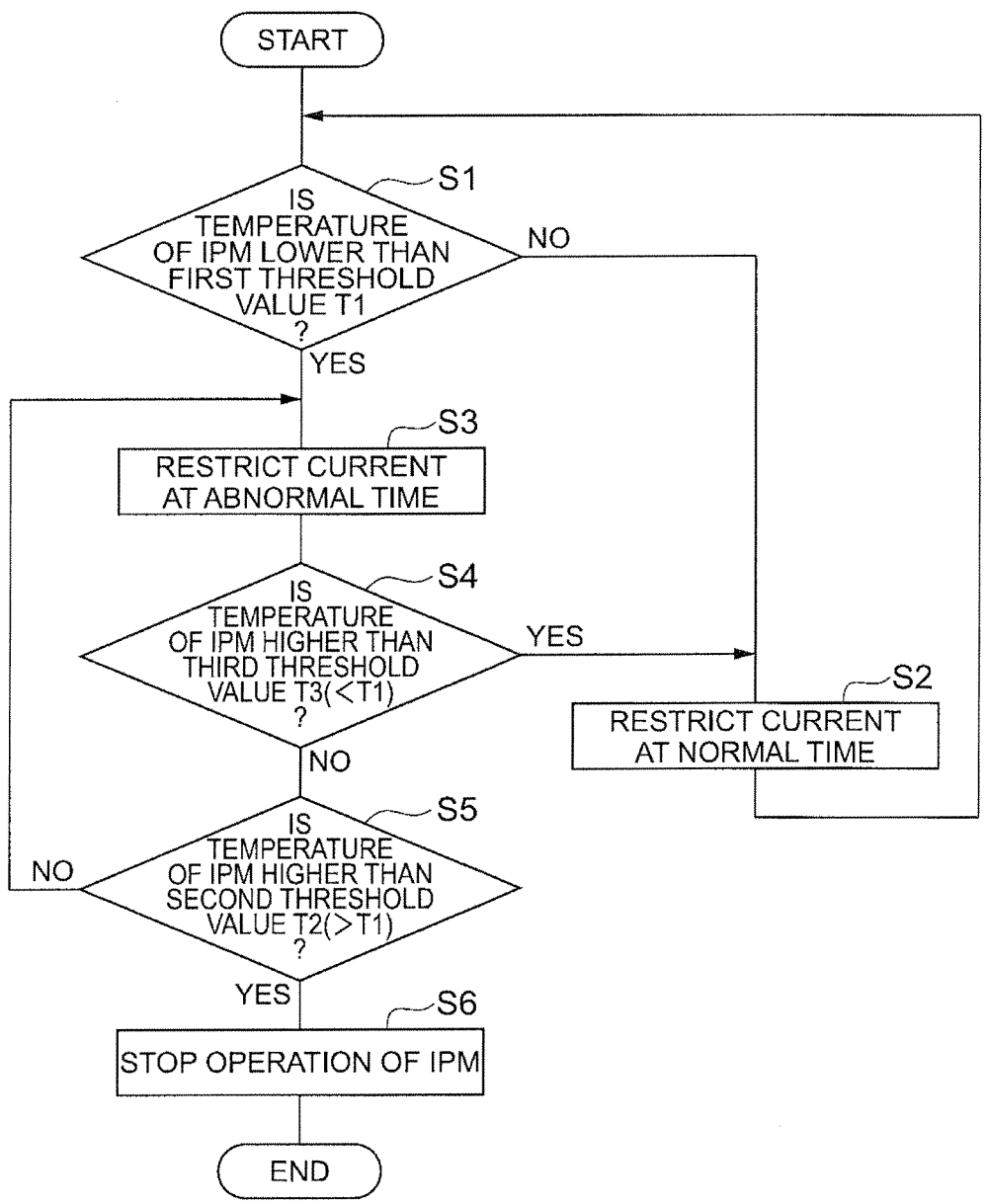
FIG. 18 is a flowchart illustrating an operation of restricting a current with respect to a step-up/step-down converter 100 and inverter circuits 18A, 20A, and 20B by a controller 30.

Here, in the operation of the hybrid type construction machine 1 of the embodiment, the current restricting operation with respect to the step-up/step-down converter 100 and the inverter circuits 18A, 20A, and 20B by using the controller 30 will be described in detail. FIG. 18 is a flowchart illustrating a current restricting operation with respect to the step-up/step-down converter 100 and the inverter circuits 18A, 20A, and 20B by using the controller 30. Furthermore, in FIGS. 19 and 20, FIGS. 19A and 20A are graphs illustrating an example of a temporal change in temperature of the IPM constituting the step-up/step-down converter 100 and the inverter circuits 18A, 20A, and 20B, and FIGS. 19B and 20B are graphs illustrating an example of a temporal change in current flowing to the step-up/step-down converter 100 and the inverter circuits 18A, 20A, and 20B.

First, the controller 30 monitors the temperature detection results from the temperature sensors 109 and 108 while operating the step-up/step-down converter 100 and the inverter circuits 18A, 20A, and 20B. Then, it is determined whether the temperature detection results from the temperature sensors 109 and 108, that is, the temperatures of the IPMs 103 and 105 are more than the first threshold value T1 (step S1). When the temperatures of the IPMs 103 and 105 are T1 or less (step S1; No), the maximum current value I1 is set so that the normal operation is not disturbed, and the circuits (the inverter circuits 18A, 20A, and 20B and the step-up/step-down converter 100) are driven so as to be not more than the maximum current value I1 (until the timing $t_1$ in step S2 shown in FIGS. 19 and 20). That is, in the inverter circuit 20A, I1 is set as the maximum driving current in the rotation motor 21. Then, in the step-up/step-down converter 100, I1 is set as the maximum discharging current from the battery 19. Furthermore, the first threshold value T1 is set to a temperature, for example, 80° C. lower than the temperature TA (for example, 100° C.) where the overheat protection function of the IPMs 103 and 105 is operated by the temperature sensor 137.

Furthermore, when the temperatures of the IPMs 103 and 105 become more than the first threshold value T1 (step S1, Yes), the controller 30 sets the maximum current value of the circuit (any one of the step-up/step-down converter 100 and the inverter circuits 18A, 20A, and 20B) value to I2 smaller than the maximum current value I1 in the normal case mentioned above, and drives the circuit so as to be not more than the maximum current value I2 (the timings $t_1$ and $t_2$ in step S3 shown in FIGS. 19 and 20). That is, in the inverter circuit 20A, the maximum driving current to the rotation motor 21 is decreased from I1 to I2. Then, in the step-up/step-down converter 100, the maximum discharging current from the battery 19 is decreased from I1 to I2.

Furthermore, when the temperatures of the IPMs 103 and 105 become equal to or less than a third threshold value T3(<T1) lower than the first threshold value T1 through the abnormal temperature, the controller 30 returns the maximum current value of the circuit to I1, and drives the inverter circuits 18A, 20A, and 20B and the step-up/step-down converter 100 so as not to be more than the maximum current value I1 (after the timing $t_2$ in step S4; Yes shown in FIG. 19).

On the other hand, the temperatures of the IPMs 103 and 105 do not become equal to or less than the third threshold value T3, the controller 30 determines whether the temperatures of the IPMs 103 and 105 become more than the second threshold value T2(>T1) higher than the first threshold value T1 while driving the circuit so that the current value does not become more than I2 (step S5). Then, when the temperatures of the IPMs 103 and 105 become more than the second threshold value T2 (step S5; Yes), the controller stops the operation of the circuit (any one of the inverter circuits 18A, 20A, and 20B and the step-up/step-down converter 100) including the IPM 103 (or the 105) (after the timing $t_2$ in step S6 shown in FIG. 20). Furthermore, the second threshold value T2 is set to be lower than the temperature TA where the overheat protection function built in the IPMs 103 and 105 is operated.

In the construction machine, the inverter circuit driving or regenerating the working motor or the step-up/step-down converter charging and discharging the battery may use the IPM. The IPM is configured in a manner such that a driving circuit including a power device such as a power MOSFET or an IGBT (Insulated Gate Bipolar Transistor) and its own protection function (for example, an overheat protection function, a short-circuit protection function, an over current protection function, and the like) protecting the power device are assembled in one package.

In general, the IPM stops the operation thereof when an abnormality is detected by the above-described own protection function. However, since the construction machine is used in lands under various climates from tropical regions to polar regions, the overheat protection function of the IPM is frequently operated in regions where the temperature is high and the IPM may be stopped often. For this reason, it is not desirable to use the IPM in such a state from the viewpoint of the reliability of the construction machine.

In order to solve this problem, in the respective units such as the inverter units 62 to 65 or the step-up/step-down converter unit 66 of the hybrid type construction machine 1, the temperature sensors 109 and 106 are provided at the outside of the IPMs 103 and 105 to detect the temperatures of the IPMs 103 and 105 separately from the temperature sensor 137 built in the IPMs 103 and 105. Then, when the temperature detection result obtained by the temperature sensors 109 and 108 becomes more than a predetermined first threshold value T1 lower than a temperature TA where the overheat protection function of the IPMs 103 and 105 is operated by the temperature sensor 137, that is, a temperature TA where the IPMs 103 and 105 are automatically stopped, the controller 30 decreases the amount of current flowing to the IPMs 103 and 105 in order to prevent the IPMs 103 and 105 from being stopped by the overheating thereof. That is, when the unit is the inverter unit 62, the maximum driving current with respect to the rotation motor 21 is decreased. Further, when the unit is the step-up/step-down converter unit 66, the maximum discharging current from the battery 19 is decreased. Accordingly, even in an area or a place having a high temperature, the overheat protection function of the IPMs 103 and 105 may be suppressed from being frequently operated, and the reliability of the hybrid type construction machine 1 may be improved. In particular, as in the embodiment, when the inverter units 62 to 65 or the step-up/step-down converter unit 66 form a sealed space, the IPMs 103 and 105 are apt to become a high temperature state. Even under this condition, the generation of abnormality may be prevented and the work may be continuously performed by decreasing the output of the IPMs 103 and 105 in advance before the overheat protection function of the IPMs 103 and 105 is operated as in the above-described configuration.

Furthermore, in the embodiment, a method has been described which decreases the maximum discharging current from the battery 19 when the unit is the step-up/step-down converter unit 66, but the maximum charging current to the battery 19 may be decreased or the maximum discharging current and the maximum charging current to the battery 19 may both be decreased.

Furthermore, as in the embodiment, when the temperature detection results obtained by the temperature sensors 109 and 108 become more than the second threshold value T2 lower than the temperature TA where the overheat protection function of the IPMs 103 and 105 is operated by the temperature sensor 137 and larger than the first threshold value T1, it is desirable that the controller 30 stops the operation of the inverter circuit 20A when the unit is the inverter unit 62 and stops the operation of the step-up/step-down converter 100 when the unit is the step-up/step-down converter unit 66. Accordingly, since the operation of the IPMs 103 and 105 may be stopped by reliably detecting the overheat of the IPMs 103 and 105 even when the temperature sensor 137 is broken or the interconnection connecting the temperature sensor 137 and the controller 30 to each other is short-circuited, the reliability of the hybrid type construction machine 1 may be further improved.

Furthermore, as in the embodiment, it is desirable that the inverter unit 62 and the step-up/step-down converter unit 66 include the metallic containers 62b and 66b having the heat radiation surfaces thermally coupled to the IPMs 103 and 105 and the temperature sensors 109 and 109 are disposed on the heat radiation surfaces of the metallic containers 62b and 66b. Accordingly, the temperatures of the IPMs 103 and 105 may be more precisely detected. In this case, as in the embodiment, it is desirable that the metallic containers 62b and 66b as the thermal conductive plates are disposed to extend along the up and down direction of the servo control unit 60 and the temperature sensors 109 and 108 are disposed above the IPMs 103 and 105 within the heat radiation surfaces of the metallic containers 62b and 66b. Since the heat radiated from the IPMs 103 and 105 is apt to be transferred upward via the metallic containers 62b and 66b, when the temperature sensors 109 and 108 are disposed above the IPMs 103 and 105, the temperatures of the IPMs 103 and 105 may be more precisely detected.

In the hybrid type construction machine, the DC power of the battery needs to be converted into the AC power in order to drive the AC motor. Furthermore, the AC power needs to be converted into the DC power in order to store the electricity obtained by the regenerative generation in the AC motor into the battery. Accordingly, the hybrid type construction machine may include the servo control unit having a plurality of driver units with an inverter circuit converting the DC power into the AC power and vice versa.

As one of the configurations of the servo control unit, there is known a method of controlling electricity converting circuits built in a plurality of driver units by using a control unit provided separately from the plurality of driver units. The control unit may include therein a plurality of CPUs respectively corresponding to the plurality of driver units in order to individually control the electricity converting circuit of each driver unit. The CPU has a large heating amount and a strict operational temperature range. For this reason, the temperature thereof needs to be controlled within a constant range.

On the other hand, in the servo control unit mounted on the construction machine usually used in harsh conditions, the control unit needs to be formed in a sealed structure for the purpose of the waterproofing and the dustproofing of the internal circuit such as the CPU. When the control unit is formed in a sealed structure, the heat generated inside the control unit is difficult to be radiated to the outside and an increase in temperature of the CPU is difficult to be suppressed. As described above, when the plurality of CPUs respectively corresponding to the plurality of driver units is built in the control unit, this problem becomes more severe.

In order to solve this problem, the control unit 600 having a sealed structure of the hybrid type construction machine 1 includes the cooling pipe 608. Then, the cooling pipe 608 is thermally coupled to the plurality of CPUs 605a to 605e, and may cool the plurality of CPUs 605a to 605e by introducing the cooling liquid from the outside of the casing 601. According to the hybrid type construction machine 1 of the embodiment, even in the sealed structure, since the plurality of CPUs 605a to 605e may be effectively cooled with this structure, an increase in temperature of the plurality of CPUs 605a to 605e may be effectively suppressed.

Furthermore, in the embodiment, the control unit 600 is placed on the step-up/step-down converter unit 66 and the inverter units 62 to 65, and the plurality of CPUs 605a to 605e inside the control unit 600 is disposed on the cooling pipe 608. That is, the cooling pipe 608 is disposed between the units 62 to 66 and the plurality of CPUs 605a to 605e.

Each of the units 62 to 66 is provided with the inverter circuit or the step-up/step-down converter circuit, but in general, the heating amount of the circuit is greater than that of the CPU or the like. Then, as in the embodiment, when the control unit 600 is placed on the units 62 to 66, the heat of the inverter circuit is apt to be transferred to the CPUs 605a to 605e inside the control unit 600. Conversely, in the embodiment, as described above, since the cooling pipe 608 is disposed between the units 62 to 66 and the CPUs 605a to 605e, the heat of the inverter circuit is difficult to be transferred the CPUs 605a to 605e, and the CPUs 605a to 605e may be more efficiently cooled.

Furthermore, as in the embodiment, it is desirable that the control unit 600 has the heat sink 603 which is provided between the CPUs 605a to 605e and the cooling pipe 608 to be thermally coupled to the CPUs 605a to 605e and the cooling pipe 608. Accordingly, the heat generated from the CPUs 605a to 605e is apt to be transferred to the cooling pipe 608, and the CPUs 605a to 605e may be more efficiently cooled.

Furthermore, as shown in FIGS. 9 and 10, the cooling pipe 608 has a shape in which one end and the other end of the plurality of pipe portions 608a are alternately connected to each other. It is desirable that each of the plurality of cooling areas 603a to 603e of the heat sink 603 is thermally coupled to two adjacent pipe portions 608a among the plurality of pipe portions 608a and in the CPUs 605a to 605e, one CPU is thermally coupled to one cooling area. When the cooling pipe 608 and the CPUs 605a to 605e are disposed to have this correlation, the length of the cooling pipe 608 for each CPU may be ensured to be sufficient, whereby the CPUs 605a to 605e may be more efficiently cooled.

Furthermore, as in the embodiment, it is desirable that the thermal conductive sheet 612 having an elastic material is disposed between the CPUs 605a to 605e and the heat sink 603. Accordingly, the heat generated from the CPUs 605a to 605e is apt to be transferred to the heat sink 603, so that the CPUs 605a to 605e may be more efficiently cooled.

Furthermore, for example, when a plurality of CPUs is mounted on separate substrates and is connected to each other via a cable interconnection, there is a concern that the reliability thereof may be degraded due to damage to the cable. However, in the embodiment, the plurality of CPUs is provided on one control card 604 and is connected to each other by the pattern interconnection formed on the control card 604. Accordingly, the interconnection is less damaged, and the reliability of the servo control unit 60 may be improved.

Furthermore, the servo control unit 60 of the embodiment includes the inverter units 62 to 65, the step-up/step-down converter unit 66, and the control unit 600 which are integrated with each other. However, the servo control unit 60 may not have such a configuration. For example, the control unit 600 may be disposed while being separated from the inverter units 62 to 65 and the step-up/step-down converter unit 66.

Furthermore, in the embodiment, an example has been described in which the plurality of CPUs 605a to 605e is provided between the control card 604 and the heat sink 603, but the effect of the embodiment may be appropriately obtained even when one CPU is provided.

Furthermore, as in the embodiment, it is desirable that the hybrid type construction machine 1 includes the cooling liquid circulating system having the radiator 173. Then, in this case, it is desirable that at least a part of the cooling liquid of the cooling liquid circulating system is delivered from the radiator 173 and sequentially passes the control unit 600 and any one of the units 62 to 66 and the AC motor 12 (21). In this manner, the control unit 600 having a comparatively low temperature is first cooled, the units 62 to 66 each having a comparatively high temperature are cooled, and then the AC motors 12 and 21 each having the higher temperature are cooled, thereby improving the cooling efficiency of the cooling liquid circulating system cooling the control unit 600.

First Modified Example

Figure 21:
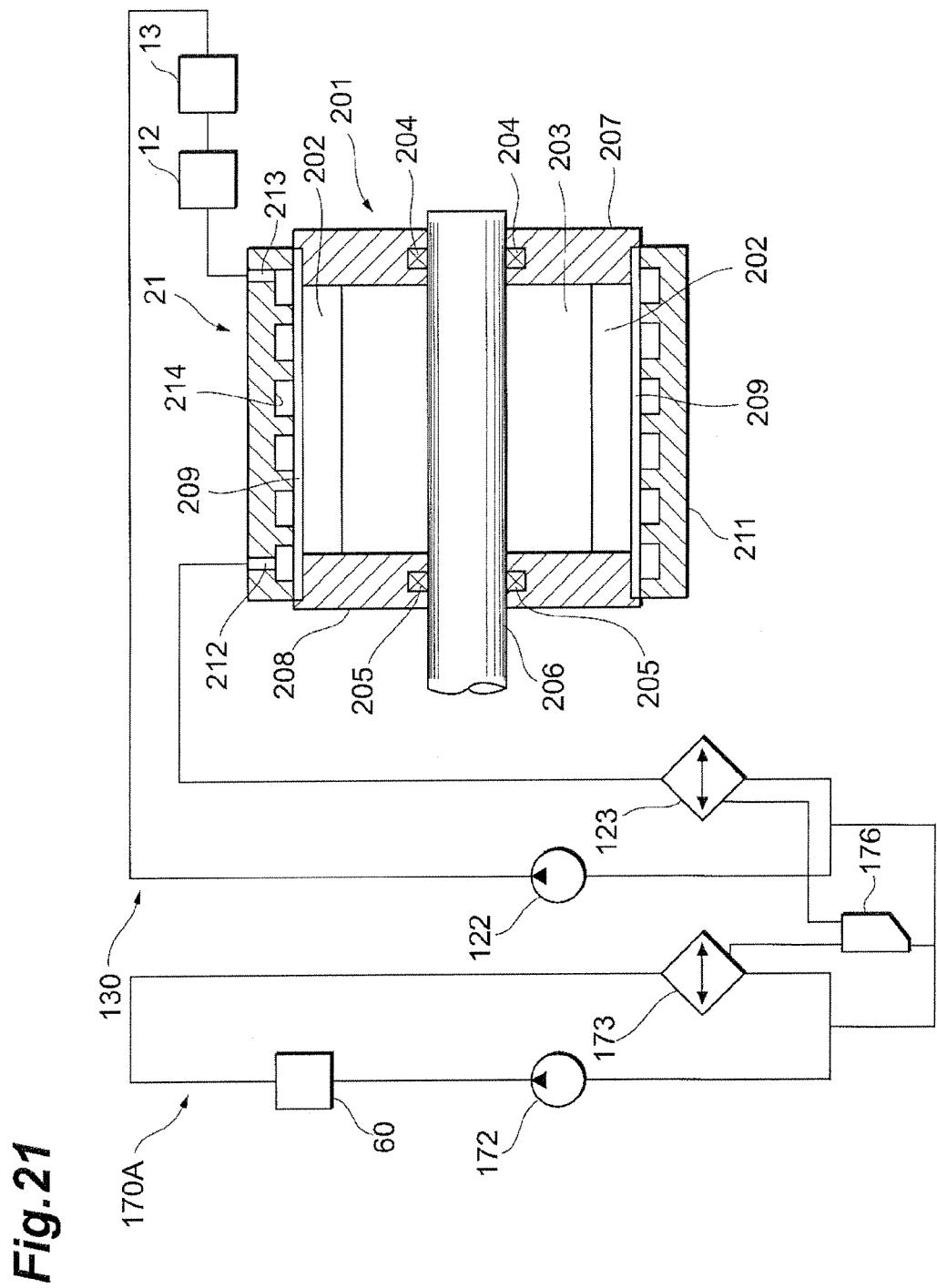
FIG. 21 is a diagram illustrating a modified example of a cooling liquid circulating system according to the above-described embodiment.

FIG. 21 is a diagram illustrating a modified example of the cooling liquid circulating system according to the above-described embodiment. As shown in FIG. 21, in the modified example, the lifting magnet vehicle includes a second cooling liquid, circulating system 170A and a third cooling liquid circulating system 130 in addition to the first cooling liquid circulating system 160 shown in FIG. 4. The second cooling liquid circulating system 170A has a configuration in which the rotation motor 21, the electrical generator 12, and the speed reducer 13 are omitted from the second cooling liquid circulating system 170 of the above-described embodiment, and includes the pump 172, the radiator 173, and the servo control unit 60 which have the same configuration as that of the above-described embodiment.

The third cooling liquid circulating system 130 is a cooling liquid circulating system which is provided to cool the electrical generator 12 and the rotation motor 21 separately from the first and second cooling liquid circulating systems 160 and 170A.

The third cooling liquid circulating system 130 includes a pump 122 driven by a pump motor (not shown) and a radiator 123. The cooling liquid circulated by the pump 122 radiates heat by the radiator 123, and is sent to the rotation motor 21. As described in FIG. 15, in the rotation motor 21, the cooling liquid flows to the cooling liquid passage 214, cools the electrical generator 12 and the speed reducer 13 in this order, and then is returned to the pump 122. Furthermore, the radiator 123 is an example of a third heat exchanger in the invention.

Furthermore, as shown in FIG. 21, it is desirable that the second and third cooling liquid circulating systems 170A and 130 are provided with a common auxiliary tank 176 which supplements the cooling liquid.

As in the example, the cooling liquid circulating system 130 may be provided to cool the electrical generator 12 and the rotation motor 21 separately from the first and second cooling liquid circulating systems 160 and 170A. In this manner, when the driver units 62 to 66 (particularly, the reactor 101) of the servo control unit 60 having a comparatively low temperature and the electrical generator 12 and the rotation motor 21 each having a comparatively high temperature are independently cooled, the cooling efficiency may be further improved.

Second Modified Example

Figure 22:
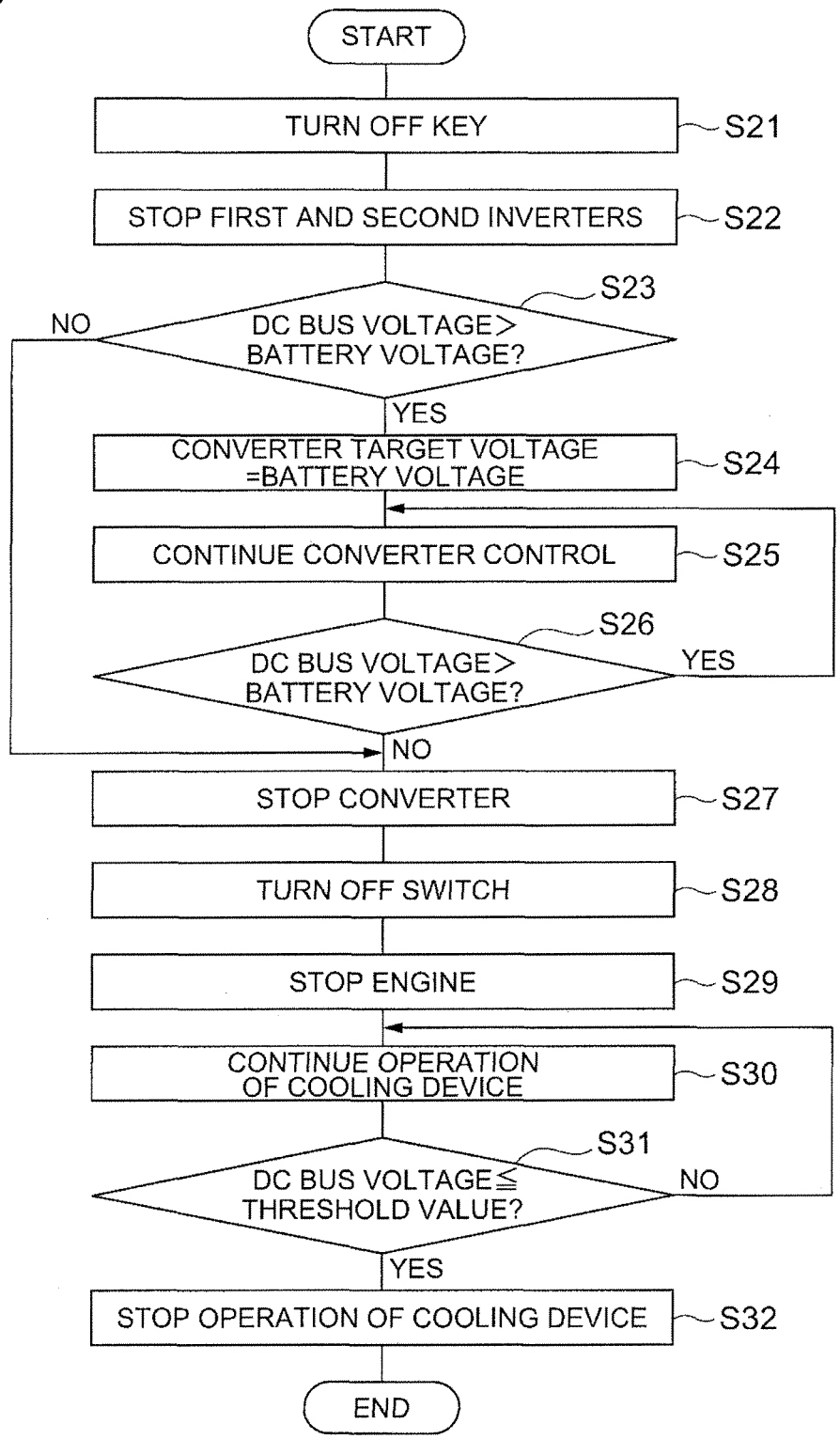
FIG. 22 is a flowchart illustrating an operation of the hybrid type construction machine 1 in the DC bus voltage lowering mode according to a modified example.

Next, a modified example of the DC bus voltage lowering mode of the above-described embodiment will be described. FIG. 22 is a flowchart illustrating an operation of the hybrid type construction machine 1 in the DC bus voltage lowering mode according to a modified example. First, the ignition key 40 is operated by the operator to stop the operation of the hybrid type construction machine 1 (step S21). Furthermore, even in the modified example, the controller 30 starts the DC bus voltage lowering mode whenever the operation of the hybrid type construction machine 1 is stopped. That is, the controller 30 stops the driving of the inverter circuits 18A, 20A, and 20B when receiving the operation of the key 40 (step S22). Accordingly, the supply of the electricity to the electrical generator 12, the rotation motor 21, and the lifting magnet 7 is stopped.

Next, the controller 30 compares the voltage value of the DC bus 110 detected by the voltage sensor 110b shown in FIG. 3 with the voltage across both ends of the battery 19 (step S23). Then, when the voltage value of the DC bus 110 is greater than the voltage across both ends of the battery 19 (step S23; Yes), the target voltage of the DC bus 110 in the step-up/step-down converter 100 is set to be equal to the voltage across both ends of the battery 19 (step S24), and the step-up/step-down converter 100 is continuously driven (step S25). Then, the step-up/step-down converter 100 is driven to charge the battery 19 while the voltage value of the DC bus 110 is greater than the voltage across both ends of the battery 19 (step S26; Yes).

When the voltage value of the DC bus 110 becomes equal to or less than a voltage across both ends of the battery 19 (step S26; No or step S23; No), the controller 30 stops the driving of the step-up/step-down converter 100 (step S27). Then, the controller 30 allows the switches 100E and 100F (refer to FIG. 3) between the step-up/step-down converter 100 and the battery 19 to be in a disconnection state (step S28). Accordingly, the DC bus 110 and the battery 19 are electrically separated from each other. Then, the controller 30 instructs the ECU or the like of the engine 11 to stop the engine 11 (step S29).

At this time, the inverter circuit 20C continuously drives the pump motor 171 as the cooling motor, and the cooling liquid continuously circulates inside the cooling liquid circulating system 170 by the pump motor 171. The controller 30 continuously operates the pump motor 171 by continuously driving the inverter circuit 20C (step S30). The inverter circuit 20C is continuously driven until the voltage of the DC bus 110 detected by the voltage sensor 110b becomes a predetermined threshold value or less (step S31; No). Furthermore, the appropriate value of the predetermined threshold value is the same as that of the above-described embodiment.

Then, when the voltage of the DC bus 110 becomes a predetermined threshold value or less (step S31; Yes), the controller 30 stops the driving of the inverter circuit 20C (step S32). Accordingly, the operation of the pump motor 171 is stopped, so that the DC bus voltage lowering mode is finished, and the operation of the hybrid type construction machine 1 is completely stopped.

In the modified example, as in the above-described embodiment, in the DC bus voltage lowering mode, the controller 30 consumes the voltage of the DC bus 110 by driving the pump motor 171 by the voltage of the DC bus 110. Accordingly, it is not necessary to newly provide a component such as a resistor or a switch only for the DC bus voltage lowering mode, and the voltage of the DC bus 110 may be decreased with a configuration suppressing a degradation in reliability. Furthermore, since the pump motor 171 does not apply a driving force to a movable portion or a working component, the voltage of the DC bus 110 may be safely decreased.

Furthermore, as in the modified example, when the voltage of the DC bus 110 is higher than the voltage across both ends of the battery 19 when starting the DC bus voltage lowering mode, it is desirable that the step-up/step-down converter 100 is driven to charge the battery 19 before the switches 100E and 100F enter a disconnection state. Accordingly, at least a small amount of the voltage of the DC bus 110 may be stored in the battery 19, and energy efficiency may be further improved.

Figure 23:
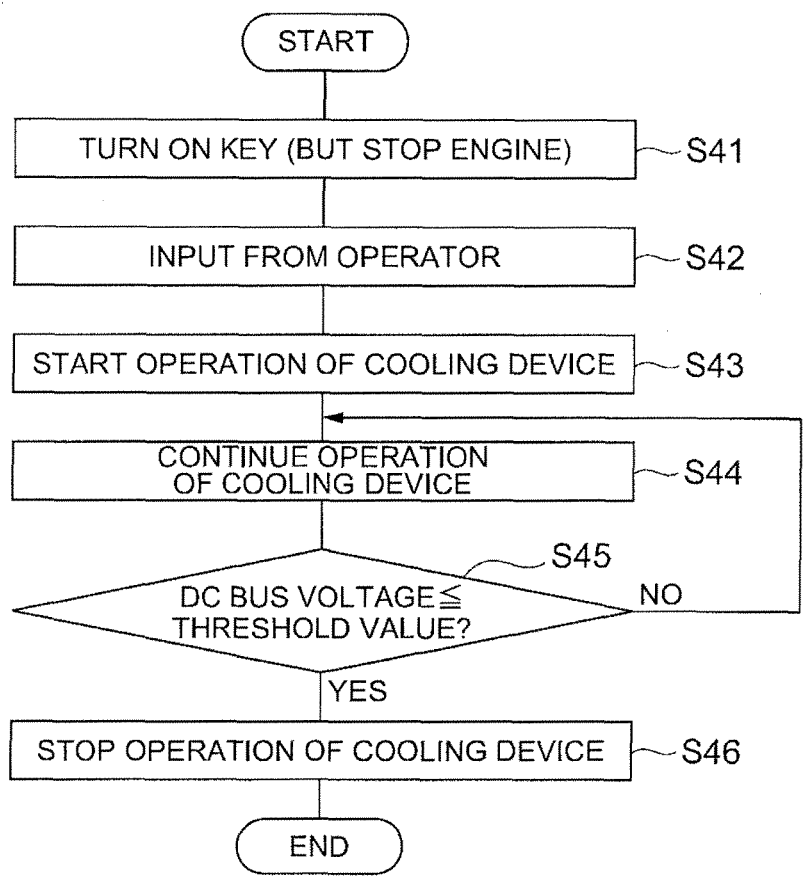
FIG. 23 is a flowchart illustrating an operation of the hybrid type construction machine 1 in the DC bus voltage lowering mode according to another modified example.

Another modified example of the DC bus voltage lowering mode of the above-described embodiment will be described. FIG. 23 is a flowchart illustrating an operation of the hybrid type construction machine 1 in the DC bus voltage lowering mode according to another modified example. In the modified example, when the input related to the start of the DC bus voltage lowering mode is performed by the operator via the operation panel inside the operation room 4a (refer to FIG. 1) while the operation of the hybrid type construction machine 1 is stopped, the controller 30 starts the DC bus voltage lowering mode.

First, the ignition key 40 is operated by the operator, so that the electricity is supplied to the hybrid type construction machine 1 (step S41). Furthermore, at this time, the engine 11 is stopped, and the inverter circuits 18A and 20A to 20C are stopped. Then, the controller 30 receives an input related to the start of the DC bus voltage lowering mode from the operator (step S42), and starts the driving of the inverter circuit 20C (step S43). That is, the inverter circuit 200 starts the driving of the pump motor 171 as the cooling motor, and the cooling liquid starts to circulate inside the cooling liquid circulating system 170 by the pump motor 171. The controller 30 continuously operate the pump motor 171 by continuously driving the inverter circuit 20C (step S44), and the inverter circuit 20C is continuously driven until the voltage of the DC bus 110 detected by the voltage sensor 110b becomes a predetermined threshold value or less (step S45; No). Furthermore, the appropriate value of the predetermined threshold value is the same as that of the above-described embodiment.

Then, when the voltage of the DC bus 110 becomes a predetermined threshold value or less (step S45; Yes), the controller 30 stops the driving of the inverter circuit 20C (step S46). Accordingly, the operation of the pump motor 171 is stopped, so that the DC bus voltage lowering mode is finished.

In the modified example, as in the above-described embodiment, in the DC bus voltage lowering mode, the controller 30 consumes the voltage of the DC bus 110 by driving the pump motor 171 by the voltage of the DC bus 110. Accordingly, it is not necessary to newly provide a component such as a resistor or a switch for only the DC bus voltage lowering mode, and the voltage of the DC bus 110 may be decreased with a configuration suppressing a degradation in reliability. Furthermore, since the pump motor 171 does not apply a driving force to a movable portion or a working component, the voltage of the DC bus 110 may be safely decreased.

Furthermore, as in the modified example, when the input is generated from the operator while the operation of the hybrid type construction machine 1 is stopped, the controller 30 may start the DC bus voltage lowering mode. Accordingly, the voltage of the DC bus 110 may be decreased in accordance with the necessity of the operator.

Here, in the above-described embodiment, a case has been described in which a heating unit such as the servo control unit 60, the rotation motor 21, the electrical generator 12, and the speed reducer 13 are all cooled after the key is turned off, but in the working machine according to the invention, the cooling motor may cool at least the control unit 600. Since the control unit 600 has a sealed structure, the electronic component disposed inside the control unit 600 is not cooled by the external air. For this reason, when the circulation of the cooling liquid in the control unit 600 is stopped immediately after the key is turned off, the heat may not be taken from the electronic component inside the control unit 600 having a high temperature by the operation via the heat sink, and the temperature of the electronic component inside the control unit 600 or the temperature of the air inside the casing 601 increases. Conversely, when the circulation of the cooling liquid of the control unit 600 is continued after the key is turned off, the lifespan of the electronic component inside the control unit 600 may be extended.

Figure 24:
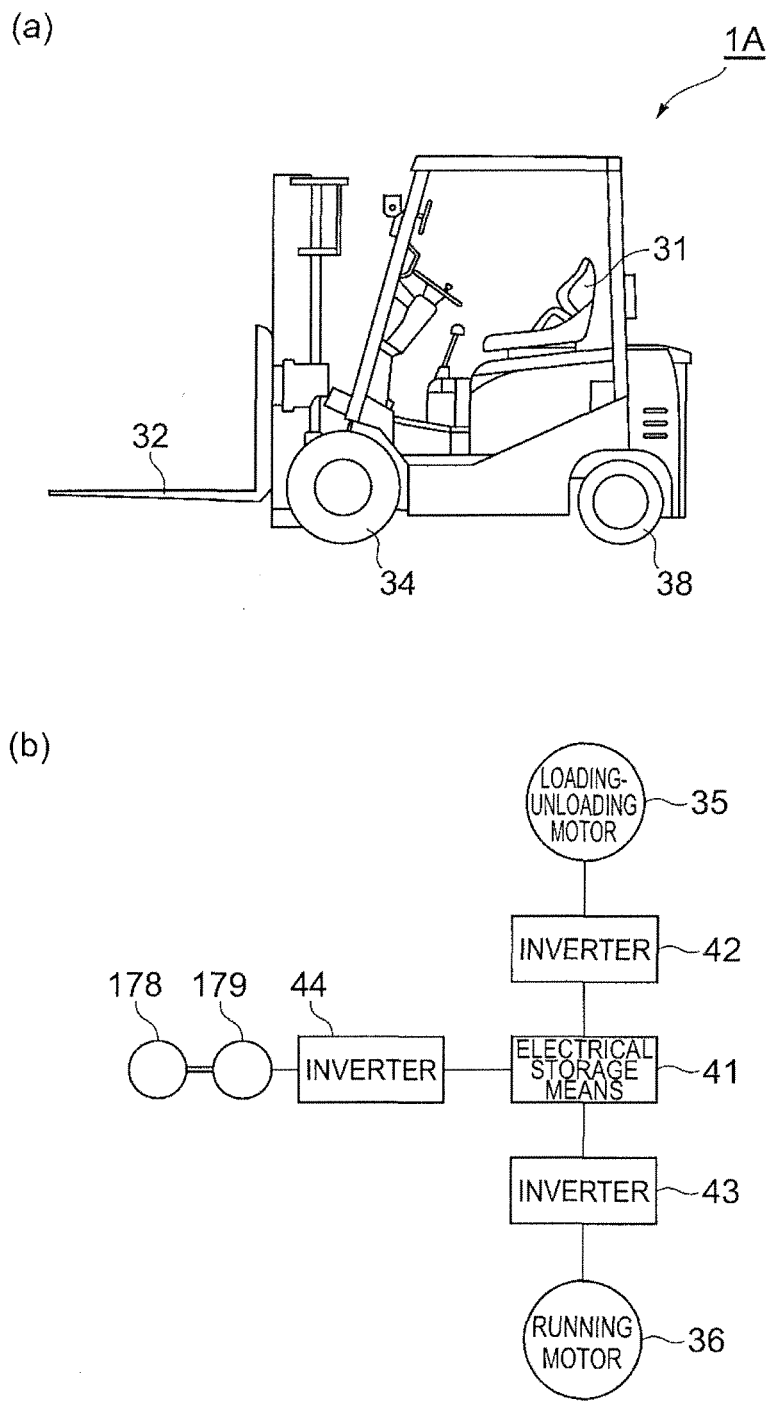
FIG. 24A is a diagram illustrating an external shape of a forklift 1A as a working machine.
FIG. 24B is a schematic configuration diagram illustrating an electric system provided in the forklift 1A.

An example will be described in which the invention is applied to another working machine. FIG. 24A is a diagram illustrating an external shape of a forklift 1A as the working machine. As shown in FIG. 24A, the forklift 1A is a so-called counter type forklift of which the vehicle body becomes balanced by installing a weight at the rear of the vehicle body.

The forklift 1A includes a driver seat 31 on which the operator sits, a fork 32, wheels 34 and 38, and the like. The fork 32 is used to elevate baggage, and the fork 32 is provided at the front side of the driver seat 31. Two wheels 34 are provided in front of the driver seat 31, and two wheels 38 are provided to the rear of the driver seat. The wheels 38 disposed to the rear of the driver seat 31 are steering wheels. On the other hand, the wheels 34 disposed in front of the driver seat 31 are driving wheels.

FIG. 24B is a schematic configuration diagram of an electrical system provided in the forklift 1A. The forklift 1A includes inverter circuits 42 and 43, and the inverter circuits 42 and 43 are driven by the DC power from an electrical storage means (an electrical storage unit) 41. The inverter circuit 42 drives a loading and unloading motor 35 by converting DC power into AC power. On the other hand, the inverter circuit 43 drives a running motor 36. The loading and unloading motor 35 is a working motor which elevates the fork 32, and the running motor 36 is a working motor which drives the wheel 34. The inverter circuits 42 and 43 are driven by a controller (not shown). Furthermore, the configurations of the electrical storage means 41, the inverter unit having the inverter circuits 42 and 43, and the control unit having the controller may be the same as those of the electrical storage means 120, the inverter units 62 to 65, and the control unit 600.

Furthermore, the forklift 1A includes a cooling liquid circulating system which cools the inverter circuits 42 and 43 and the step-up/step-down converter of the electrical storage means 41. That is, the forklift 1A includes a pump 78 which circulates a cooling liquid, a pump motor (a cooling motor) 79 driving the pump 78, and an inverter circuit 44 connected between the pump motor 79 and the electrical storage means 41. The inverter circuit 44 is driven by a controller (not shown) in the same manner as the inverter circuits 42 and 43.

Then, the controller includes a DC bus voltage lowering mode for decreasing the voltage of the DC bus of the electrical storage means 41. Then, in the DC bus voltage lowering mode, the inverter circuits 42 and 43 are stopped, and the inverter circuit 44 is driven to consume the electricity in the pump motor 79, thereby decreasing the voltage of the DC bus.

Furthermore, the forklift 1A includes the driver seat 31 on which the operator sits, the fork 32, the wheels 34 and 38, and the like. The fork 32 is used to elevate baggage, and the fork 32 is provided at the front side of the driver seat 31. Two wheels 34 are provided in front of the driver seat 31, and two wheels 38 are provided to the rear of the driver seat. The wheels 38 disposed to the rear of the driver seat 31 are steering wheels. On the other hand, the wheels 34 disposed in front of the driver seat 31 are driving wheels.

Figure 25:
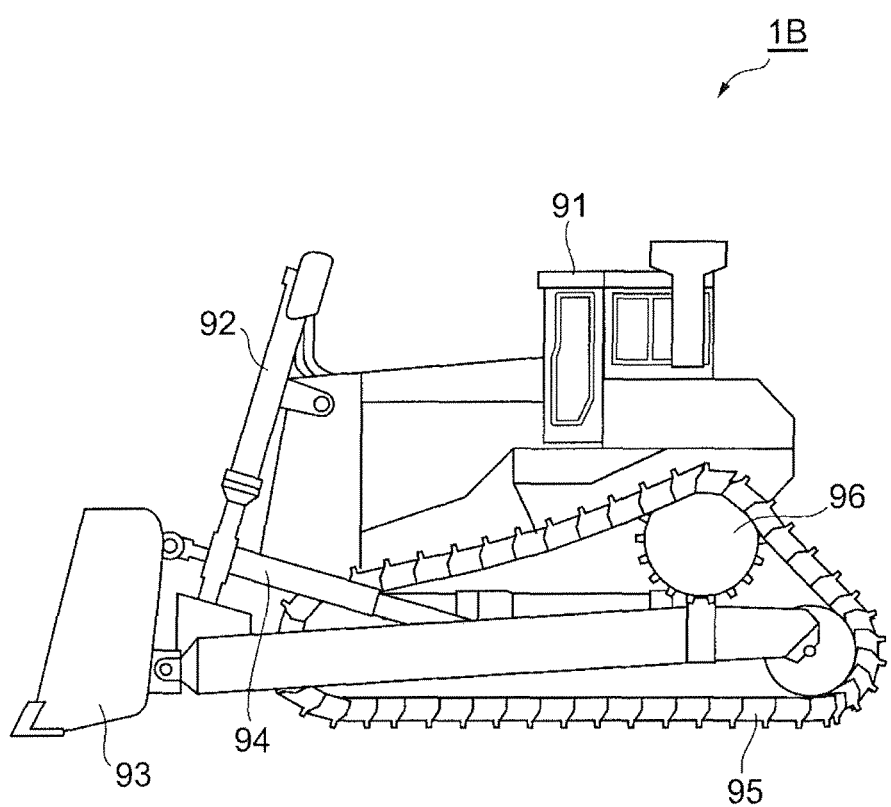
FIG. 25 is a diagram illustrating an external shape of a bulldozer 1B as a working machine.

Furthermore, FIG. 25 is a diagram illustrating an external shape of a bulldozer 1B as the working machine. The bulldozer 18 includes a driver seat 91 on which the operator sits, a lift cylinder 92, a blade 93, a tilt cylinder 94, a crawler 95, a left driving wheel 96, and a right driving wheel (not shown), and the like.

Figure 26:
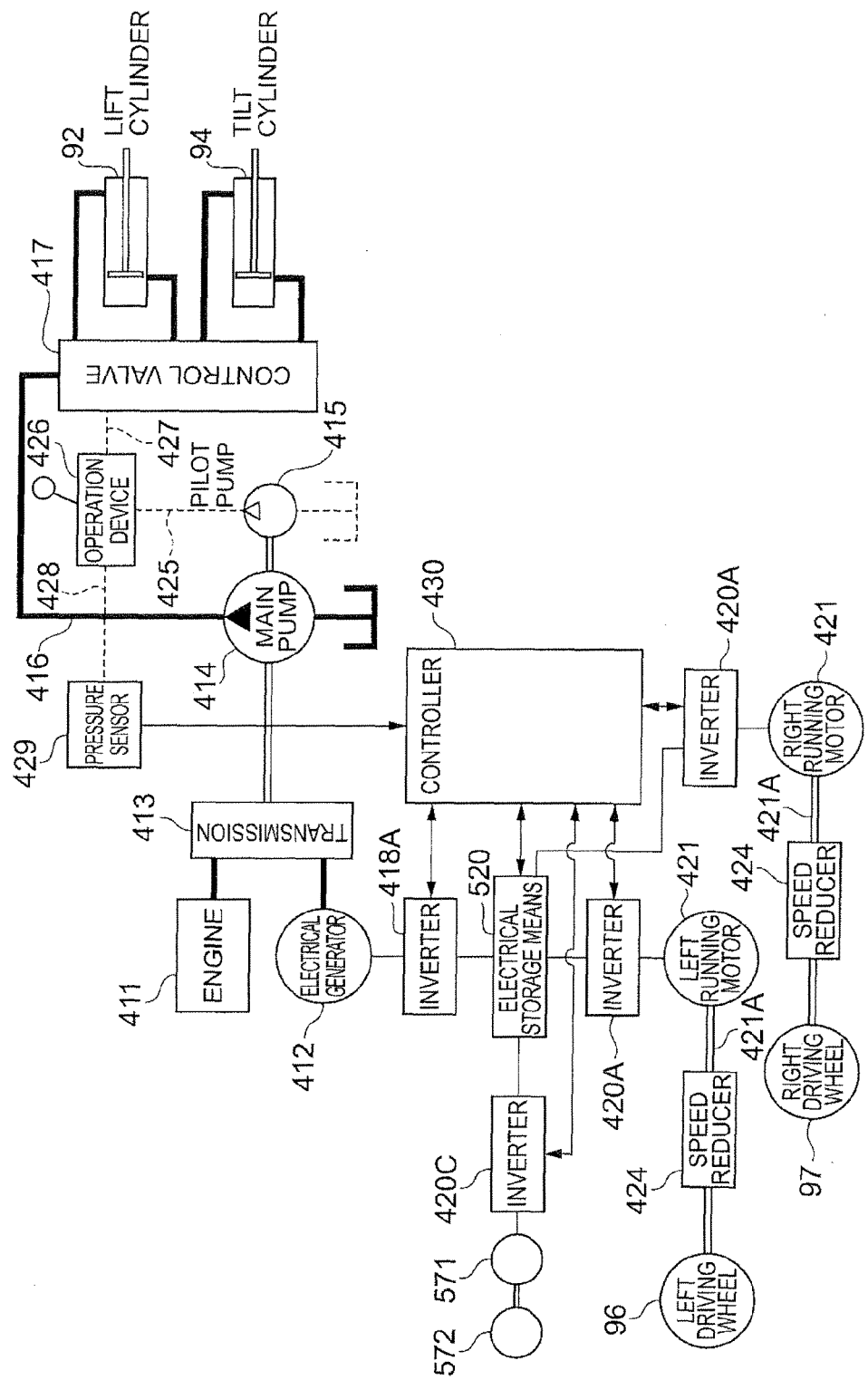
FIG. 26 is a block diagram illustrating an internal configuration such as an electric system or a hydraulic system of the bulldozer 1B.

FIG. 26 is a block diagram illustrating an internal configuration of an electric system or a hydraulic system of the bulldozer 1B. As shown in FIG. 26, the bulldozer 13 includes an electrical generator 412 and a transmission 413, and the rotary shafts of the engine 411 and the electrical generator 412 are all connected to the input shaft of the transmission 413, so that the rotary shafts are connected to each other. When a load of an engine 411 is large, the electrical generator 412 assists the driving force of the engine 411 by driving the engine 411 as a working component, so that the driving force of the electrical generator 412 is transferred to a main pump 414 via the output shaft of the transmission 413. On the other hand, when the load of the engine 411 is small, the driving force of the engine 411 is transferred to the electrical generator 412 via the transmission 413, so that the electrical generator 412 generates electricity. The electrical generator 412 is configured as, for example, an IPM motor in which a magnet is embedded in a rotor. The driving and the generation of the electricity of the electrical generator 412 are switched by a controller 430 controlling the driving of the electrical system in the bulldozer 13 in accordance with the load or the like of the engine 411.

The main pump 414 and a pilot pump 415 are connected to the output shaft of the transmission 413, and a control valve 417 is connected to the main pump 414 via a high pressure hydraulic line 416. The control valve 417 is a device which controls the hydraulic system in the bulldozer 1B. The lift cylinder 92 and the tilt cylinder 94 are connected to the control valve 417 via the high pressure hydraulic line, and the control valve 417 controls the hydraulic pressure supplied thereto in accordance with the operator's input.

The output terminal of the inverter circuit 418A is connected to the electrical terminal of the electrical generator 412. An electrical storage means (an electrical storage unit) 520 is connected to the input terminal of the inverter circuit 418A. The configuration of the electrical storage means 520 is the same as that of the electrical storage means 120 of the above-described embodiment. Furthermore, the operation of the inverter circuit 418A is the same as that of the inverter circuit 18A of the above-described embodiment.

Two inverter circuits 420A are connected to the electrical storage means 520. A running motor (an AC motor) 421 as a working motor is connected to one end of each of the inverter circuit 420A, and the other end of the inverter circuit 420A is connected to the electrical storage means 520. The running motor 421 is a power source for the left driving wheel 96 and the right driving wheel 97. A speed reducer 424 is connected to the rotary shaft 421A of the running motor 421. The speed reducer 424 is a speed reducer which decreases the rotation speed of the rotary shaft 421A of the running motor 421 and mechanically transfers the rotation to the left driving wheel 96 and the right driving wheel 97. Furthermore, the operation of the running motor 421 is the same as that of the above-described rotation motor 21.

The bulldozer 1B includes a cooling liquid circulating system for the electrical system. The cooling liquid circulating system includes a pump 572 which circulates the cooling liquid supplied to the step-up/step-down converter and the inverter circuits 418A and 420A and a pump motor 571 which drives the pump 572. The pump motor 571 is connected to the electrical storage means 520 via an inverter circuit 420C. The inverter circuit 420C supplies electricity necessary for the pump motor 571 on the basis of the instruction from the controller 430. The cooling liquid circulating system cools the inverter circuits 418A and 420A and the controller 430. Furthermore, the cooling liquid circulating system cools the electrical generator 412, the transmission 413, and the running motor 421.

An operation device 426 is connected to the pilot pump 415 via a pilot line 425. The operation device 426 is an operation device which is used to operate the running motor 421, the lift cylinder 92, and the tilt cylinder 94, and is operated by the operator. The control valve 417 is connected to the operation device 426 via a hydraulic line 427, and, a pressure sensor 429 is connected thereto via a hydraulic line 428. The operation device 426 converts a hydraulic pressure (a primary hydraulic pressure) supplied via the pilot line 425 into a hydraulic pressure (a secondary hydraulic pressure) in accordance with an amount operated by the operator, and outputs the converted hydraulic pressure. The secondary hydraulic pressure output from the operation device 426 is supplied to the control valve 417 via the hydraulic line 427, and is detected by the pressure sensor 429.

The configuration and the function of a controller (a control unit) 430 are the same as those of the above-described controller 30. Furthermore, the configurations of the electrical storage means 520, the inverter unit having the inverter circuits 418A and 420A, and the control unit having the controller 430 may be the same as those of the electrical storage means 120, the inverter units 62 to 65, and the control unit 600.

Then, the controller 430 has a DC bus voltage lowering mode for decreasing the voltage of the DC bus of the electrical storage means 520. Then, in the DC bus voltage lowering mode, the inverter circuits 416A and 420A are stopped, and the inverter circuit 420C is driven to consume the electricity in the pump motor 571, thereby decreasing the voltage of the DC bus.

The working machine according to the invention is not limited to the above-described embodiment, but may be modified into various forms. For example, in the above-described embodiment, the lifting magnet vehicle and the forklift are exemplified as the working machine, but the invention may be applied to any working machine (for example, an excavator, a wheel loader, or a crane).

Second Embodiment

Since an electrical generator, an AC motor for rotation, and a driving control device (an inverter or the like) controlling the driving of the devices generate heat due to the electricity consumed by the operation thereof, the hybrid type construction machine includes a cooling mechanism which cools the devices. Furthermore, in order to prevent burnout caused by the abnormal temperature of the device, the driving control device or the like has a configuration in which the operation thereof is stopped when the temperature becomes a threshold value or greater. On the other hand, in the construction site where the construction machine is used, it is desirable that the continuous operation is possible in order to improve work efficiency. When the driving control device or the like is stopped due to an increase in temperature, the continuous operation is not possible, and work efficiency is degraded. Hereinafter, a hybrid type construction machine will be described which may improve work efficiency by realizing a continuous operation.

Figure 27:
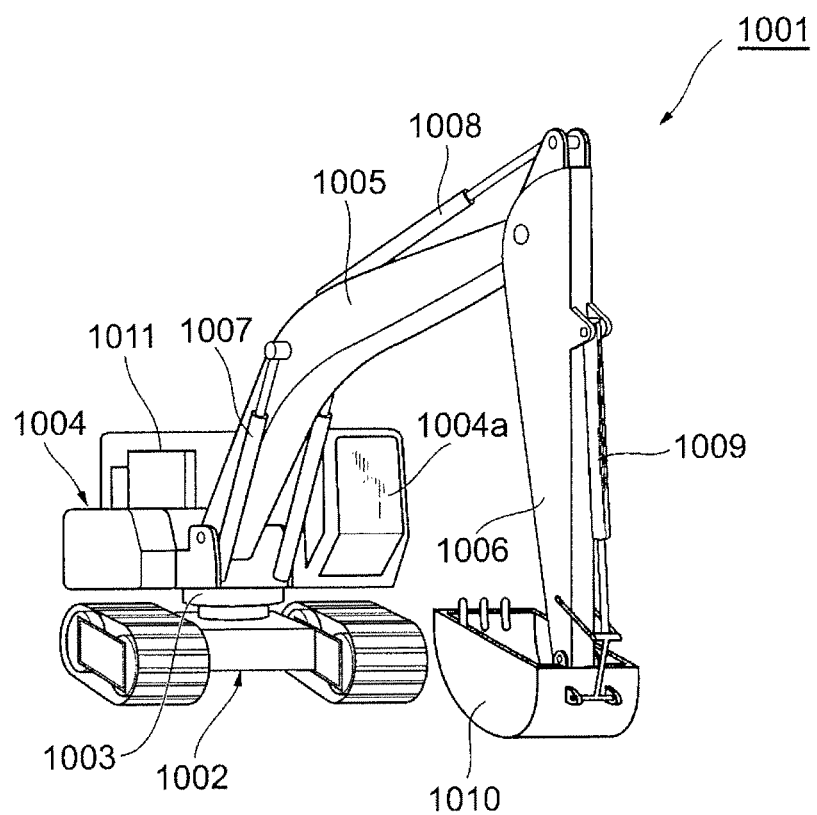
FIG. 27 is a perspective view illustrating an external shape of an excavator 1001 of a second embodiment of the working machine according to the invention.

FIG. 27 is a perspective view illustrating an external shape of an excavator 1001 as an example of the working machine according to the invention. As shown in FIG. 27, the excavator 1001 includes a running mechanism 1002 which has a caterpillar track and a rotation body 1004 which is rotatably mounted on the upper portion of the running mechanism 1002 via a rotation mechanism 1003. To the rotation body 1004 is attached a boom 1005, an arm 1006 link-connected to the front end of the boom 1005, and a bucket 1010 link-connected to the front end of the arm 1006. The bucket 1010 is equipment which is used to adsorb and catch a load G such as steel by a magnetic force. The boom 1005, the arm 1006, and the bucket 1010 are hydraulically driven by, respectively, a boom cylinder 1007, an arm cylinder 1008, and a bucket cylinder 1009. Furthermore, the rotation body 1004 is provided with an operation room 1004a accommodating an operator performing an operation of adjusting the position of the bucket 1010 or a magnetization operation and a release operation or a power source such as an engine 1011 generating a hydraulic pressure. The engine 1011 is configured as, for example, a diesel engine.

Figure 28:
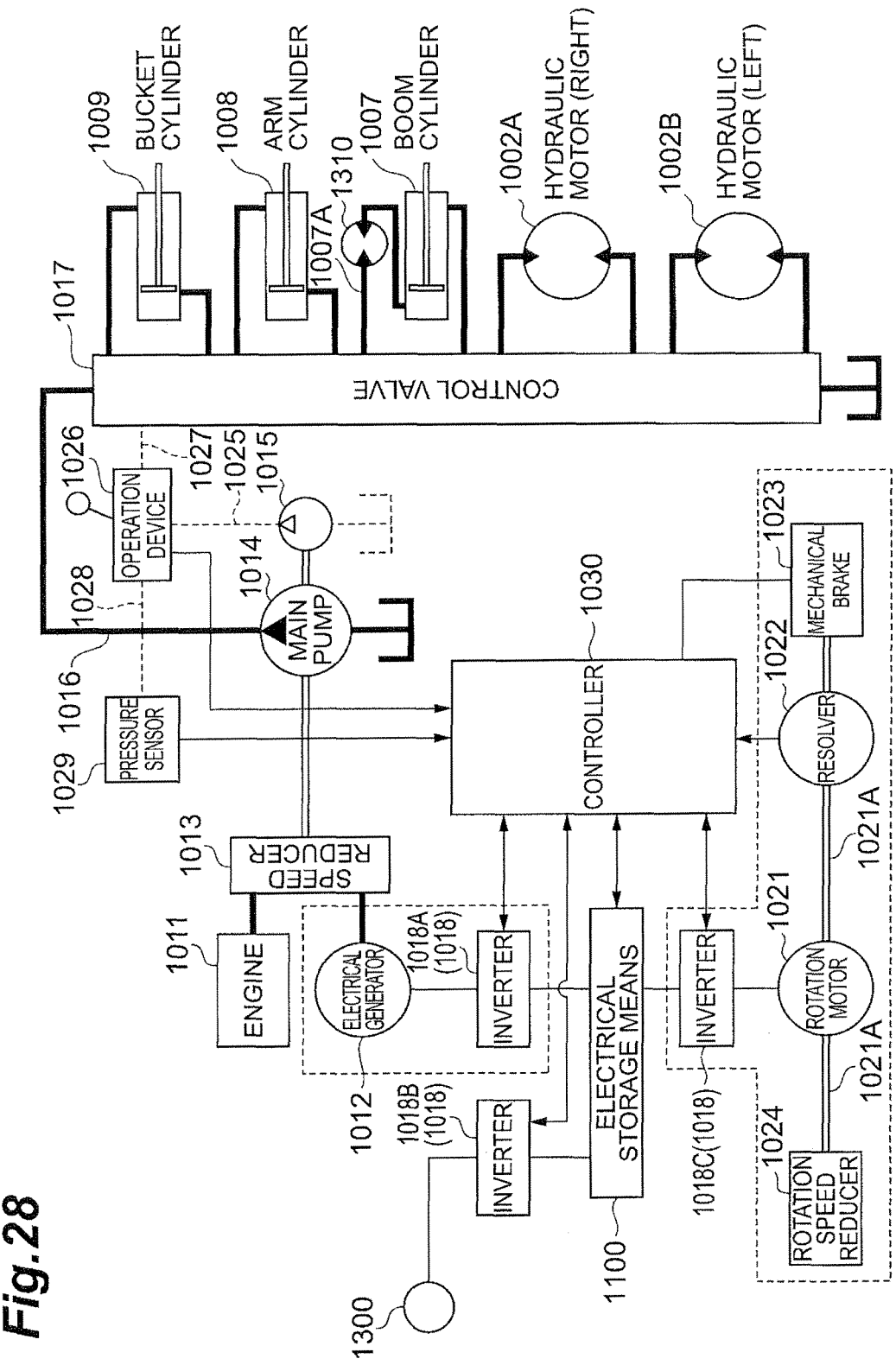
FIG. 28 is a block diagram illustrating an internal configuration such as an electric system or a hydraulic system of the excavator 1001 of the second embodiment.

FIG. 28 is a block diagram illustrating an internal configuration such as the electric system or the hydraulic system of the excavator 1001 of the embodiment. Furthermore, in FIG. 28, the system mechanically transferring power is depicted by a double line, the hydraulic system is depicted, by the thick solid line, the operation system is depicted by the dashed line, and the electrical system is depicted by the thin solid line.

As shown in FIG. 28, the excavator 1001 includes an electrical generator 1012 and a speed reducer 1013, and the rotary shafts of the engine 1011 and the electrical generator 1012 are all connected to the input shaft of the speed reducer 1013, so that the rotary shafts are connected to each other. When the load of the engine 1011 is large, the electrical generator 1012 assists the driving force of the engine 1011 by using its own driving force, so that the driving force of the electrical generator 1012 is transferred to a main pump 1014 via the output shaft of the speed reducer 1013. On the other hand, when the load of the engine 1011 is small, the driving force of the engine 1011 is transferred to the electrical generator 1012 via the speed reducer 1013, so that the electrical generator 1012 generates electricity. The electrical generator 1012 is configured as, for example, an IPM (Interior Permanent Magnetic) motor in which a magnet is embedded in a rotor. The driving and the generation of electricity of the electrical generator 1012 are switched by a controller (a control unit) 1030 controlling the driving of the electrical system of the excavator 1001 in accordance with the load or the like of the engine 1011.

The main pump 1014 and the pilot pump 1015 are connected to the output shaft of the speed reducer 1013, and a control valve 1017 is connected to the main pump 1014 via a high pressure hydraulic line 1016. The control valve 1017 is a device that controls the hydraulic system of the excavator 1001. The boom cylinder 1007, the arm cylinder 1008, and the bucket cylinder 1009 are connected to the control valve 1017 via the high pressure hydraulic line in addition to hydraulic motors 1002A and 1002B driving the running mechanism 1002 shown in FIG. 27, and the control valve 1017 controls the hydraulic pressure supplied thereto in accordance with the operator's input.

An output terminal of an inverter 1018A (a second driving control means) is connected to the electrical terminal of the electrical generator 1012. An electrical storage means (an electrical storage unit) 1100 is connected to the input terminal of the inverter 1018A. An electrical storage means 1100 includes, for example, a battery which is a storage battery, a step-up/step-down converter which controls the charging and discharging of the battery, and a DC bus (not shown) which includes positive and negative DC interconnections. Here, the DC bus forms a constant voltage storage unit, and the battery forms a variable voltage storage unit. That is, the input terminal of the inverter 1018A is connected to the input terminal of the step-up/step-down converter via the DC bus. The battery is connected to the output terminal of the step-up/step-down converter.

The inverter 1018A controls the operation of the electrical generator 1012 on the basis of the instruction from the controller 1030. That is, when the inverter 1018A performs a power running operation of the electrical generator 1012, the necessary amount of electricity is supplied from the battery and the step-up/step-down converter to the electrical generator via the DC bus. Furthermore, when the regenerative operation of the electrical generator 1012 is performed, the electricity generated by the electrical generator 1012 is charged to the battery via the DC bus and the step-up/step-down converter. Furthermore, the step-up operation and the step-down operation the step-up/step-down converter are switched by the controller 1030 on the basis of the DC bus voltage value, the battery voltage value, and the battery current value. Accordingly, the DC bus may accumulate the electricity to a predetermined constant voltage value.

A boom regenerating generator 1300 is connected to the electrical storage means 1100 via an inverter 1018B. A hydraulic motor 1310 is connected to the boom cylinder 1007, and the rotary shaft of the boom regenerating generator 1300 is driven by the hydraulic motor 1310. The boom regenerating generator 1300 is an electrical working component which converts positional energy into electrical energy when the boom 1005 is lifted down by the action of gravity.

The hydraulic motor 1310 is configured to be rotated by oil discharged from the boom cylinder 1007 when the boom 1005 is lifted down, and is provided to convert energy when the boom 1005 is lifted down by the gravity into a rotational force. The hydraulic motor 1310 is provided in a hydraulic pipe 1007A between the control valve 1017 and the boom cylinder 1007. The electricity generated from the boom regenerating generator 1300 is supplied to the electrical storage means 1100 via the inverter 1018B as regenerative energy.

Furthermore, a rotation motor 1021 as a working motor is connected to the electrical storage means 1100 via an inverter 1018C (a first driving control means). The rotation motor 1021 is a power source of the rotation mechanism 1003 rotating the rotation body 1004. A resolver 1022, a mechanical brake 1023, and a rotation speed reducer 1024 are connected to a rotary shaft 1021A of the rotation motor 1021.

A power running operation of the rotation motor 1021 is performed, the rotation force generated by the rotation driving force of the rotation motor 1021 is amplified by the rotation speed reducer 1024, and the rotation body 1004 rotates while being controlled to be accelerated and decelerated. Furthermore, the rpm is increased at the rotation speed reducer 1024 by the inertia rotation of the rotation body 1004, and the rotation is transferred to the rotation motor 1021, thereby generating regenerative electricity. The rotation motor 1021 is AC-driven by the inverter 1018C on the basis of the PWM (Pulse Width Modulation) control signal. As the rotation motor 1021, for example, an IPM motor embedded with a magnet may be appropriately used.

The resolver 1022 is a sensor which detects the rotation position and the rotation angle of the rotary shaft 1021A of the rotation motor 1021, and detects the rotation angle and the rotation direction of the rotary shaft 1021A by being mechanically connected to the rotation motor 1021. Since the resolver 1022 detects the rotation angle of the rotary shaft 1021A, the rotation angle and the rotation direction of the rotation mechanism 1003 are derived. The mechanical brake 1023 is a brake device which generates a mechanical brake force, and mechanically stops the rotary shaft 1021A of the rotation motor 1021 on the basis of the instruction from the controller 1030. The rotation speed reducer 1024 is a speed reducer which decreases the rotation speed of the rotary shaft 1021A of the rotation motor 1021 and mechanically transfers the decreased rotation speed to the rotation mechanism 1003.

An operation device 1026 (an operation means) is connected the pilot pump 1015 via a pilot line 1025. The operation device 1026 is an operation device which is used to operate the rotation motor 1021, the running mechanism 1002, the boom 1005, the arm 1006, and the bucket 1010, and is operated by the operator. The control valve 1017 is connected to the operation device 1026 via a hydraulic line 1027, and a pressure sensor 1029 is connected thereto via a hydraulic line 1028. The operation device 1026 converts a hydraulic pressure (a primary hydraulic pressure) supplied via the pilot line 1025 into a hydraulic pressure (a secondary hydraulic pressure) in accordance with an amount operated by the operator and then outputs the converted hydraulic pressure. The secondary hydraulic pressure output from the operation device 1026 is supplied to the control valve 1017 via the hydraulic line 1027, and is detected by the pressure sensor 1029.

When an operation for rotating the rotation mechanism 1003 is input to the operation device 1026, the pressure sensor 1029 detects the operation amount as a change in hydraulic pressure inside the hydraulic line 1028. The pressure sensor 1029 outputs an electrical signal representing the hydraulic pressure inside the hydraulic line 1028. The electrical signal is input, to the controller 1030, and is used to control the driving of the rotation motor 1021.

The controller 1030 includes a calculation processing device having a CPU (Central Processing Unit) and an internal memory, and is realized by executing the driving control program stored in the internal memory via the CPU. The controller 1030 controls the driving of the inverters 1018A, 1018B, and 1018C and the electrical storage means 1100 when receiving an operation input from various sensors and the operation device 1026.

Furthermore, the controller 1030 of the embodiment has a DC bus voltage lowering mode (a busbar voltage lowering mode) for decreasing the voltage of the DC bus 110 (specifically, consuming the electrical charge stored in a smoothing capacitor or the like connected to the DC bus 110) when maintenance of the excavator 1001 is performed. In the DC bus voltage lowering mode, the controller 1030 stops the operation of all the inverter circuits 1018A, 1018B, and 1018C and the step-up/step-down converter 1102, and decreases the voltage of the DC bus by driving another inverter circuit to consume the electricity in the pump motor after a switch provided between the step-up/step-down converter 1102 and the battery enters a disconnection state. The DC bus voltage lowering mode is started when the operation of the excavator 1001 is stopped (specifically, when the engine 1011 is about to stop by the operator operating the key) or an input related to the start of the DC bus voltage lowering mode is performed by the operator via the operation panel inside the operation room 1004a.

Figure 29:
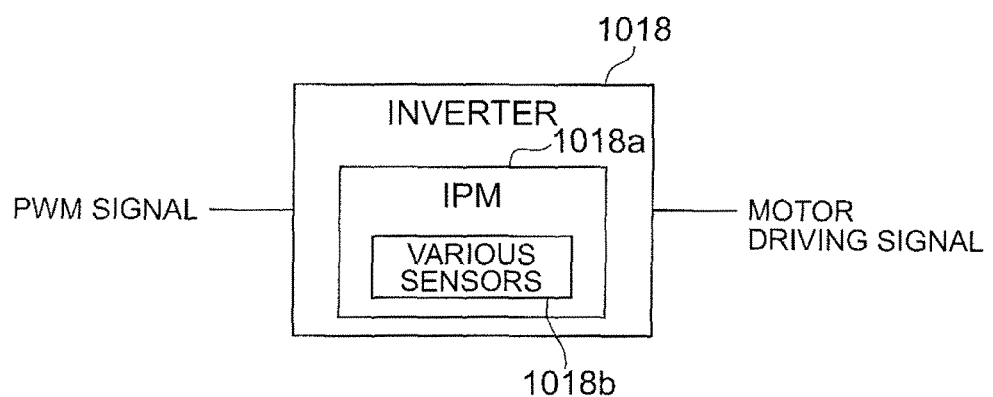
FIG. 29 is a schematic configuration diagram illustrating a configuration of an inverter 1018.

Next, the inverter 1018 will be described by referring to FIG. 29. FIG. 29 is a schematic configuration diagram illustrating a configuration of the inverter 1018.

The inverter 1018 is controlled by the PWM signal from the controller 1030, and generates and outputs a motor driving signal for driving the motor such as the rotation motor 1021. The inverter 1018 includes therein an IPM 1018a obtained by assembling a transistor constituting the circuit of the inverter. The IPM 1018a is equipped with various sensors 1018b such as a temperature sensor. The various sensors 1018b detect events such as over-current, decrease in control power supply voltage, short-circuiting, and abnormal temperature, and outputs an IPM error signal when detecting these events. Here, an event of the abnormal temperature indicates that the temperature of the inverter 1018 becomes a predetermined operation stop temperature TIh or greater. The operation stop temperature is set to, for example, 100° C. When the IPM 1018a detects the IPM error signal, the IPM stops the supply of the current for driving the motor as the driving target in order to prevent burnout of the motor as the driving target or the inverter 1018. In this case, the operation of the excavator 1001 is stopped, and the continuous operation is stopped.

Figure 30:
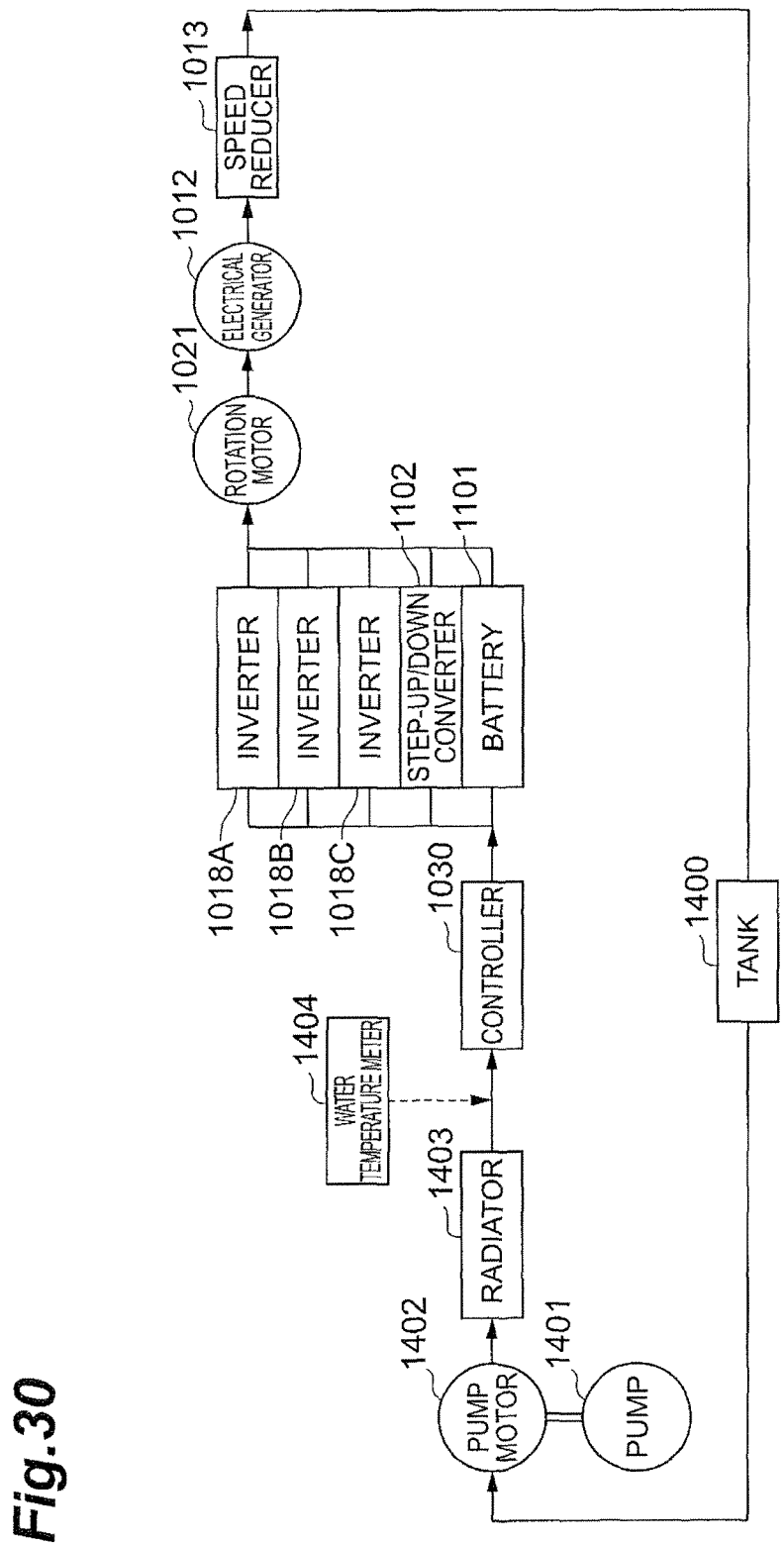
FIG. 30 is a diagram illustrating an example of a pipe for cooling water in a cooling device.

Next, the cooling device provided in the excavator 1001 will be described by referring to FIG. 30. FIG. 30 is a diagram illustrating an example of the pipe for the cooling water in the cooling device.

As shown in FIG. 30, the cooling device includes a tank 1400, a pump 1401, a pump motor 1402, a radiator 1403, and a water temperature meter 1404 (a temperature detection means). The cooling water (refrigerant) in the cooling device is stored in the tank 1400, and is sent to the radiator 1403 by the pump 1401 driven by the pump motor 1402. The cooling water cooled by the radiator 1403 is sent to the inverters 1018A, 1018B, 1018C, the step-up/step-down converter 1102, and the battery 1101 via the pipe by the controller 1030. The cooling water is further returned to the tank 1400 via the rotation motor 1021, the electrical generator 1012, and the speed reducer 1013. The water temperature meter 1404 detects the temperature of the cooling water sent from the radiator 1403, and sends information on the detected temperature to the controller 1030.

Furthermore, the pipe of the cooling water toward the controller 1030 is directly connected to the radiator 1403. Accordingly, since the cooling performance with respect to the CPU inside the controller 1030 may be ensured, the reliability of the excavator 1001 is ensured. In FIG. 30, the pipe is connected so that the cooling water used to cool the controller 1030 is used to cool the inverters 1018A to 1018C, the step-up/step-down converter 1102, and the like. However, the pipe from the radiator 1403 may be connected in parallel to the controller 1030, the inverters 1018A to 1018C, the step-up/step-down converter 1102, and the like.

Figure 31:
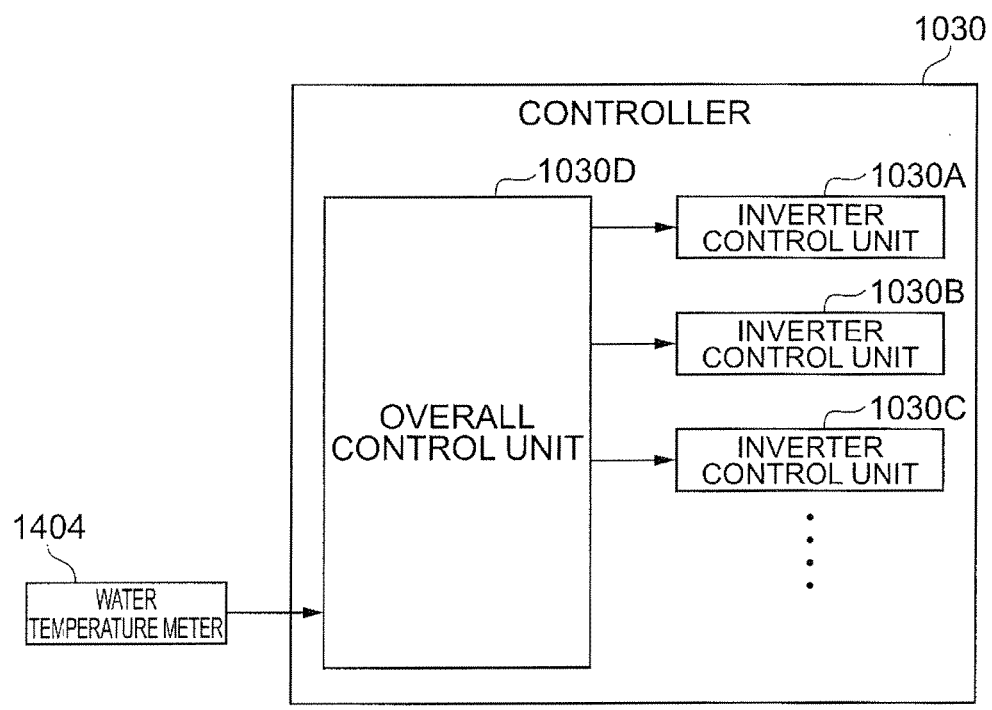
FIG. 31 is a schematic configuration diagram illustrating a functional configuration of a controller 1030.

Next, the controller 1030 will be described by referring to FIG. 31. FIG. 31 is a schematic configuration diagram illustrating a functional configuration of the controller 1030.

As shown in FIG. 31, the controller 1030 includes an overall control unit 1030D and inverter control units 1030A, 1030B, and 1030C. The overall control unit 1030D is a unit that performs an overall control of the respective components provided in the excavator 1001, and sends out a variety of information on a speed instruction and a torque limit value to the inverter control units 1030A, 1030B, and 1030C. Furthermore, the overall control unit 1030D acquires information on the temperature of the cooling water sent from the water temperature meter 1404.

The torque limit value sent from the overall control unit 1030D to the inverter control units 1030A, 1030B, and 1030C is used to set the upper limit value of the current supplied from the inverters 1018A, 1018B, and 1018C to the electrical generator 1012, the boom regenerating generator 1300, and the rotation motor 1021. That is, when the temperature T of the cooling water obtained from the water temperature meter 1404 is a predetermined output suppressing temperature Tth or more, the overall control unit 1030D controls the inverters 1018A, 1018B, and 1018C so that the upper limit value of the current supplied to the electrical generator 1012, the boom regenerating generator 1300, and the rotation motor 1021 becomes smaller than that of the case where the temperature T of the cooling water is lower than the output suppressing temperature Tth. Here, since the cooling water needs to maintain the cooling performance with respect to the CPU inside the controller 1030, the output suppressing temperature Tth is set to be lower than the operation stop temperature TIh of the inverter. Specifically, the output suppressing temperature Tth is set to be lower than the operation stop temperature as a reference temperature for the abnormal temperature as one of the events outputting the IPM error signal in the IPM 1018a of the inverter 1018. Accordingly, the controller 1030 executes a control in which the upper limit value of the current to be supplied decreases before the inverters 1018A, 1018B, and 1018C start the operation of the mechanism stopping the supply of the current to the electrical generator 1012, the boom regenerating generator 1300, and the rotation motor 1021. Accordingly, the operation stop caused by the abnormal temperatures of the electrical generator 1012, the boom regenerating generator 1300, and the rotation motor 1021 may be prevented, and the continuous operation of the excavator 1001 may be realized. Here, the detailed control executed by the controller 1030 will be described later.

Figure 32:
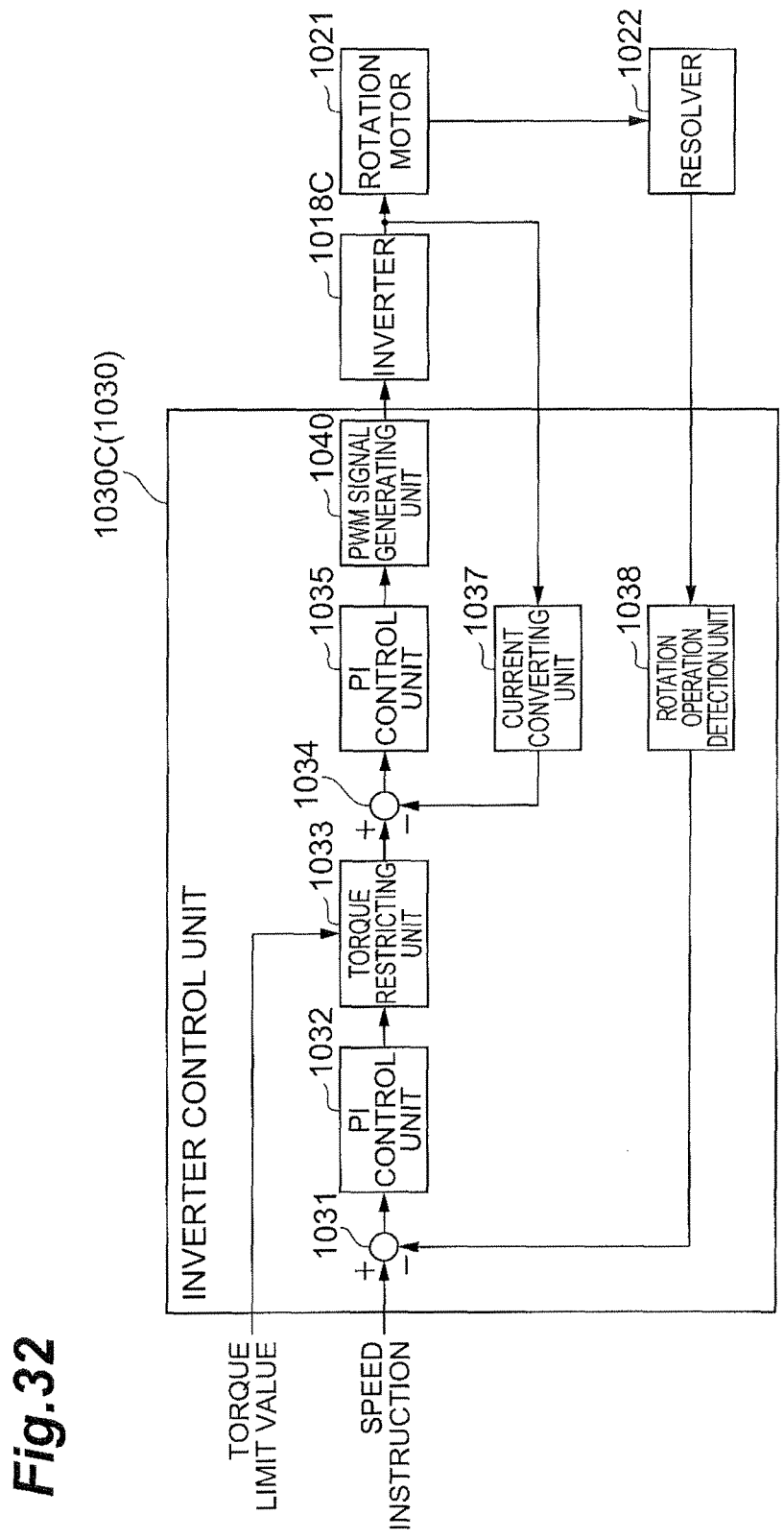
FIG. 32 is a block diagram illustrating a configuration of an inverter control unit 1030C.

The inverter control units 1030A, 1030B, and 1030C are units that respectively control the inverters 1018A, 1018B, and 1018C. Here, the inverter control units 1030A to 1030C will be described by referring to FIG. 32. FIG. 32 is a block diagram illustrating a configuration of the inverter control unit 1030C. Furthermore, the inverter control units 1030A and 1030B have the same configurations as that of the inverter control unit 1030C.

As shown in FIG. 32, the inverter control unit 1030C (1030) includes a subtractor 1031, a PI control unit 1032, a torque restricting unit 1033, a subtractor 1034, a PI control unit 1035, a current converting unit 1037, a rotation operation detection unit 1038, and a PWM signal generating unit 1040.

The subtractor 1031 outputs a deviation by subtracting a rotation speed value detected by the rotation operation detection unit 1038 from a rotation speed instruction value of a rotation speed of a working component driven by the rotation motor 1021. The speed instruction value of the rotation speed is, for example, an instruction value in accordance with the operation amount of the operation device 1026 (refer to FIG. 28), and is sent from the overall control unit 1030D of the controller 1030.

The resolver 1022 detects a change in rotation position of the rotation motor 1021. The rotation operation detection unit 1038 calculates a rotation speed value on the basis of a change in rotation position of the rotation motor 1021, and outputs the rotation speed value to the subtractor 1031.

The PI control unit 1032 executes a PI control of decreasing a deviation so that the rotation speed of the rotation motor 1021 becomes closer to the speed instruction value on the basis of the deviation output from the subtractor 1031, and generates a torque current instruction value for the control. The PI control unit 1032 outputs the torque current instruction value to the torque restricting unit 1033.

The torque restricting unit 1033 restricts the torque current instruction value to be within a predetermined torque limit value (a torque upper limit value) so that the torque generated by the rotation motor 1021 on the basis of the torque current instruction value output from the PI control unit 1032 becomes an allowable toque value or less of the rotation motor 1021. The torque limit value is sent from the overall control unit 1030D, and the torque restricting unit 1033 acquires the sent torque limit value. In the inverter control unit 1030C controlling the inverter 1018C, in the normal case, for example, the acceleration torque limit value XU is set to 150% of the rated torque in the rotation motor 1021 as the driving target, and the deceleration torque limit value XD is set to 250% of the rated torque.

Figure 33:
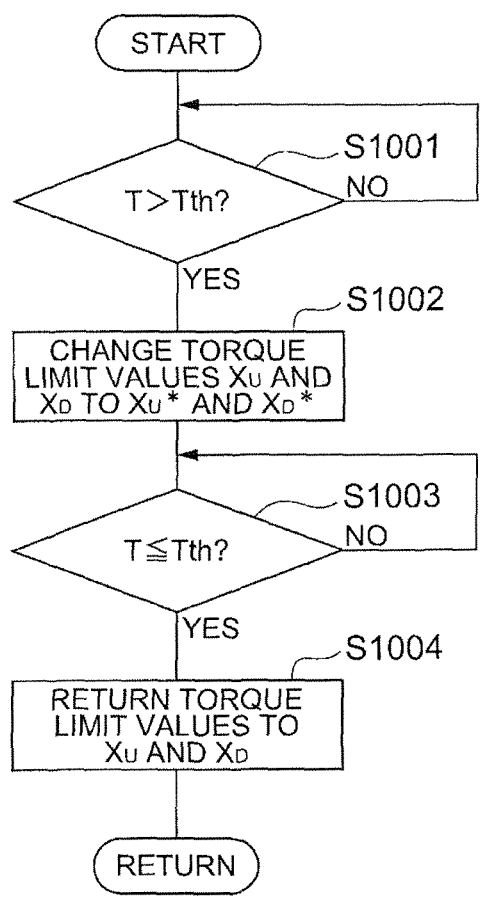
FIG. 33 is a flowchart illustrating a process of setting a torque limit value executed in an overall control unit 1030D of the controller 1030.

Here, the torque limit value setting process executed by the overall control unit 1030D of the controller 1030 will be described by referring to the flowchart of FIG. 33.

In step S1001, the overall control unit 1030D determines whether the temperature T of the cooling water acquired from the water temperature meter 1404 is greater than a predetermined output suppressing temperature Tth. The output suppressing temperature Tth is set to, for example, 60° C. When the temperature T of the cooling water is greater than the predetermined output suppressing temperature Tth, the process proceeds to step S1002. When the temperature T of the cooling water is not greater than the predetermined output suppressing temperature Tth, the determination process of step S1001 is repeated.

In step S1002, the overall control unit 1030D changes the torque limit value for the torque restricting unit 1033 of the inverter control unit 1030 from the acceleration torque limit value XU and the deceleration torque limit value XD to the acceleration suppressing torque limit value XU* and the deceleration suppressing torque limit value XD*. For example, the acceleration suppressing torque limit value XU* is set to 100% of the rated torque in the rotation motor 1021, and the deceleration suppressing torque limit value XD* is set to 150% in the rotation motor 1021. Accordingly, the inverter 1018C may be controlled so that the upper limit value of the current supplied to the rotation motor 1021 decreases. Furthermore, as the rated torque used as the setting reference, a value in accordance with the driving targets such as the electrical generator 1012, the boom regenerating generator 1300, and the rotation motor 1021 is used.

In step S1003, the overall control unit 1030D determines whether the temperature T of the cooling water acquired from the water temperature meter 1404 returns to be the output suppressing temperature Tth or less. When the temperature T of the cooling water becomes the output suppressing temperature Tth or less, the process proceeds to step S1004. When the temperature T of the cooling water is not the output suppressing temperature Tth or less, the determination process of step S1003 is repeated. Regarding the torque limit value, the acceleration suppressing torque limit value XU* and the deceleration suppressing torque limit value XD* are set.

In step S1004, the overall control unit 1030D returns the torque limit value for the torque restricting unit 1033 from the acceleration suppressing torque limit value XU* and the deceleration suppressing torque limit value XD* to the acceleration torque limit value XU and the deceleration torque limit value XD.

Here, referring to FIG. 32 again, the subtractor 1034 outputs a deviation by subtracting the output value obtained by the current converting unit 1037 from the torque current instruction value output from the torque restricting unit 1033.

The current converting unit 1037 detects the current value of the motor driving signal of the rotation motor 1021, converts the current value of the detected motor driving signal into a value corresponding to the torque instruction value, and outputs the converted value to the subtractor 1034.

The PI control unit 1035 acquires the deviation output from the subtractor 1034, executes a PI control of decreasing the deviation, and generates a driving instruction for driving the inverter 1018C. The PI control unit 1035 outputs the driving instruction to the PWM signal generating unit 1040.

The PWM signal generating unit 1040 generates a PWM signal for controlling the switching of the transistor of the inverter 1018C on the basis of the driving instruction from the PI control unit 1035, and outputs the PWM signal to the inverter 1018C.

Next, FIG. 34 illustrates the rotation speed of the rotation body 1004 and the rotation speed of the rotation motor 1021 when the torque limit value is set by the overall control unit 1030D of the controller 1030. FIG. 34A is a graph illustrating a state of a torque changing with time by the operation, FIG. 34B is a graph illustrating a rotation speed of the rotation body 1004, and FIG. 34C is a graph illustrating a rotation speed of the rotation motor 1021. In the graphs, the normal case is depicted by the solid line, and the case of changing the torque limit value is depicted by the dashed line.

As shown in FIGS. 34A and 34B, in the normal case, the rotation of the rotation body 1004 is accelerated at the torque of 150% of the rated torque of the rotation motor 1021 at the timings t0 to t1. Conversely, when the torque limit value is changed, the rotation of the rotation body 1004 is accelerated at the torque of 100% of the rated torque at the timings t0 to t2. When the torque limit value is changed, the acceleration becomes less than that of the normal case. Furthermore, when the torque limit value is changed, the rotation speed obtained after the acceleration is slower than that of the normal case to be about 60% of the normal case.

When the deceleration operation is performed from the timing t3, in the normal case, the rotation of the rotation body 1004 is decelerated at the torque of 250% of the rated torque of the rotation motor 1021 at the timings t3 to t4. On the other hand, when the torque limit value is changed, the rotation of the rotation body 1004 is decelerated at the torque of 150% of the rated torque at the timings t3 to t5. When the torque limit value is changed, the acceleration becomes smaller than that of the normal case. Furthermore, when the torque limit value is changed, it takes much more time to stop the rotation compared to the normal case.

Furthermore, as shown in FIG. 34C, since the rpm of the engine 1011 is constant, the rotation speed of the rotation motor 1021 becomes constant both in the case where the torque limit value is changed and in the normal case. For this reason, the torque changes with the state of the load with respect to the rotation motor 1021, and a current is supplied from the inverter 1018C the rotation motor 1021 so as to correspond to the changing torque. Accordingly, when the torque limit value is set, the upper limit of the current supplied to the rotation motor 1021 may be controlled.

As described above, in the excavator 1001 of the embodiment, when the temperature of the cooling water cooling the inverter 1018 becomes the output suppressing temperature Tth or more, since the upper limit value of the current supplied to the AC motor such as the rotation motor 1021 is small, an increase in temperature of the inverter 1018 is suppressed.

Since the output suppressing temperature Tth is lower than the operation stop temperature Tlh of the IPM 1018a, the controller executes a control of decreasing the upper limit value of the current supplied from the inverter 1018 to the AC motor before the inverter 1018 starts an operation of a mechanism stopping the supply of the current to the AC motor. In this manner, when the detection value of the temperature sensor inside the inverter 1018A becomes the operation stop temperature Tlh or more, the machine of the excavator 1001 may be stopped. For this reason, the machine may not be immediately stopped even when the temperature of the cooling water increases. Accordingly, a stop caused by the abnormal temperature of the inverter 1018 is prevented, and the continuous operation of the excavator 1001 is realized.

Here, the DC bus voltage lowering mode of the controller 1030 will be described further. As described above, the DC bus voltage lowering mode indicates an operation mode for decreasing the voltage of the DC bus while the operation of the excavator 1001 is stopped. Then, in this mode, the inverter circuits 1018A, 1018B, and 1018C and the step-up/step-down converter 1102 are all stopped, the switch (such as the switches 100E and 100F of FIG. 3) provided between the step-up/step-down converter 1102 and the battery 1101 enters a disconnection state, and the inverter circuit is driven to consume the electricity in the pump motor (which is the same as the pump motor 171 of FIG. 2), thereby decreasing the voltage of the DC bus.

Figure 35:
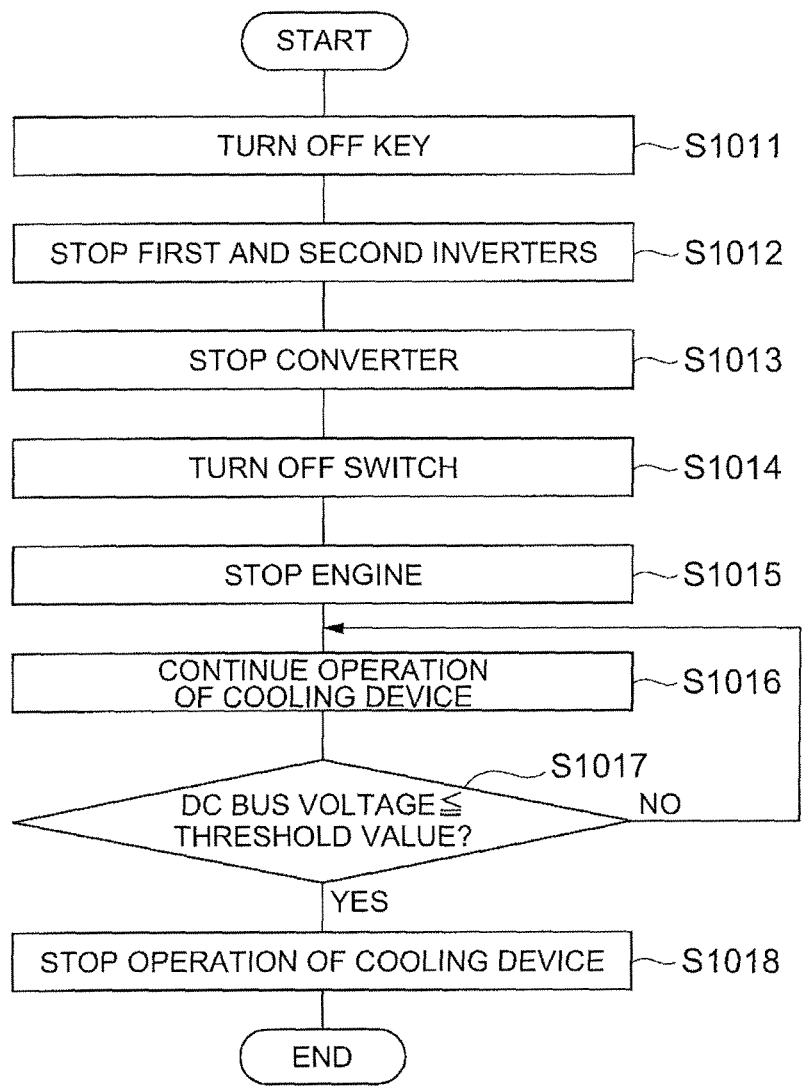
FIG. 35 is a flowchart illustrating an operation of the excavator 1001 in the DC bus voltage lowering mode.

FIG. 35 is a flowchart illustrating an operation of the excavator 1001 in the DC bus voltage lowering mode. First, the ignition key is operated by the operator to stop the operation of the excavator 1001 (step S1011). In the embodiment, the controller 1030 starts the DC bus voltage lowering mode whenever the operation of the excavator 1001 is stopped in this manner. That is, the controller 1030 stops the driving of the inverter circuits 1018A, 1018B, and 1018C when receiving the operation of the key (step S1012). Accordingly, the supply of the electricity to the electrical generator 1012, the rotation motor 1021, and the lifting magnet 1007 is stopped. Next, the controller 1030 stops the driving of the step-up/step-down converter 1102 (step S1013). Then, the controller 1030 allows the switch (refer to FIG. 3) between the step-up/step-down converter 1102 and the battery 1101 to be in a disconnection state (step S1014). Accordingly, the DC bus and the battery 1101 are electrically separated from each other. Then, the controller 1030 instructs the ECU or the like of the engine 1011 to stop the engine 1011 (step S1015).

At this time, the inverter circuit continuously drives the pump motor as the cooling motor, and the cooling liquid continuously circulates inside the cooling liquid circulating system by the pump motor. The controller 1030 continuously operates the pump motor by continuously driving the inverter circuit (step S1016). The inverter circuit is continuously driven until the voltage of the DC bus detected by the voltage sensor becomes a predetermined threshold value or less (step S1017; No). Furthermore, it is appropriate that the predetermined threshold value is, for example, 25 V which is considered to be safe even when "a human body is conspicuously wet or a part of a human body contacts a metallic electrical equipment or structure" (Japan Electric Association Guide/ Second Type).

Then, when the voltage of the DC bus becomes a predetermined threshold value or less (step S1017; Yes), the controller 1030 stops the driving of the inverter circuit (step S1018). Accordingly, the operation of the pump motor is stopped so that the DC bus voltage lowering mode is finished, and the operation of the excavator 1001 is completely stopped.

Figure 36:
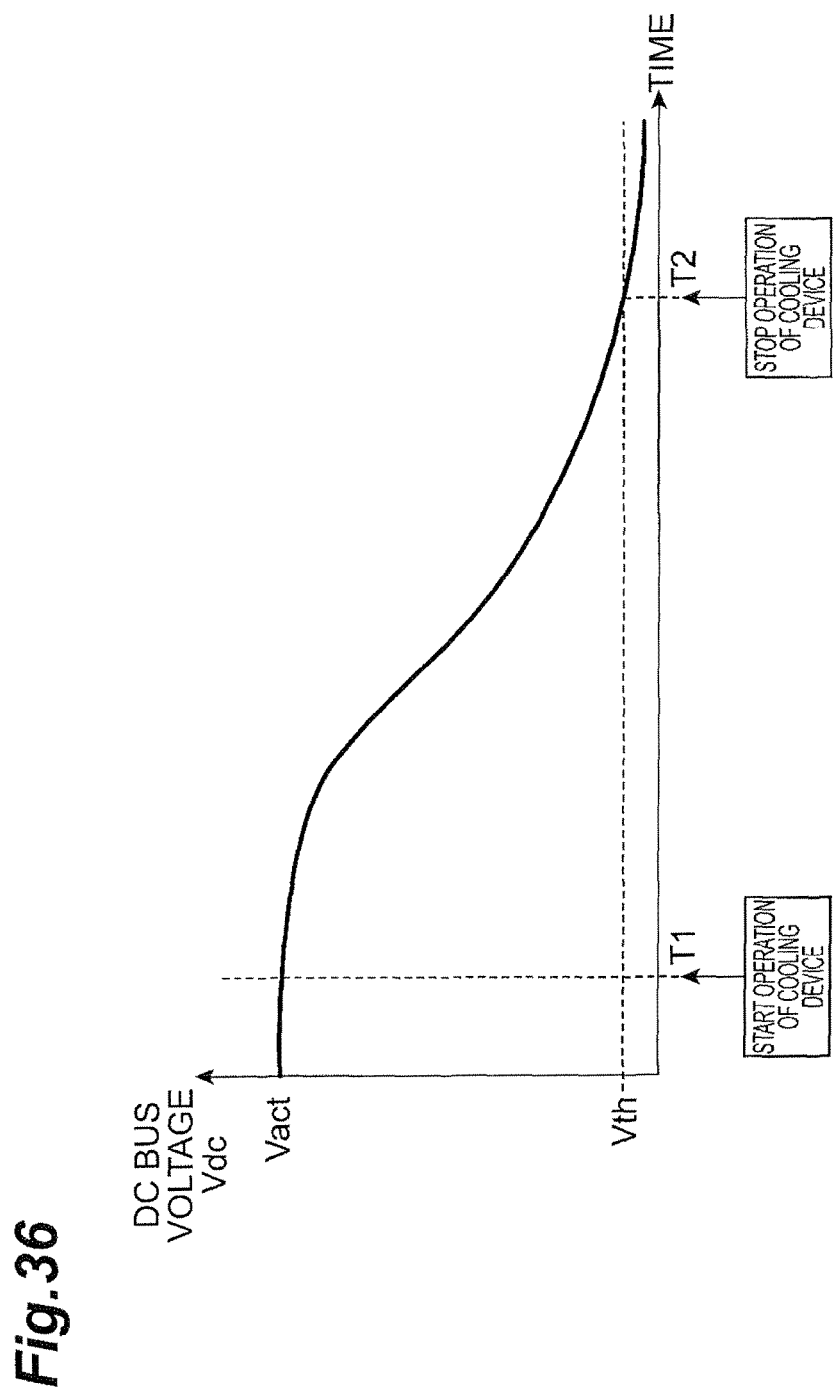
FIG. 36 is a graph illustrating an example of a transition of a voltage of the DC bus in the DC bus voltage lowering mode.

FIG. 36 is a graph illustrating an example of a transition of the voltage of the DC bus in the DC bus voltage lowering mode. When the switch enters a disconnection state while the pump motor is continuously driven (at the timing T1 of the drawing), the voltage Vdc of the DC bus gradually decreases from the preceding voltage Vact. The decreasing speed is dependent on the consumption electricity of the pump motor. Then, when the voltage Vdc of the DC bus becomes less than a predetermined threshold value Vth (at the timing t2 of the drawing), the decreasing speed of the voltage Vdc becomes gentle since the operation of the pump motor is stopped.

As described above, when the excavator 1001 decreases the voltage of the DC bus in accordance with the necessity of the maintenance, the voltage of the DC bus is consumed in a manner such that the controller 1030 drives the pump motor driving the pump by using the voltage of the DC bus. Originally, the pump is mounted on the excavator 1001 in order to cool the inverter unit or the step-up/step-down converter unit. For this reason, according to this method, it is not necessary to newly provide a component such as a resistor or a switch only for the DC bus voltage lowering mode. Therefore, according to the excavator 1001 of the embodiment, the voltage of the DC bus may be decreased with a configuration suppressing a degradation in reliability.

Furthermore, the pump motor is different from, for example, the electrical generator 1012 driving the hydraulic pump or the working motor such as the rotation motor 1021 driving the working component such as the rotation body 1004. The pump motor does not apply a driving force to the movable portion or the working component, but only circulates the cooling liquid inside the pipe even when the pump motor is driven. Therefore, according to the excavator 1001 of the embodiment, since the voltage of the DC bus may be decreased without applying a driving force king component or the like, the voltage of the DC bus may be safely decreased.

Furthermore, in the above-described embodiment, the excavator 1001 is exemplified as an example of the working machine according to the invention, but another example of the working machine of the invention may include a lifting magnet vehicle, a wheel loader, a crane, or the like.

Third Embodiment

Generally, in the hybrid type construction machine, the DC power of the battery is converted into the AC power in order to drive the AC motor, and the AC power is converted into the DC power in order to charge the electricity regenerated from the AC motor to the battery. For this reason, at least one inverter circuit needs to be provided. Furthermore, the step-up/step-down converter needs to be provided in order to control the charging and discharging of the battery. Then, in order to efficiently perform the assisting operation or the electricity generation operation in accordance with the amount of the electricity stored in the battery, a servo control system may be provided to generally control the inverter circuit and the step-up/step-down converter circuit.

However, the construction machine may be used in harsh working conditions. Accordingly, the servo control system mounted on the construction machine requires a high level of reliability against vibration or impact. In particular, since the consumption electricity of the AC motor is comparatively large in the construction machine, it is necessary to increase the output of the power transistor or the capacity of the capacitor mounted on the servo control system. Also, since the servo control system increases in size and weight, it is necessary to have sufficient structural strength in order to ensure vibration resistance or impact resistance.

On the other hand, in the construction machine used in harsh conditions, a high maintenance property is needed. That is, when abnormality is generated in a certain inverter circuit, it is difficult to inspect and repair the inverter circuit on site. For this reason, it is desirable that the inverter circuit is carried to another place for the repair thereof. However, as described above, in the device having large consumption electricity of the AC motor, the servo control system increases in size and weight, and it is difficult to carry the servo control system.

Hereinafter, a hybrid type construction machine will be described which obtains both vibration resistance or impact resistance and high maintenance property in a servo control system driving a plurality of AC motors using electricity of a storage battery.

Figure 37:
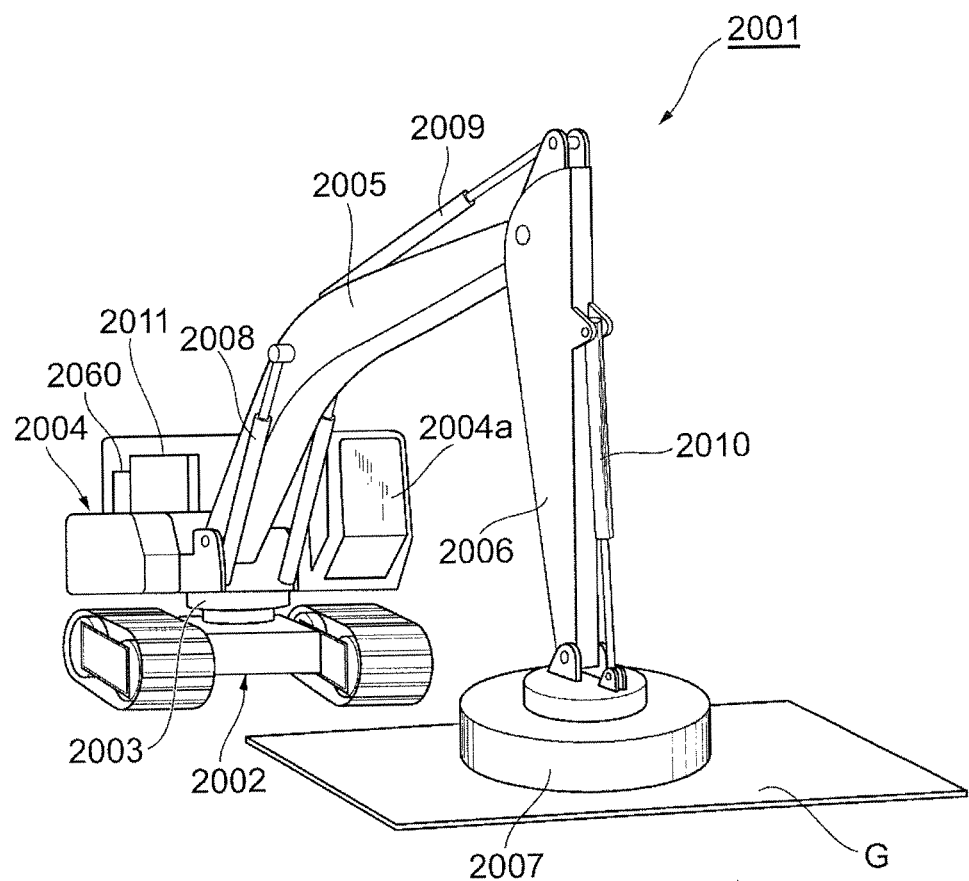
FIG. 37 is a perspective view illustrating an external shape of a lifting magnet vehicle 2001 of a third embodiment of the working machine according to the invention.

FIG. 37 is a perspective view illustrating an external shape of a lifting magnet vehicle 200 as an example of the working machine according to the invention. As shown in FIG. 37, a lifting magnet vehicle 2001 includes a running mechanism 2002 which has a caterpillar track and a rotation body 2004 which is rotatably mounted on the upper portion of the running mechanism 2002 via a rotation mechanism 2003. To the rotation body 2004 is attached a boom 2005, an arm 2006 link-connected to the front end of the boom 2005, and a lifting magnet 2007 link-connected to the front end of the arm 2006. The lifting magnet 2007 is equipment which is used to adsorb and catch a load G such as steel by a magnetic force. The boom 2005, the arm 2006, and the lifting magnet 2007 are hydraulically driven by, respectively, a boom cylinder 2008, an arm cylinder 2009, and a bucket cylinder 2010. Furthermore, the rotation body 2004 is provided with an operation room 4a accommodating an operator performing an operation of adjusting the position of the lifting magnet 2007 or a magnetization operation and a release operation or a power source such as an engine (an internal combustion engine) 11 used for generating a hydraulic pressure. The engine 2011 is configured as, for example, a diesel engine.

Furthermore, the lifting magnet vehicle 2001 includes a servo control unit 2060. The servo control unit 2060 controls an AC motor driving a working component such as the rotation mechanism 2003 or the lifting magnet 2007 or an electrical generator assisting the engine 2011 and a charging and discharging operation of an electrical storage device (a battery). The servo control unit 2060 includes an inverter unit driving an AC motor or an electrical generator by converting DC power into AC power, a plurality of driver units such as a step-up/step-down converter unit controlling a charging and discharging operation of the battery, and a control unit controlling the plurality of driver units.

Figure 38:
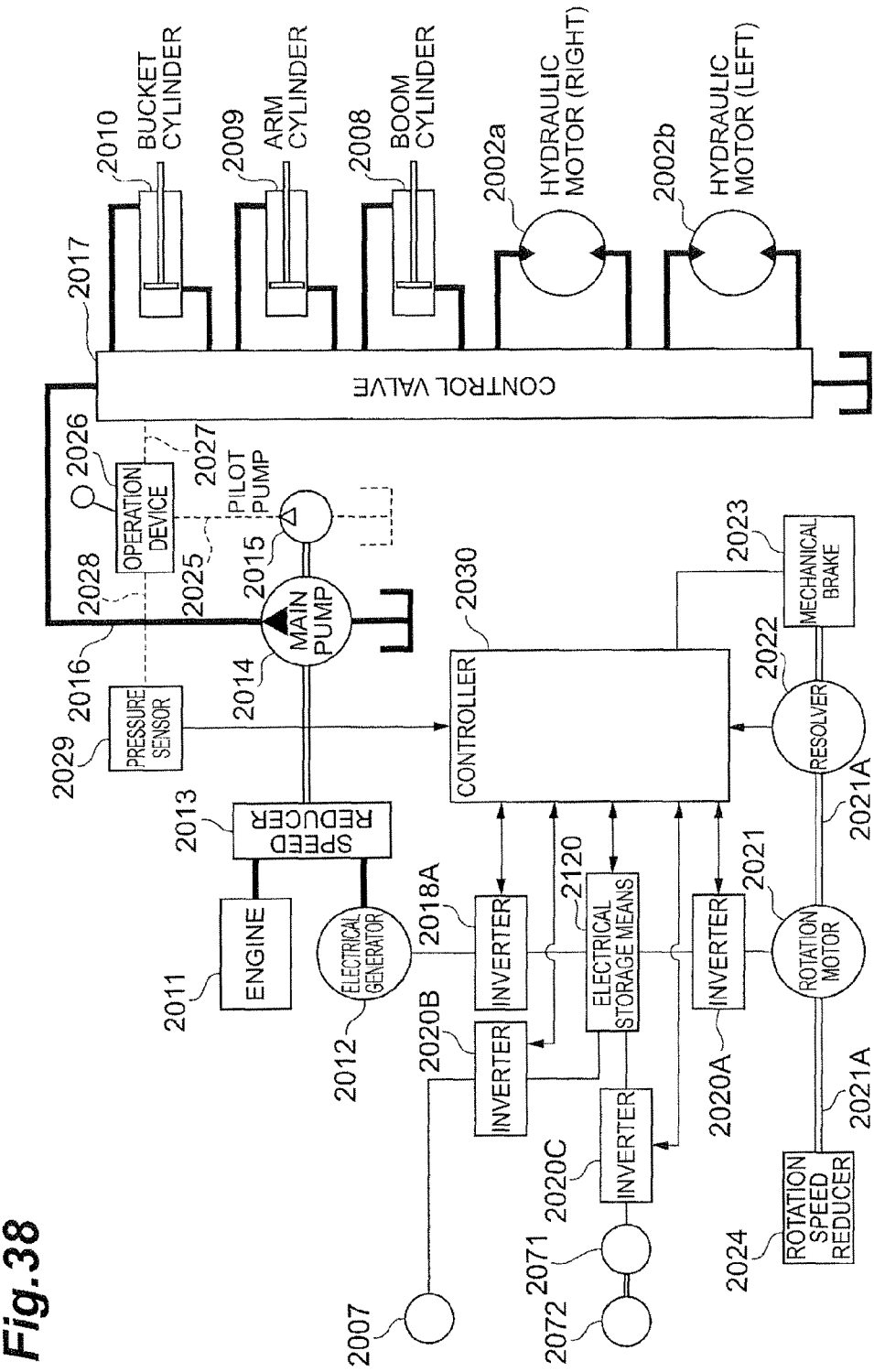
FIG. 38 is a block diagram illustrating an internal configuration such as an electric system or a hydraulic system of the lifting magnet vehicle 2001 of the third embodiment.
Figure 39:
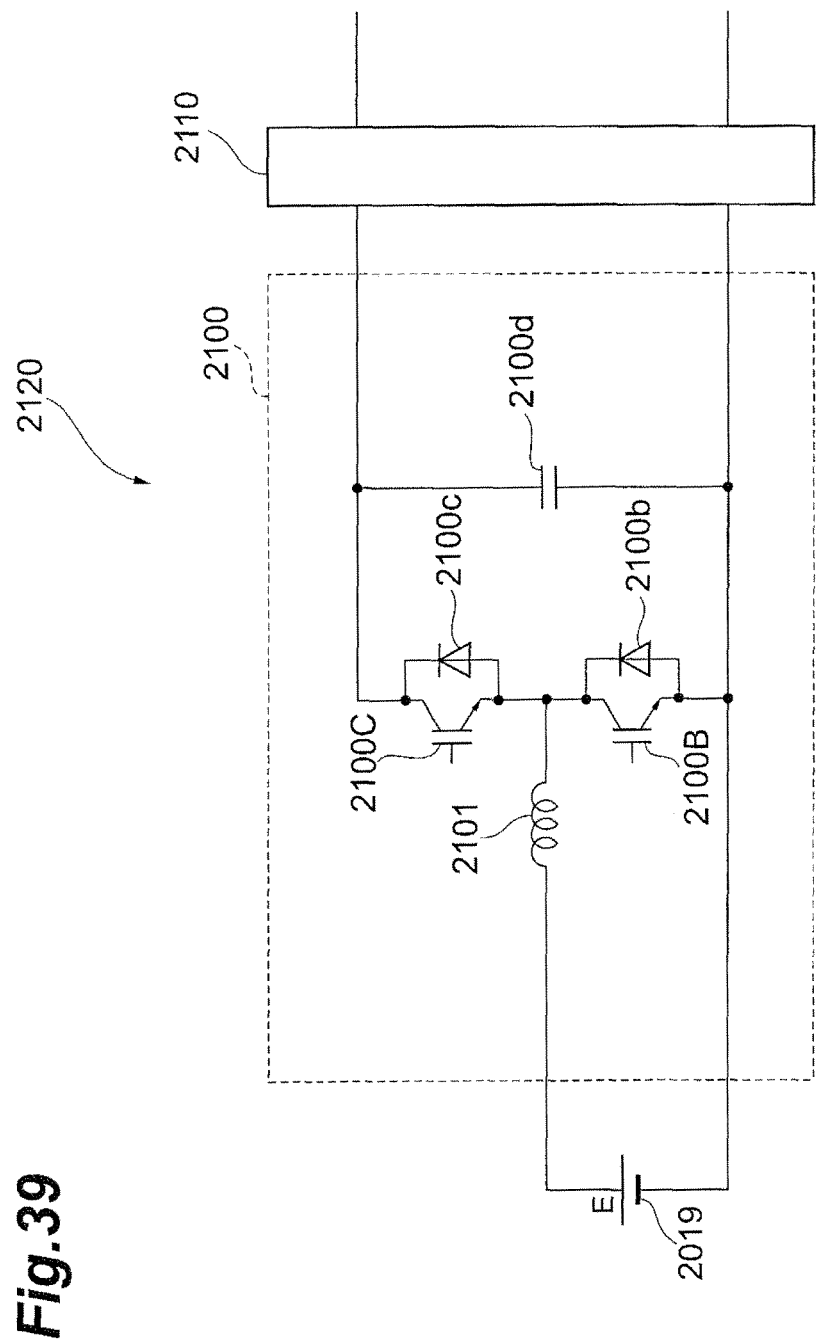
FIG. 39 is a diagram illustrating an internal configuration of an electrical storage means 2120 of FIG. 38.

FIG. 38 is a block diagram illustrating an internal configuration such as an electric system or a hydraulic system of the lifting magnet vehicle 2001 of the embodiment. Furthermore, in FIG. 38, the system mechanically transmitting power is depicted by a double line, the hydraulic system is depicted by the thick solid line, the operation system is depicted by the dashed line, and the electrical system is depicted by the thin solid line. Furthermore, FIG. 39 is a diagram illustrating an internal configuration of an electrical storage means (an electrical storage unit) 2120 of FIG. 38.

As shown in FIG. 38, the lifting magnet vehicle 2001 includes an electrical generator 2012 and a speed reducer 2013, and the rotary shafts of the engine 2011 and the electrical generator 2012 are both connected to the input shaft of the speed reducer 2013, so that the rotary shafts are connected to each other. When the load of the engine 2011 is large, the electrical generator 2012 assists the driving force of the engine 2011 by driving the engine 2011 as the working component, so that the driving force of the electrical generator 2012 is transferred to a main pump 2014 via the output shaft of the speed reducer 2013. On the other hand, when the load of the engine 2011 is small, the driving force of the engine 2011 is transferred to the electrical generator 2012 via the speed reducer 2013, so that electricity is generated by the electrical generator 2012. The electrical generator 2012 is configured as, for example, an IPM (Interior Permanent Magnetic) motor in which a magnet is embedded in a rotor. The driving and the generation of electricity of the electrical generator 2012 are switched by a controller 2030 controlling the driving of the electrical system in the lifting magnet vehicle 2001 in accordance with the load or the like of the engine 2011.

The main pump 2014 and a pilot pump 2015 are connected to the output shaft of the speed reducer 2013, and a control valve 2017 is connected to the main pump 2014 via a high pressure hydraulic line 2016. The control valve 2017 is a device that controls the hydraulic system of the lifting magnet vehicle 2001. The boom cylinder 2008, the arm cylinder 2009, and the bucket cylinder 2010 are connected to the control valve 2017 via the high pressure hydraulic line in addition to hydraulic motors 2a and 2b driving the running mechanism 2002 shown in FIG. 37, and the control valve 2017 controls the hydraulic pressure supplied thereto in accordance with the operation input from the operator.

An output terminal of the inverter circuit 2018A is connected to the electrical terminal of the electrical generator 2012. An electrical storage means 2120 is connected to the input terminal of the inverter circuit 2018A. As shown in FIG. 39, the electrical storage means 2120 includes a DC bus 2110 which is a DC busbar, a step-up/step-down converter (a DC voltage converter) 2100, and a battery 2019. That is, the input terminal of the inverter circuit 2018A is connected to the input terminal of the step-up/step-down converter 2100 via the DC bus 2110. The battery 2019 as a storage battery is connected to the output terminal of the step-up/step-down converter 2100. The battery 2019 is configured as, for example, a capacitor type storage battery. As an example of the magnitude of the battery 2019, 144 capacitors having a voltage of 2.5 V and a capacity of 2400 F may be connected in series to each other (that is, a voltage across both ends is 360 V).

The inverter circuit 2018A controls the operation of the electrical generator 2012 on the basis of the instruction from the controller 2030. That is, when the inverter circuit 2018A performs a power running operation of the electrical generator 2012, the necessary amount of electricity is supplied from the battery 2019 and the step-up/step-down converter 2100 to the electrical generator 2012 via the DC bus 2110. Furthermore, when the regenerative operation of the electrical generator 2012 is performed, the electricity generated by the electrical generator 2012 is charged to the battery 2019 via the DC bus 2110 and the step-up/step-down converter 2100. Furthermore, the step-up operation and the step-down operation of the step-up/step-down converter 2100 are switched by the controller 2030 on the basis of the DC bus voltage value, the battery voltage value, and the battery current value. Accordingly, the DC bus 2110 may be maintained to be charged to a predetermined constant voltage value.

The lifting magnet 2007 is connected to the DC bus 2110 of the electrical storage means 2120 via an inverter circuit 2020B. The lifting magnet 2007 includes an electromagnet which generates a magnetic force magnetically adsorbing a metallic substance, and electricity is supplied from the DC bus 2110 via the inverter circuit 2020B. When the electromagnet enters an on state on the basis of the command from the controller 2030, the inverter circuit 2020B supplies the electricity necessary for the lifting magnet 2007 from the DC bus 2110. Furthermore, when the electromagnet enters an off state, the regenerated electricity is supplied to the DC bus 2110.

Furthermore, the inverter circuit 2020A is connected to the electrical storage means 2120. A rotation motor (an AC motor) 2021 as a working motor is connected to one end of the inverter circuit 2020A, and the other end of the inverter circuit 2020A is connected to the DC bus 2110 of the electrical storage means 2120. The rotation motor 2021 is a power source for the rotation mechanism 2003 that rotates the rotation body 2004. A resolver 2022, a mechanical brake 2023, and a rotation speed reducer 2024 are connected to a rotary shaft 2021A of a rotation motor 2021.

When a power running operation of the rotation motor 2021 is performed, the rotation force generated by the rotation driving force of the rotation motor 2021 is amplified by the rotation speed reducer 2024, and the rotation body 2004 rotates while being controlled to be accelerated and decelerated. Furthermore, the rpm is increased at the rotation speed reducer 2024 by the inertia rotation of the rotation body 2004 and the rotation is transferred to the rotation motor 2021, thereby generating regenerative electricity. The rotation motor 2021 is AC-driven by the inverter circuit 2020A on the basis of the PWM (Pulse Width Modulation) control signal. As the rotation motor 2021, for example, an IPM motor embedded with a magnet may be appropriately used.

The resolver 2022 is a sensor which detects the rotation position and the rotation angle of the rotary shaft 2021A of the rotation motor 2021, and detects the rotation angle and the rotation direction of the rotary shaft 2021A by being mechanically connected to the rotation motor 2021. Since the resolver 2022 detects the rotation angle of the rotary shaft 2021A, the rotation angle and the rotation direction of the rotation mechanism 2003 are derived. The mechanical brake 2023 is a brake device which generates a mechanical brake force, and mechanically stops the rotary shaft 2021A of the rotation motor 2021 on the basis of the instruction from the controller 2030. The rotation speed reducer 2024 is a speed reducer which decreases the rotation speed of the rotary shaft 2021A of the rotation motor 2021 and mechanically transfers the decreased rotation speed to the rotation mechanism 2003.

Furthermore, since the electrical generator 2012, the rotation motor 2021, and the lifting magnet 2007 are connected to the DC bus 2110 via the inverter circuits 2016A, 2020A, and 2020B, the electricity generated by the electrical generator 2012 may be directly supplied to the lifting magnet 2007 or the rotation motor 2021, the electricity regenerated by the lifting magnet 2007 may be supplied to the electrical generator 2012 or the rotation motor 2021, or the electricity regenerated by the rotation motor 2021 may be supplied to the electrical generator 2012 or the lifting magnet 2007.

Since the inverter circuits 2018A, 2020A, and 2020B control large amounts of electricity, the heating amount thereof increases considerably. Furthermore, the heating amount greatly increases even in a reactor 2101 (refer to FIG. 39) included in the step-up/step-down converter 2100. Accordingly, there is a need to cool the inverter circuits 2018A, 2020A, and 2020B, and the step-up/step-down converter 2100. Therefore, the lifting magnet vehicle 2001 of the embodiment includes a cooling liquid circulating system which is provided separately from the cooling liquid circulating system for the engine 2011 to cool the step-up/step-down converter 2100 and the inverter circuits 2018A, 2020A, and 2020B.

The cooling liquid circulating system includes a pump (a cooling liquid circulating pump) 2072 which circulates a cooling liquid supplied to the step-up/step-down converter 2100, the inverter circuits 2018A, 2020A, and 2020B, and the like and a pump motor (a cooling motor) 2071 which drives the pump 2072. The pump motor 2071 is connected to the electrical storage means 212C via the inverter circuit 2020C. The inverter circuit 2020C supplies the necessary amount of electricity for the pump motor 2071 when cooling the step-up/step-down converter 2100 on the basis of the instruction from the controller 2030. The cooling liquid circulating system of the embodiment cools the step-up/step-down converter 2100, the inverter circuits 2018A, 2020A, and 2020B, and the controller 2030. Furthermore, the cooling liquid circulating system cools the electrical generator 2012, the speed reducer 2013, and the rotation motor 2021.

An operation device 2026 is connected to the pilot pump 2015 via a pilot line 2025. The operation device 2026 is an operation device which is used to operate the rotation motor 2021, the running mechanism 2002, the boom 2005, the arm 2006, and the lifting magnet 2007, and is operated by the operator. The control valve 2017 is connected to the operation device 2026 via a hydraulic line 2027, and the pressure sensor 2029 is connected thereto via a hydraulic line 2028. The operation device 2026 converts a hydraulic pressure (a primary hydraulic pressure) supplied via the pilot line 2025 into a hydraulic pressure (a secondary hydraulic pressure) in accordance with an amount operated by the operator. The secondary hydraulic pressure output from the operation device 2026 is supplied to the control valve 2017 via the hydraulic line 2027 and is detected by the pressure sensor 2029. Here, the rotation motor 2021 is exemplified, as the working motor, but the running mechanism 2002 may be electrically driven by the working motor.

When an operation for rotating the rotation mechanism 2003 is input to the operation device 2026, the pressure sensor 2029 detects the operation amount as a change in hydraulic pressure inside the hydraulic line 2028. The pressure sensor 2029 outputs an electrical signal representing the hydraulic pressure inside the hydraulic line 2028. The electrical signal is input to the controller 2030, and is used to control the driving of the rotation motor 2021.

The controller 2030 constitutes the control circuit of the embodiment. The controller 2030 includes a calculation processing device having a CPU (Central Processing Unit) and an internal memory, and is realized by executing the driving control program stored in the internal memory via the CPU. Furthermore, the power supply of the controller 2030 is a battery (for example, 24 V of an in-vehicle battery) different from the battery 2019. The controller 2030 converts a signal representing an operation amount for rotating the rotation mechanism 2003 among the signals input from the pressure sensor 2029 into a speed instruction, and controls the driving of the rotation motor 2021. Furthermore, the controller 2030 executes an operation control (switching an assisting operation and an electricity generation operation) of the electrical generator 2012, executes the driving control (switching magnetization and demagnetization) of the lifting magnet 2007, and executes the charging and discharging control of the battery 2019 by controlling the driving of the step-up/step-down converter 2100.

Furthermore, the controller 2030 of the embodiment has a DC bus voltage lowering mode (a busbar voltage lowering mode) for decreasing the voltage of the DC bus 2110 (specifically, consuming the electrical charge stored in a smoothing capacitor or the like connected to the DC bus 2110) when the maintenance of the hybrid type construction machine 1 is performed. In the DC bus voltage lowering mode, the controller 2030 stops the operation of all the inverter circuits 2018A, 2020A, and 2020B, and the step-up/step-down converter 2100, and decreases the voltage of the DC bus 2110 by driving the inverter circuit 2020C to consume the electricity in the pump motor 2071 after a switch (which is the same as that of FIG. 3) provided between the step-up/step-down converter 2100 and the battery 2019 enters a disconnection state. The DC bus voltage lowering mode is started when the operation of the hybrid type construction machine 1 is stopped (specifically, when the engine 2011 is about to stop by the operator operating the key) or an input related to the at the DC bus voltage lowering mode is performed by the operator via the operation panel inside the operation room 2004a.

Here, the step-up/step-down converter 2100 of the embodiment will be described by referring to FIG. 39 again. FIG. 39 schematically illustrates a circuit configuration of the step-up/step-down converter 2100. The step-up/step-down converter 2100 includes a reactor 2101, transistors 2100B and 2100C, and a smoothening capacitor 2100d. The transistors 2100B and 2100C are each configured as, for example, an IGBT (insulated Gate Bipolar Transistor), and are connected in series to each other. Specifically, the collector of the transistor 2100B and the emitter of the transistor 2100C are connected to each other, the emitter of the transistor 2100B is connected to the negative terminal of the battery 2019 and the negative interconnection of the DC bus 2110, and the collector of the transistor 2100C is connected to the positive interconnection of the DC bus 2110. Then, in the reactor 2101, one end thereof is connected to the collector of the transistor 2100B and the emitter of the transistor 2100C, and the other end thereof is connected to the positive terminal of the battery 2019. A PWM voltage is applied from the controller 2030 to the gates of the transistors 2100B and 2100C. Furthermore, a diode 2100b as a rectifying element is reversely connected in parallel between the collector and the emitter of the transistor 2100B. In the same manner, the diode 2100c is reversely connected between the collector and the emitter of the transistor 2100C. The smoothening capacitor 2100d is connected between the collector of the transistor 2100C and the emitter of the transistor 2100B, and smoothens the output voltage from the step-up/step-down converter 2100.

In the step-up/step-down converter 2100 with such a configuration, when the DC power is supplied from the battery 2019 to the DC bus 2110, a PWM voltage is applied to the gate of the transistor 2100B, an induced electromotive force generated in the reactor 2101 with the on/off of the transistor 2100B is transmitted via the diode 2100c, and the electricity is smoothened by the capacitor 2100d. Furthermore, when the DC power is supplied from the DC bus 2110 to the battery 2019, a PWM voltage is applied to the gate of the transistor 2100C, and the current output from the transistor 2100C is smoothened by the reactor 2101.

Here, since the transistors 2100B and 2100C control large amounts of electricity, the heating amount thereof considerably increases. Furthermore, the heating amount greatly increases even in the reactor 2101. Accordingly, the transistors 2100B and 2100C and the reactor 2101 need to be cooled. Furthermore, since the inverter circuits 2018A, 2020A, and 2020B also include a transistor for large amounts of electricity as in the step-up/step-down converter 2100, the inverter circuits need to be cooled. Therefore, the lifting magnet vehicle 2001 of the embodiment includes a cooling liquid circulating system which cools the step-up/step-down converter 2100 and the inverter circuits 2018A, 2020A, and 2020B.

Figure 40:
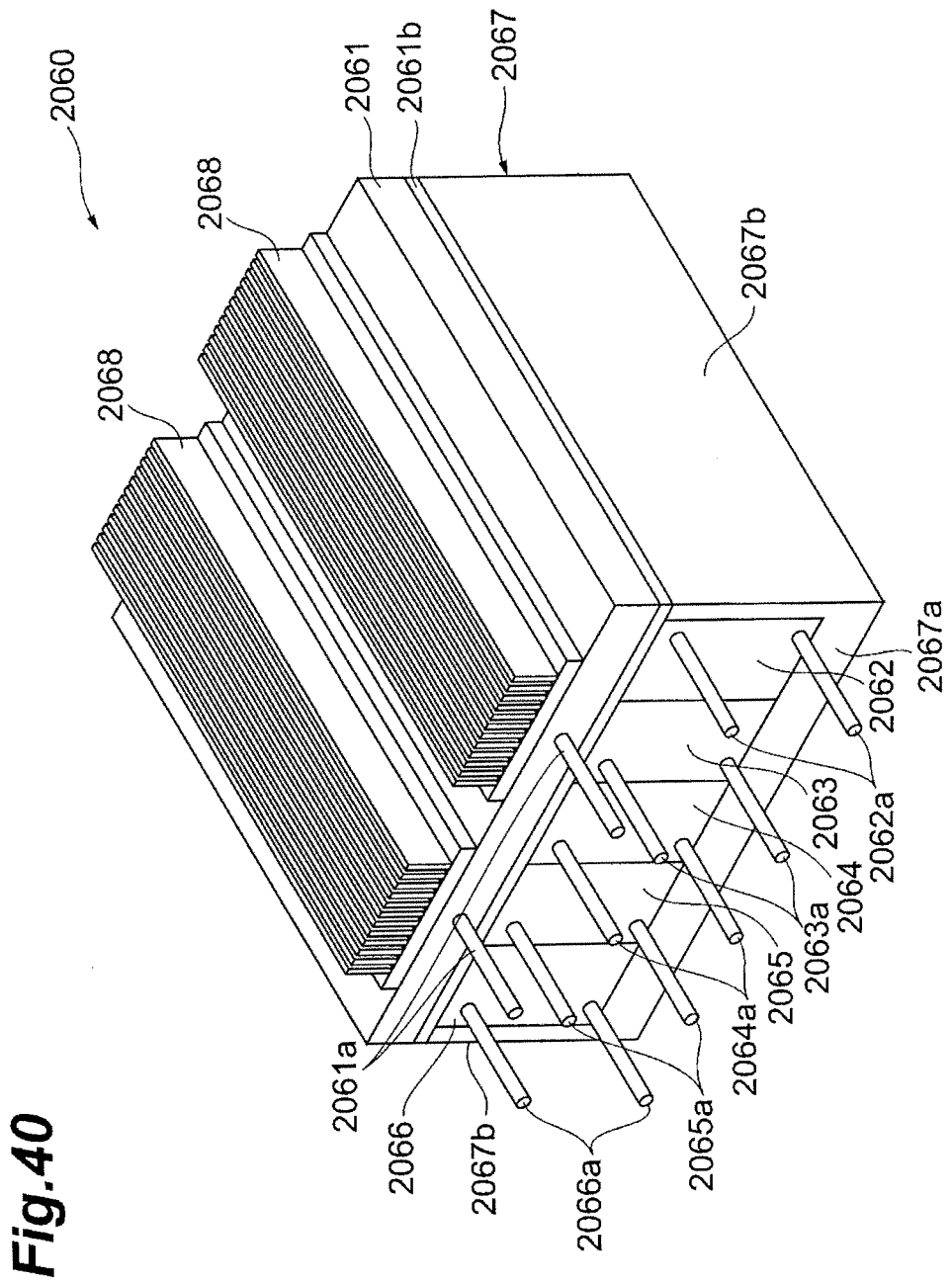
FIG. 40 is a perspective view illustrating an external shape of a servo control unit 2060.

FIG. 40 is a perspective view illustrating an external shape of a servo control unit 2060. The servo control unit 2060 of the embodiment is a device which drives a plurality of AC motors (the electrical generator 2012, the rotation motor 2021, the pump motor 2071, and the like) by using the electricity of the storage battery (the battery 2019). The servo control unit 2060 has a substantially rectangular shape when seen from the outside thereof, and includes: a step-up/step-down converter unit 2062 which has the step-up/step-down converter 2100 charging or discharging the battery 2019; a plurality of inverter units 2063 to 2066 which has the inverter circuits 2018A and 2020A to 2020C driving one AC motor among the electrical generator 2012, the rotation motor 2021, and the pump motor 2071 or the lifting magnet 2007; and the control unit 2061 which has the controller 2030 controlling the inverter circuits 2018A and 2020A to 2020C of the step-up/step-down converter 2100 of the step-up/step-down converter unit 2062 and the inverter units 2063 to 2066. Furthermore, the step-up/step-down converter unit 2062 and the inverter units 2063 to 2066 constitute a plurality of driver units of the embodiment.

The step-up/step-down converter unit 2062 and the inverter units 2063 to 2066 each has a metallic casing which has a rectangular external shape elongated in the depth direction. The units 2062 to 2066 are placed on a bottom plate 2067a of a pedestal 2067 including the metallic bottom plate 2067a, and are arranged in a predetermined direction (a horizontal direction). Furthermore, the pedestal 2067 includes side plates 2067b which interpose the units 2062 to 2066 therebetween in the predetermined direction.

A control unit bottom plate 2061b as an upper cover is provided on the units 2062 to 2066 to cover the upper surfaces of the units, and the control unit 2061 is placed on the control unit bottom plate 2061b. Further, a heat sink 2068 is attached the upper surface of the control unit 2061 for the purpose of air-cooling.

Furthermore, the control unit 2061 includes therein a cooling pipe 2061a. In the same manner, the step-up/step-down converter unit 2062 includes therein a cooling pipe 2062a, and the inverter units 2063 to 2066 respectively include therein cooling pipes 2063a to 2066a.

Figure 41:
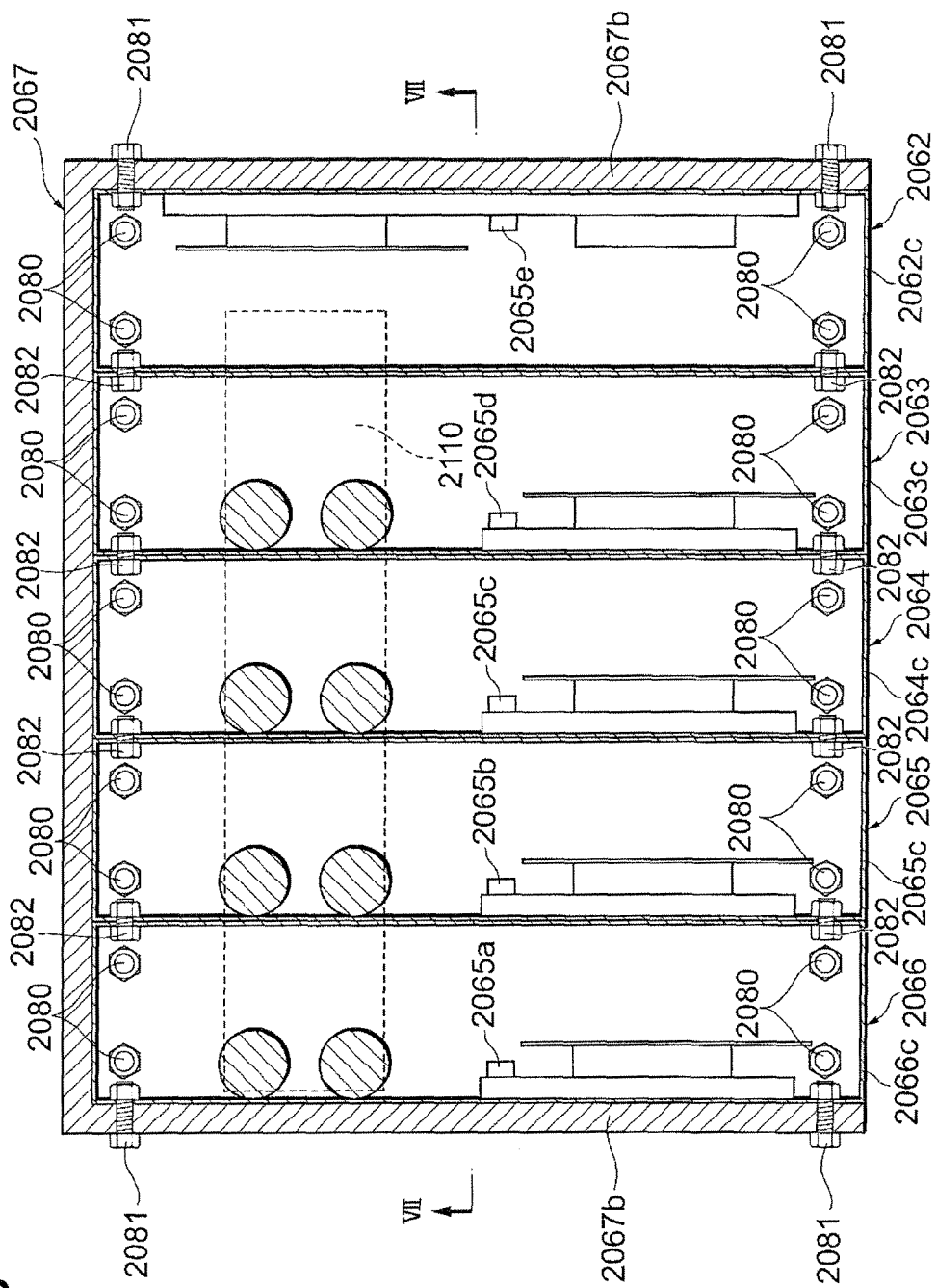
FIG. 41 is a plan cross-sectional view illustrating the servo control unit 2060.
Figure 42:
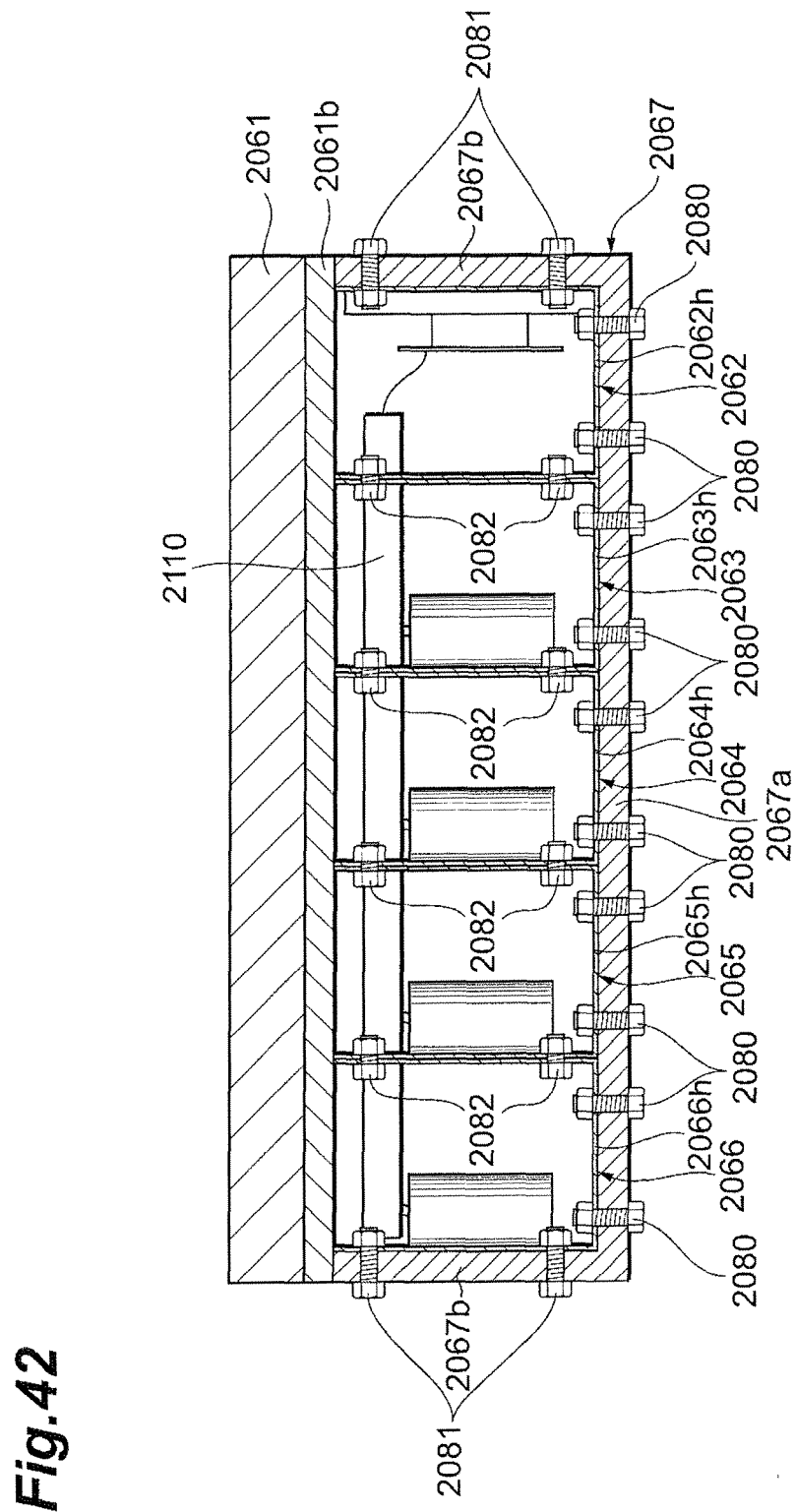
FIG. 42 is a cross-sectional view taken along the line VII-VII of the servo control unit 2060 shown in FIG. 41.

FIG. 41 is a plan cross-sectional view illustrating the servo control unit 2060. Furthermore, FIG. 42 is a cross-sectional view taken along the line VII-VII of the servo control unit 2060 shown in FIG. 41. Furthermore, in FIGS. 41 and 42, the heat sink 2068 shown in FIG. 40 is omitted.

The step-up/step-down converter unit 2062 has a configuration in which an electronic component such as an IPM and a reactor constituting the step-up/step-down converter is accommodated in a casing 2062h having a substantially rectangular external shape, and includes electrical input and output terminals. The battery 2019 (refer to FIG. 39) is connected to the output terminal of the step-up/step-down converter unit 2062, and the step-up/step-down converter unit 2062 controls the charging and discharging of the battery 2019.

The inverter units 2063 to 2066 have a configuration in which an electronic component such as an IPM and a smoothing capacitor constituting the inverter circuits 2018A and 2020A to 2020C is accommodated in the casings 2063h to 2066h having a substantially rectangular external shape, and each includes electrical input and output terminals. The output terminals of the inverter units 2063 to 2066 are respectively connected to the electrical generator 2012, the rotation motor 2021, the lifting magnet 2007, and the pump motor 2071. The AC motor is AC-driven by the PWM control signal output from the inverter units 2063 to 2066.

The bottom surfaces of the casings 2062h to 2066h of the units 2062 to 2066 are detachably fixed to the bottom plate 2067a of the pedestal 2067 by a fastening tool such as a bolt 2080. Furthermore, the side surfaces of the casings 2062h and 2066h of the units 2062 and 2066 located at both ends of the arrangement direction of the units 2062 to 2066 are detachably fixed to the side plates 2067b of the pedestal 2067 by a fastening tool 2081 including a bolt and a nut. Furthermore, the casings of the adjacent units of the units 2062 to 2066 are detachably fixed to each other by a fastening tool 2082 including a bolt and a nut. Then, the upper surfaces (that is, the surfaces facing the control unit 2061) of the casings 2062h to 2066h of the units 2062 to 2066 are opened to facilitate the access to the fastening tools 2081 and 2082, and the openings are closed by the control unit bottom plate 2061b.

Furthermore, the servo control unit 2060 further includes the DC bus 2110 (refer to FIG. 39). The DC bus 2110 is configured as a busbar which is a thin and elongated metal sheet, and is provided to cross the units 2062 to 2066 along the arrangement direction (the predetermined direction) of the units 2062 to 2066. The input terminals of the inverter units 2063 to 2066 and the input terminal of the step-up/step-down converter unit 2062 are respectively connected to the DC bus 2110, and the DC power is received and transmitted between the units 2062 to 2066 via the DC bus 2110. The step-up/step-down converter unit 2062 controls the voltage of the DC bus 2110 to be constant by controlling the charging and discharging of the battery 2019.

Furthermore, each of the units 2062 to 2066 includes therein a plurality of CPUs 2605a to 2605e. The plurality of CPUs 2605a to 2605e controls on/off of the transistor included in the inverter circuit of the corresponding unit among the units 2062 to 2066 when receiving an instruction from an upper-level CPU (not shown) disposed away therefrom.

Next, the internal configuration of each of the units 2062 to 2066 and the connection structure between each of the units 2062 to 2066 and the DC bus 2110 will be described in detail.

Figure 43:
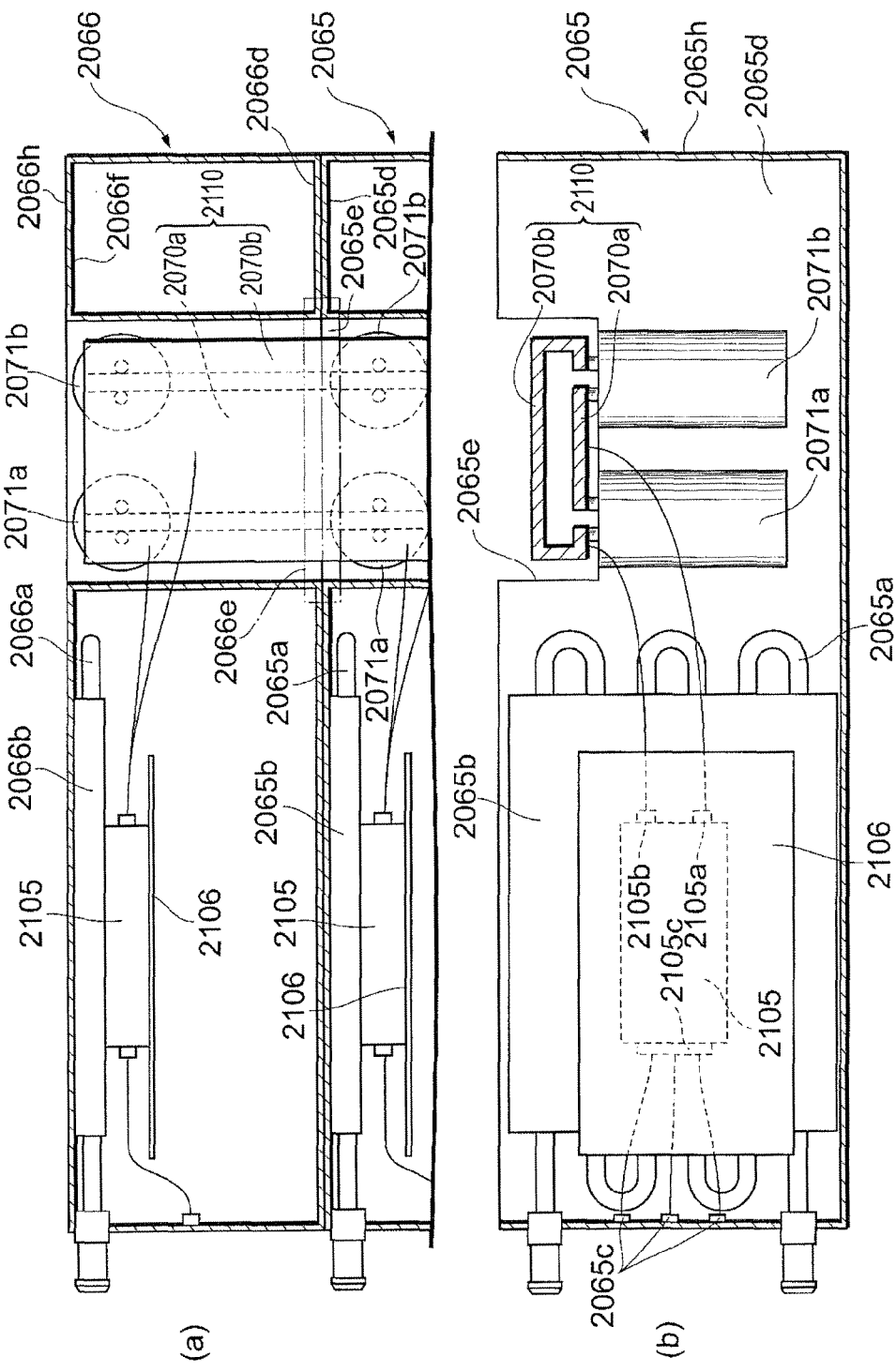
FIG. 43A is a plan view illustrating an internal configuration of a part of an inverter unit 2065 and an inverter unit 2066.
FIG. 43B is a side view illustrating an internal configuration of the inverter unit 2065.

FIG. 43A is a plan view illustrating an internal configuration of apart of the inverter unit 2065 and the inverter unit 2066. Furthermore, FIG. 43B is a side view illustrating an internal configuration of the inverter unit 2065. Furthermore, in the drawings, the ceiling plate or the side plate of the casing is detached so that the internal configurations of the inverter units 2065 and 2066 may be understood. Furthermore, the internal configurations of the inverter units 2063 and 2064 are the same as those of the inverter units 2065 and 2066 shown in FIG. 41 except for the configuration of the inverter circuit built therein.

The inverter units 2065 and 2066 include therein an IPM 2105 obtained by assembling the transistor constituting the inverter circuit and cooling pipes 2065a and 2066a. The IPM 2105 is mounted on the interconnection substrate 2106. The cooling pipes 2065a and 2066a are disposed in a two-dimensional shape along the inner surfaces of the inverter units 2065 and 2066. Specifically, the cooling pipes 2065a and 2066a are accommodated in metallic containers 2065b and 2066b with a rectangular cross-section while being bent several times and made as long as possible inside the inverter units 2065 and 2066, and are disposed to contact the inner surfaces of the metallic containers 2065b and 2066b. As shown in FIG. 43A, the IPM 2105 is disposed to contact the outer surfaces of the metallic containers 2065b and 2066b, and the metallic containers 2065b and 2066b transfers the heat generated from the IPM 2105 to the cooling pipes 2065a and 2066a.

Rectangular notch portions 2065e and 2066e are provided at the upper edges of the side plates 2065d and 2066d of the inverter units 2065 and 2066 of the casings 2065h and 2066 so as to dispose the DC bus 2110 therein. Smoothing capacitors 2071a and 2071b are disposed to contact the inner surfaces of the side plates 2065d and 2066d of the casings 2065h and 2066h, and the positive and negative terminals of the smoothing capacitor 2071a and 2071b protrude upward from the height of the rectangular notch portion 2065e at the upper edges of the side plates of the casings 2065h and 2066h. Furthermore, the casings 2063h and 2064h of the inverter units 2063 and 2064 have the same structure, and the DC bus 2110 is disposed to cross the inverter units 2063 to 2066.

A rectangular notch portion (not shown) is provided at the upper edge of the side plate adjacent to the peripheral unit in other invert units 2063 and 2064 so as to dispose the DC bus 2110 therein. In the inner surface of the side plate adjacent to the inverter unit 2065 in the inverter unit 2064 and the inner surface of the side plate adjacent to the inverter unit 2064 in the inverter unit 2063, the smoothing capacitors are disposed to contact the inner surfaces as in the inverter units 2065 and 2066. In this manner, the DC bus 211C is disposed to penetrate the inverter units 2063 to 2065 interposed between the respective units. Furthermore, a sealed state is formed inside the metallic container and the rectangular notch portion of each of the units by the control unit bottom plate 2061b as an upper cover. Accordingly, waterproofing and dustproofing of each inverter are realized.

The DC bus 2110 includes a plate-like positive busbar 2070a and a plate-like negative busbar 2070b. The positive busbar 2070a has a substantially rectangular shape which is thin and elongated in the horizontal direction (a predetermined direction). The negative busbar 2070b is disposed above the positive busbar 2070a without contacting the positive busbar 2070a, has a shape surrounding the upper surface side of the positive busbar 2070a, and is formed to cover the positive busbar 2070a. Here, the positive and negative sides may be disposed reversely. The positive busbar 2070a and the negative busbar 2070b are detachably fixed by a fastening tool such as a bolt so as to be directly connected to the terminals of the smoothing capacitors 2071a and 2071b of the inverter units 2065 and 2066 and the smoothing capacitors of the inverter units 2063 and 2064.

The positive busbar 2070a is fixed by a bolt so as to be directly connected to the positive terminals of the smoothing capacitors 2071a and 2071b of the inverter units 2065 and 2066 and the smoothing capacitors of the inverter units 2063 and 2064. Furthermore, the negative busbar 2070b is fixed by a bolt so as to be directly connected to the negative terminals of the smoothing capacitors 2071a and 2071b of the inverter units 2065 and 2066 and the smoothing capacitors of the inverter units 2063 and 2064. In this manner, the DC bus 2110 is fixed to the smoothing capacitors while not contacting the metallic containers of the inverter units 2063 to 2066.

The positive busbar 2070a and the positive terminal (the input terminal) 2105a of the IPM 2105 are connected to each other by an interconnection, and the negative terminal (the input terminal) 2105b and the negative busbar 2070b are connected to each other by an interconnection. Furthermore, each of three-phase output terminals (the output terminals) 2105c of the inverter circuit 2018A is connected to the terminal block 2066c by an interconnection. The terminal block 2066c is used for the connection of the electrical generator 2012.

Figure 44:
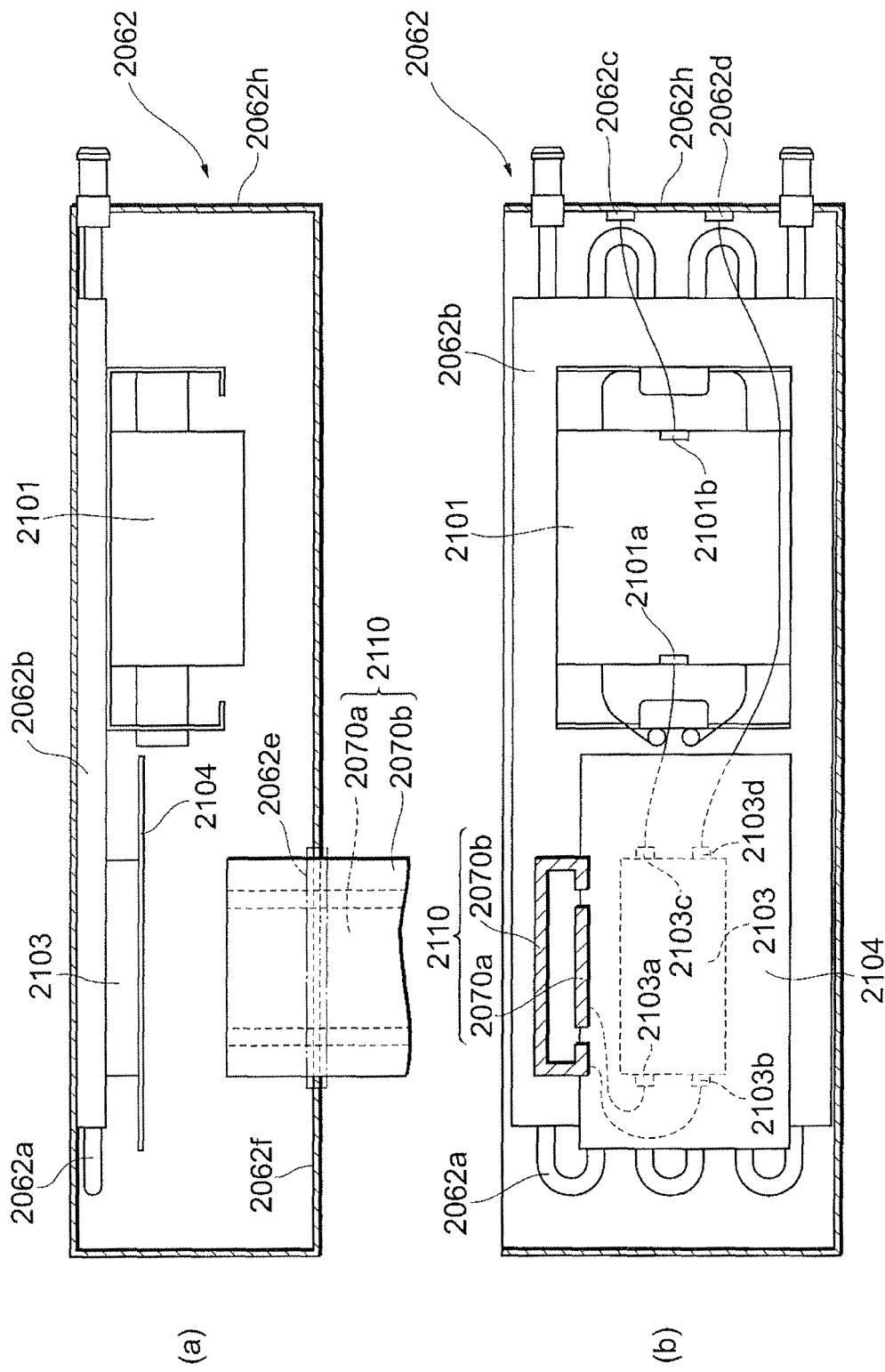
FIG. 44A is a plan view illustrating an internal configuration of a step-up/step-down converter unit 2062.
FIG. 44B is a side view illustrating an internal configuration of the step-up/step-down converter unit 2062.

FIG. 44A is a plan view illustrating an internal configuration of the step-up/step-down converter unit 2062. Furthermore, FIG. 44B is a side view illustrating an internal configuration of the step-up/step-down converter unit 2062. Furthermore, in FIG. 44B, the side plate of the casing 2062h is detached so that the internal configuration of the step-up/step-down converter unit 2062 may be understood.

The step-up/step-down converter unit 2062 includes therein an IPM 2103 obtained by assembling the transistors 2100B and 2100C constituting the step-up/step-down converter 2100, the reactor 2101, and the cooling pipe 2062a. The IPM 2103 is mounted on the interconnection substrate 2104. The cooling pipe 2062a is disposed in a two-dimensional shape along the side surface of the step-up/step-down converter unit 2062. Specifically, the cooling pipe 2062a is accommodated in a metallic container 2062b with a rectangular cross-section while being bent several times and made as long as possible inside the step-up/step-down converter unit 2062, and is disposed to contact the inner surface of the metallic container 2062b. As shown in FIG. 44A, the reactor 2101 and the IPM 2103 are disposed to contact the outer surface of the metallic container 2062b, and the metallic container 2062b transfers the heat generated from the reactor 2101 and the IPM 2103 to the cooling pipe 2062a. Accordingly, the reactor 2101 and the IPM 2103 are cooled.

A rectangular notch portion 2062e is provided at the upper edge of the side plate of the casing 2062h of the step-up/step-down converter unit 2062 so as to dispose the DC bus 2110 therein. A sealed state is formed inside the metallic container of the step-up/step-down converter unit 2062 and the rectangular notch portion 2062e by the control unit bottom plate as an upper cover. Accordingly, waterproofing and dust proofing of the step-up/step-down converter are realized. The positive terminal (the input terminal) 2103a of the IPM 2103 and the positive busbar 2070a are connected to each other by an interconnection, and the negative terminal (the input terminal) 2103b and the negative busbar 2070b are connected to each other by an interconnection. Furthermore, a terminal 2103c of the IPM 2103 is connected to a terminal 2101a of the reactor 2101 by an interconnection, a terminal 2101b of the reactor 2101 is connected to a terminal block 2062c by an interconnection, and a terminal 2103d of the IPM 2103 is connected to a terminal block 2062d by an interconnection. The terminal blocks 2062c and 2062d are used for the connection of the battery 2019.

Figure 45:
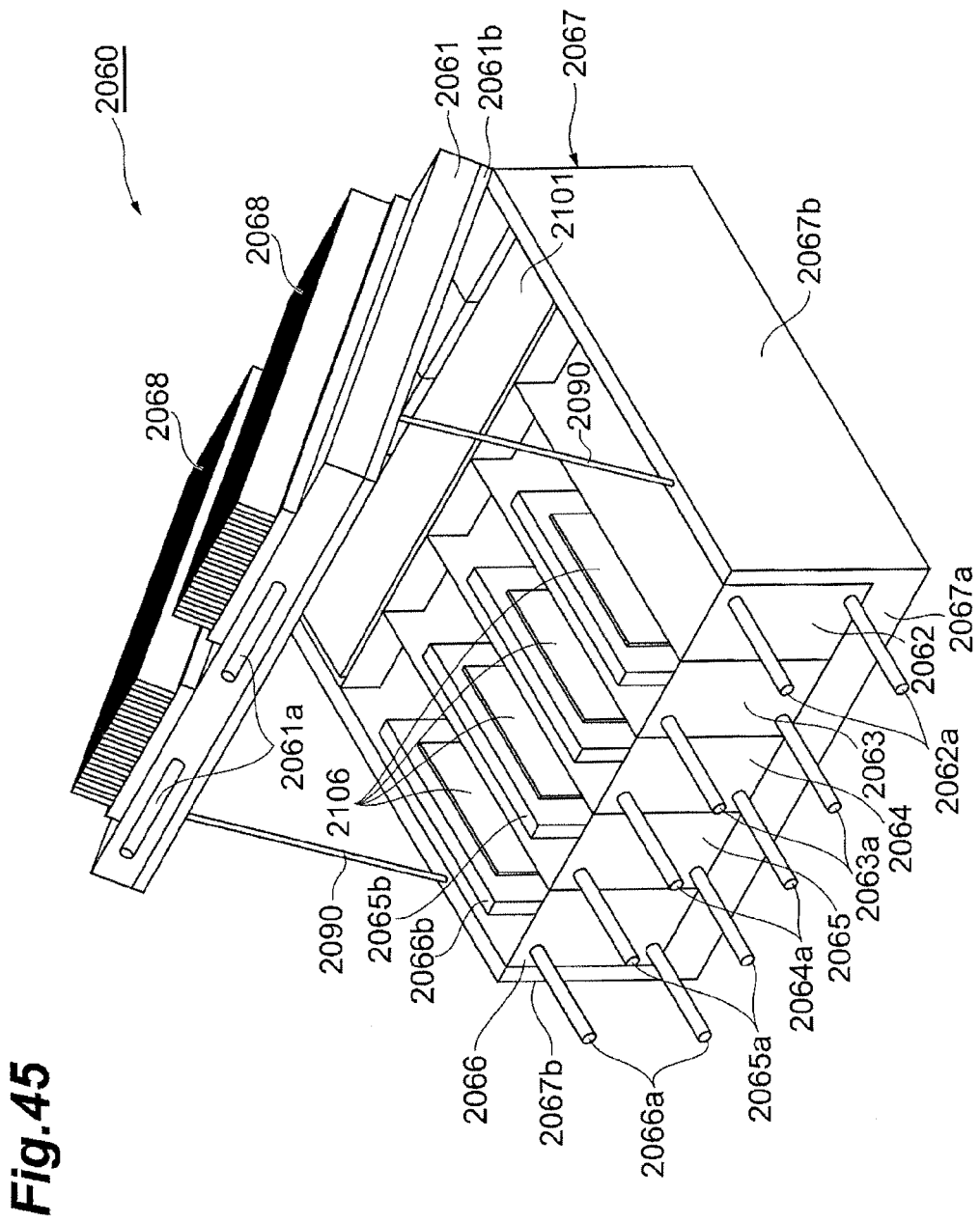
FIG. 45 is a perspective view illustrating a state where a control unit 2061 of the servo control unit 2060 is opened.

Here, FIG. 45 is a perspective view illustrating a state where the control unit 2061 of the servo control unit 2060 is opened. As shown in FIG. 45, the control unit 2061 is attached to be rotatable about a support shaft provided along a predetermined direction at the rear ends of the units 2062 to 2066 in the direction (the length direction of each of the units 2062 to 2066 in the embodiment) intersecting the arrangement direction (the predetermined direction) of the units 2062 to 2066. Specifically, a part of the pedestal 2067 is disposed to contact the rear surface of each of the casings 2062h to 2066h of the units 2062 to 2066 (for example, refer to FIG. 41), and the control unit bottom plate 2061b is attached to the pedestal 2067 via a hinge (a support shaft) fixed to the portion of the pedestal 2067. Since the control unit 2061 is fixed to the control unit bottom plate 2061b, the control unit 2061 is rotated (opened and closed) about the support shaft together with the control unit bottom plate 2061b. With such a mechanism, the openings of the casings 2062h to 2066h of the units 2062 to 2066 are exposed to the outside, and access to the fastening tools 2081 and 2062 (refer to FIG. 41) becomes possible. In this mariner, the interior of each of the units 2062 to 2066 becomes a sealed space when the control unit 2061 is placed thereon during the operation of the lifting magnet vehicle 2001, and the sealed space is opened during the maintenance of the servo control unit 2060.

Furthermore, the servo control unit 2060 further includes a support tool 2090 which supports the control unit 2061 while the control unit 2061 is opened about the support shaft with respect to the units 2062 to 2066. The support tool 2090 is configured as, for example, a metallic rod-like member, where one end thereof engages with the vicinity of the side plate 2067b the pedestal 2067, and the other end thereof engages with the control unit bottom plate 2061b. The support tool 2090 is accommodated in any one position of the servo control unit 206C while being closed by the control unit 2061.

Furthermore, in the above description, an example has been described in which the control unit bottom plate 2061b is used as the upper cover for the inverter units 2063 to 2066 or the step-up/step-down converter unit 2062. However, the upper cover for the inverter units 2063 to 2066 or the step-up/step-down converter unit 2062 may not be a member constituting the control unit 2061, but may be any member example, a steel plate) as long as the member has a waterproof function. Furthermore, instead of the configuration in which the inverter units 2063 to 2066 or the step-up/step-down converter unit 2062 is blocked by the member common to the control unit bottom plate 2061b, they may be blocked by the members respectively provided in the units 2062 to 2066.

Here, the DC bus voltage lowering mode of the controller 2030 will be described further. As described above, the DC bus voltage lowering mode indicates an operation mode for decreasing the voltage of the DC bus 2110 while the operation of the hybrid type construction machine 1 is stopped. In this operation mode, the inverter circuits 2018A, 2020A and 2020B and the step-up/step-down converter 2100 are all stopped, the switch provided between the step-up/step-down converter 2100 and the battery 2019 enters a disconnection state, and the inverter circuit 2020C is driven to consume the electricity in the pump motor 2071, thereby decreasing the voltage of the DC bus 2110.

Figure 46:
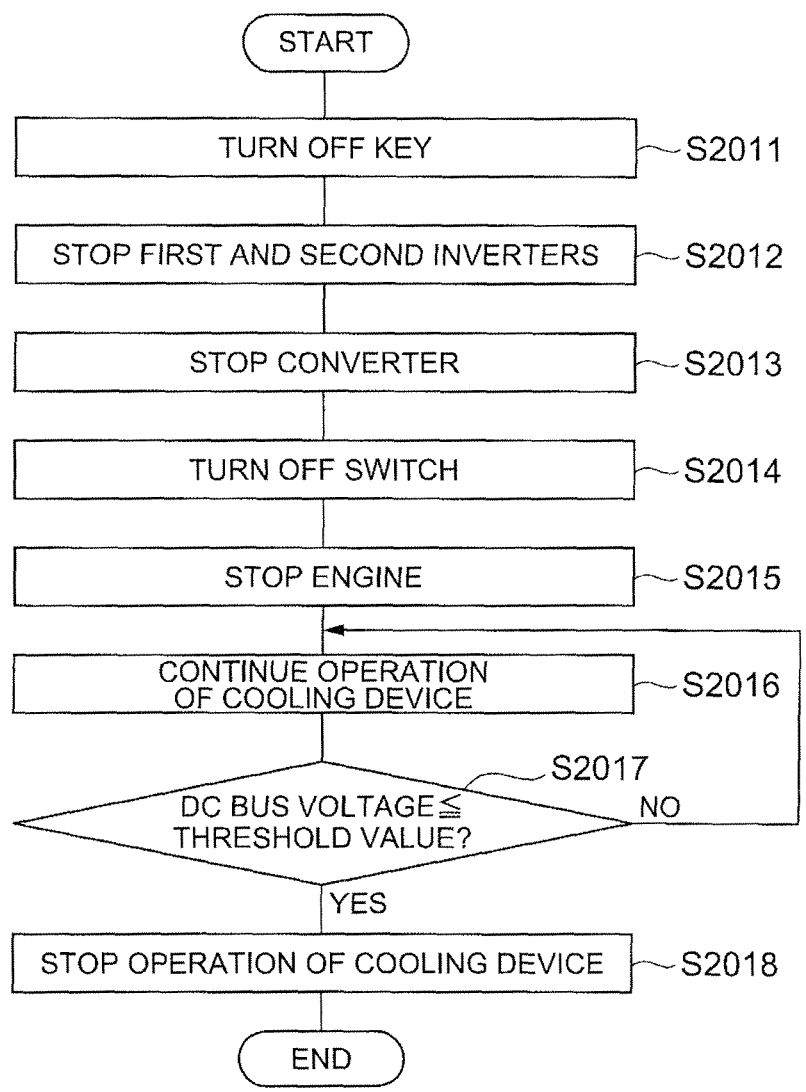
FIG. 46 is a flowchart illustrating an operation of the lifting magnet vehicle 2001 in the DC bus voltage lowering mode.

FIG. 46 is a flowchart illustrating an operation of the lifting magnet vehicle 2001 in the DC bus voltage lowering mode. First, the ignition key is operated by the operator in order to stop the operation of the lifting magnet vehicle 2001 (step S2011). In the embodiment, the controller 2030 starts the DC bus voltage lowering mode whenever the operation of the lifting magnet vehicle 2001 is stopped in this manner. That is, the controller 2030 stops the driving of the inverter circuits 2018A, 2020A, and 2020B when receiving the operation of the key (step S2012). Accordingly, the supply of the electricity to the electrical generator 2012, the rotation motor 2021, and the lifting magnet 2007 is stopped. Next, the controller 2030 stops the driving of the step-up/step-down converter 2100 (step S2013). Then, the controller 203C allows the switch between the step-up/step-down converter 2100 and the battery 2019 to be in a disconnection state (step S2014). Accordingly, the DC bus 2110 and the battery 2019 are electrically separated from each other. Then, the controller 2030 instructs the ECU or the like of the engine 2011 to stop the engine 2011 (step S2015).

At this time, the inverter circuit 2020C continuously drives the pump motor 2071 as the cooling motor, and the cooling liquid continuously circulates inside the cooling liquid circulating system by the pump motor 2071. The controller 2030 continuously operates the pump motor 2071 by continuously driving the inverter circuit 2020C (step S2016). The inverter circuit 2020C is continuously driven until the voltage of the DC bus 2110 detected by the same voltage sensor as the voltage sensor 110b shown in FIG. 3 becomes a predetermined threshold value or less (step S2017; No).

Then, when the voltage of the DC bus 2110 becomes a predetermined threshold value or less (step S2017; Yes), the controller 2030 stops the driving of the inverter circuit 2020C (step S2018). Accordingly, the operation of the pump motor 2071 is stopped, so that the DC bus voltage lowering mode is finished, and the operation of the lifting magnet vehicle 2001 is completely stopped.

Figure 47:
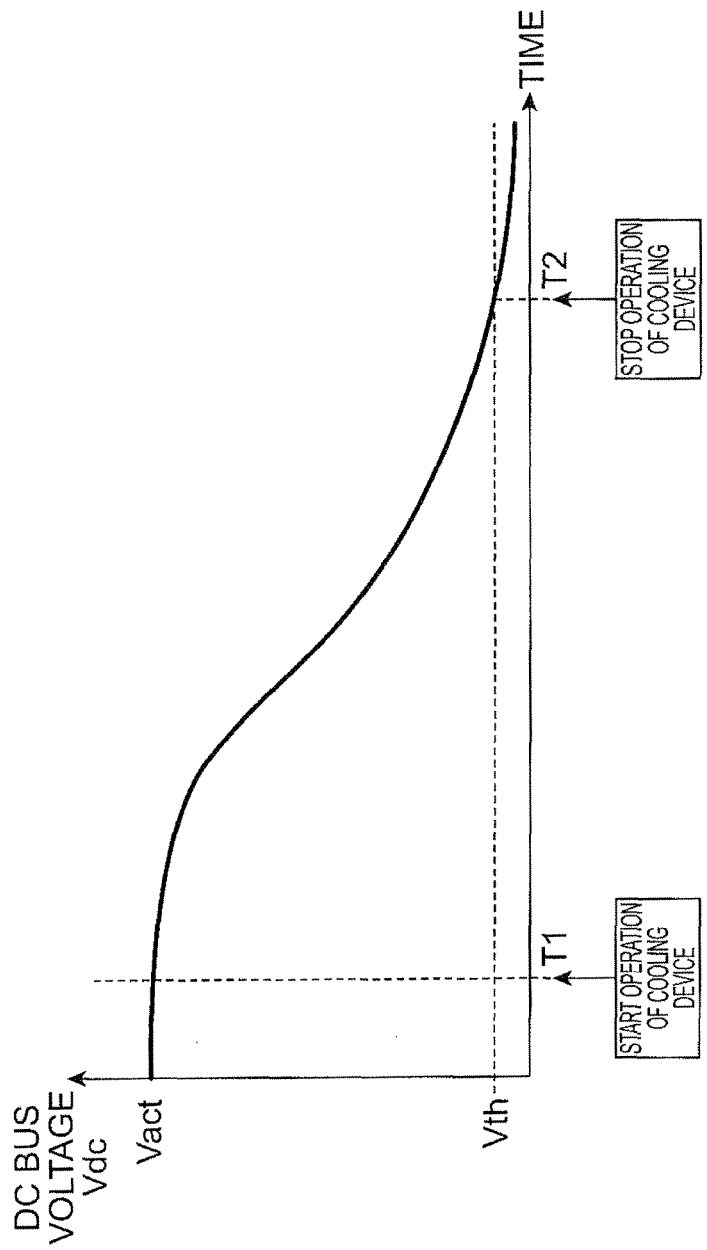
FIG. 47 is a graph illustrating an example of a transition of a voltage of the DC bus 2110 in the DC bus voltage lowering mode.

FIG. 47 is a graph illustrating an example of a transition of the voltage of the DC bus 2110 in the DC bus voltage lowering mode. When the switch enters a disconnection state while the pump motor 2071 is continuously driven (at the timing T1 of the drawing), the voltage Vdc of the DC bus 2110 gradually decreases from the preceding voltage Vact. The decreasing speed is dependent on the consumption electricity of the pump motor 2071. Then, when the voltage Vdc of the DC bus 2110 becomes less than a predetermined threshold value Vth (at the timing T2 of the drawing), the operation of the pump motor 2071 is stopped, so that the decreasing speed of the voltage Vdc becomes smooth.

The effect obtained by the lifting magnet vehicle 2001 of the embodiment will be described. As described above, the lifting magnet vehicle 2001 includes the pump 2072 circulating the cooling liquid for cooling the inverter units 2063 to 2066, the step-up/step-down converter unit 2062, or the control unit 2060. Then, when the voltage of the DC bus 2110 is decreased according to the necessity of maintenance, the voltage of the DC bus 2110 is consumed in a manner such that the pump motor 2071 driving the pump 2072 is driven by the controller 2030 by using the voltage of the DC bus 2110. Originally, the pump 2072 is mounted on the lifting magnet vehicle 2001 to cool the inverter units 2063 to 2066 or the step-up/step-down converter unit 2062. Therefore, according to this method, a new component such as a resistor or a switch may not be further provided only for the DC bus voltage lowering mode. Therefore, according to the lifting magnet vehicle 2001 of the embodiment, the voltage of the DC bus 2110 may be decreased with a configuration suppressing a degradation in reliability.

Furthermore, the pump motor 2071 is different from, for example, the electrical generator 2012 driving the hydraulic pump or the working motor such as the rotation motor 2021 driving the working component such as the rotation body 2004. Even when the pump motor 2071 is driven, the cooling liquid just circulates inside the pipe without applying a driving force to the movable portion, the working component, or the like. Therefore, according to the lifting magnet vehicle 2001 of the embodiment, since the voltage of the DC bus 2110 may be decreased without applying a driving force to a work component or the like, the voltage of the DC bus 2110 may be safely decreased.

Next, the lifting magnet vehicle 2001 of the embodiment, and particularly, the effect of the servo control unit 2060 will be described. In the servo control unit 2060, the casings 2062h to 2066h are provided for the driver circuit such as the step-up/step-down converter 2100 performing the charging and discharging of the battery 2019 or the inverter circuit (any one of the inverter circuits 2018A, 2020A to 2020C) driving one AC motor among the plurality of AC motors (the electrical generator 2012, the rotation motor 2021, the pump motor 2071, and the like), and the circuits and the casings 2062h to 2066h are respectively independently provided in the step-up/step-down converter unit 2062 and the inverter units 2063 to 2066. Then, the casings 2062h to 2066h of the units 2062 to 2066 are fixed to be individually attached to or detached from the servo control unit 2060. Accordingly, since each of the units 2062 to 2066 may be easily detached from the servo control unit 2060 in the construction site or the like, a high maintenance property may be ensured when an abnormality is generated from any one of the circuits.

Furthermore, in the servo control unit 2060 of the embodiment, the units 2062 to 2066 are arranged in a predetermined direction, and the casings 2062h to 2066h are fixed to each other by the fastening tool 2062. With this configuration, the entire structural strength of the servo control unit 2060 may be effectively improved, and a high vibration resistance or impact resistance may be ensured.

As described above, according to the lifting magnet vehicle 2001 of the embodiment, a high vibration resistance or impact resistance and a high maintenance property of the servo control unit 2060 may be simultaneously obtained.

Furthermore, as in the embodiment, when the servo control unit 2060 includes the control unit 2061 having the controller 2030 controlling the respective circuits of the units 2062 to 2066, and the control unit 2061 is placed on the plurality of units 2062 to 2066, it is desirable that the control unit 2061 is attached to be rotatable (openable and closeable) about the support shaft provided at one end of the units 2062 to 2066 in a predetermined direction. Accordingly, access to the interior of the units 2062 to 2066 becomes easier, and a higher maintenance property is ensured. Furthermore, in this case, the servo control unit 2060 further includes the support tool 2090 which supports the control unit 2061 while the control unit 2061 is opened about the support shaft with respect to the units 2062 to 2066. Accordingly, the work of detaching the units 2062 to 2066 may be more easily performed, and the maintenance property may be further improved.

Furthermore, as in the embodiment, when the control unit 2061 is rotatably placed on the plurality of units 2062 to 2066, it is desirable that the surfaces of the casings 2062h to 2066h of the units 2062 to 2066 facing the control unit 2061 are opened. Accordingly, the access to the fastening tool 2082 fixing the casings 2062h to 2066h of the units 2062 to 2066 to each other or the fastening tools 2080 and 2081 fixing the casings 2062h to 2066h and the pedestal 2067 to each other may become easier, and the maintenance property may be further improved.

Furthermore, as in the embodiment, the servo control unit 2060 includes the pedestal 2067 having the bottom plate 2067a on which the units 2062 to 2066 are placed and the side plates 2067b interpose the units 2062 to 2066 therebetween in a predetermined direction. Here, it is desirable that the side plates 2067b of the pedestal 2067 are detachably fixed to the casings 2062h and 2066h of the units 2062 and 2066 located at both ends among the units 2062 to 2066 by the fastening tool 2081. Accordingly, the entire structural strength of the servo control unit 2060 may be further improved without degrading the maintenance property, and vibration resistance or impact resistance may be further improved.

Furthermore, in the lifting magnet vehicle 2001 of the embodiment, the input terminals of the step-up/step-down converter unit 2062 and the plurality of inverter units 2063 to 2066 are connected to the common DC bus 2110. For this reason, the space for the DC bus 2110 may be reduced, and the maintenance property may be further improved. Furthermore, since each of the positive busbar 2070a and the negative busbar 2070b constituting the DC bus 2110 is formed as a substantially rectangular metal sheet which is thin and elongated, the input terminals of the units 2062 to 2066 may be connected to each other with a short current path and a large cross-sectional area compared to the interconnection connection. Accordingly, the units 2062 to 2066 may be connected to each other at low resistance.

Furthermore, in the lifting magnet vehicle 2001 of the embodiment, since the DC bus (the busbar) 2110 is provided at the rectangular notched portion provided at the side plate adjacent to the peripheral unit in each of the units 2062 to 2066 along the arrangement direction of the units 2062 to 2066, the DC bus (the busbar) 2110 may be disposed in a reduced space.

Next, another example of the hybrid type construction machine according to the embodiment will be described. FIG.

Figure 48:
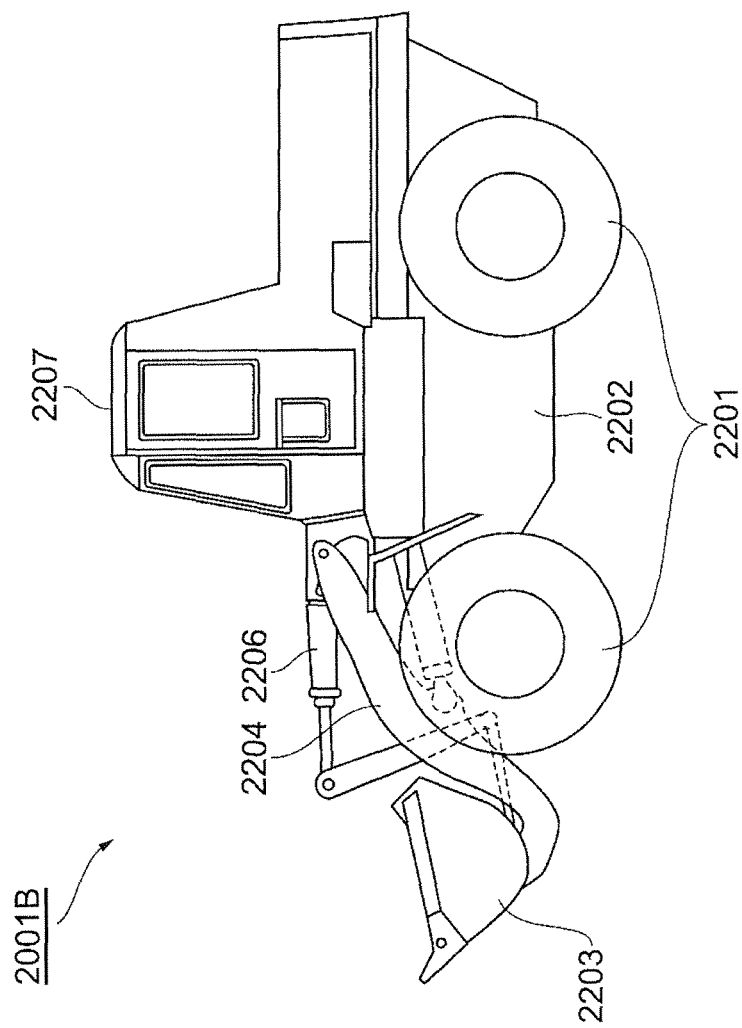
FIG. 48 is a side view illustrating an external shape of a wheel loader 2001B as another example of the hybrid type construction machine according to the third embodiment.

48 is a side view illustrating an external shape of a wheel leader 2001B as another example of the hybrid type construction machine according to the embodiment. As shown in FIG. 48, the wheel loader 2001E includes a wheel 2201 which is used for running on a flat road, a vehicle body 2202 which is supported by the axle of the wheel 2201, and a bucket 2203 which is disposed in front of the vehicle body 2202. The mechanism lifting the bucket 2203 includes a lift arm 2204 and a lift cylinder 2205, and the mechanism tilting the bucket 2203 backward or discharging soil includes a bucket cylinder 2206. The vehicle body 2202 is provided with an operation room 2207 which accommodates the operator operating the bucket 2203 or a power source such as an engine (not shown) generating a hydraulic pressure.

Figure 49:
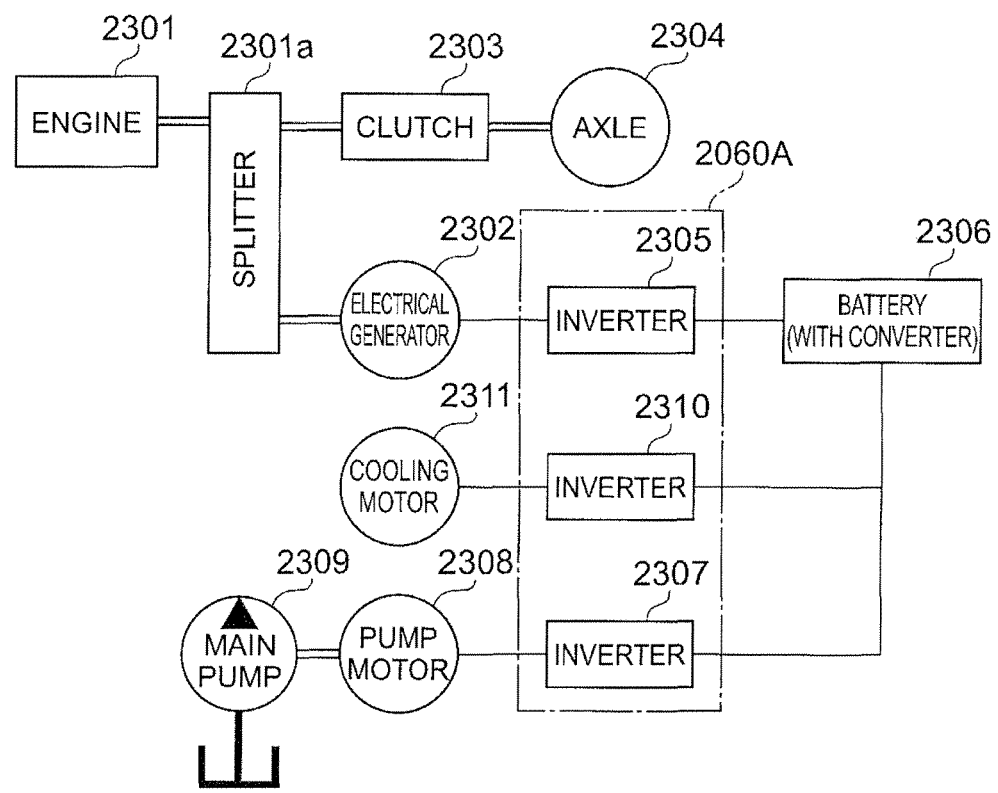
FIG. 49 is a block diagram illustrating an internal configuration such as an electric system or a hydraulic system of the wheel loader 2001B.

FIG. 49 is a block diagram illustrating an internal configuration such as an electric system or a hydraulic system of the wheel loader 2001B. Furthermore, in FIG. 49, the system mechanically transferring power is depicted by the double line, and the electrical system is depicted by the thin solid line.

As shown in FIG. 49, the wheel loader 2001B includes an engine 2301, and the rotary shaft of the engine 2301 is connected to an electrical generator 2302 and a clutch 2303 via a torque splitter 2301a. The clutch 2303 is connected to an axle 2304, and transfers the power of the engine 2301 to the axle 2304. The electrical generator 2302 assists the driving force of the engine 2301, and generates electricity by using the driving force of the engine 2301. The AC power generated by the electrical generator 2302 is converted into the DC power by the inverter circuit included in the inverter unit 2305, and is stored in a battery 2306 with the step-up/step-down converter.

Furthermore, the battery 2306 with the step-up/step-down converter is connected to a pump motor 2308 as an AC motor via another inverter circuit included in the inverter unit 2307. The inverter circuit of the inverter unit 2307 converts the DC power output from the battery 2306 into the AC power to drive the pump motor 2308. The rotary shaft of the pump motor 2308 is connected to a hydraulic pump 2309, and the hydraulic pressure generated from the hydraulic pump 2309 is supplied to the lift cylinder 2205 and the bucket cylinder 2206 (FIG. 49). Furthermore, the battery 2306 with the step-up/step-down converter is connected to a cooling motor 2311 as an AC motor via a still another inverter circuit included in the inverter unit 2310. The cooling motor 2311 drives a pump which supplies a cooling liquid to a water-cooling pipe (the pipes 2065a and 2066a shown in FIG. 43) provided in the inverter unit 2305 and 2307.

In this configuration, the inverter units 2305, 2307, and 2310 may constitute a servo control unit 2060A. The servo control unit 2060A has the same configuration as that of the above-described servo control unit 2060. That is, the inverter units 2305, 2307, and 2310 are arranged in a predetermined direction as in the units 2062 to 2066 shown in FIGS. 40 to 45, and the casings of the adjacent inverter units are detachably fixed to each other by a fastening tool. Furthermore, the servo control unit 2060A further includes a control unit (not shown) which has a control circuit controlling the respective inverter circuits of the inverter units 2305, 2307, and 2310. The control unit is placed on the inverter units 2305, 2307, and 2310, and is attached to be rotatable (openable and closeable) about the support axis. Furthermore, the servo control unit 2060A includes a member corresponding to the pedestal 2067 shown in FIG. 40 and a member corresponding to the support tool 2090 shown in FIG. 45.

The hybrid type construction machine of the invention is not limited to the above-described embodiments, but may be modified into various forms. For example, in the above-described embodiments, the lifting magnet vehicle and the wheel loader are exemplified as the hybrid type construction machine, but the invention may be applied to any hybrid type construction machine (for example, an excavator, a crane, or the like).

INDUSTRIAL APPLICABILITY

The invention may be used in, particularly, a working machine such as a hybrid type construction machine.

REFERENCE SIGNS LIST

1: HYBRID TYPE CONSTRUCTION MACHINE
1A: FORKLIFT
1B: BULLDOZER
2: RUNNING MECHANISM
2a: HYDRAULIC MOTOR
3: TURNING MECHANISM
4: TURNING BODY
5: BOOM
6: ARM
7: LIFTING MAGNET
8: BOOM CYLINDER
9: ARM CYLINDER
10: BUCKET CYLINDER
11: ENGINE
12: MOTOR GENERATOR (AC ELECTRIC MOTOR)
13: SPEED REDUCER
14: MAIN PUMP
15: PILOT PUMP
16: HIGH PRESSURE HYDRAULIC LINE
17: CONTROL VALVE
18A, 20A, 20B, 20C: INVERTER CIRCUIT
19: BATTERY
21: TURNING MOTOR
22: RESOLVER
23: MECHANICAL BRAKE
24: TURNING SPEED REDUCER
25: PILOT LINE
26: OPERATION DEVICE
27, 28: HYDRAULIC LINE
29: PRESSURE SENSOR
30: CONTROLLER
31: DRIVER SEAT
32: FORK
34, 38: WHEEL
35: LOADING-UNLOADING MOTOR
36: DRIVING MOTOR
40: IGNITION KEY
41: ELECTRICAL STORAGE MEANS
42 TO 44: INVERTER CIRCUIT
60: SERVO CONTROL UNIT
61: CONTROL UNIT BOTTOM PLATE
62 TO 65: INVERTER UNIT
62a TO 66a: COOLING PIPE
62b, 66b: METALLIC CONTAINER
66: STEP-UP/DOWN CONVERTER UNIT
67: PLATE-LIKE PEDESTAL
68: HEAT SINK
70: COOLING LIQUID CIRCULATING SYSTEM
75: AUXILIARY TANK
78: PUMP
79: PUMP MOTOR
100: STEP-UP/STEP-DOWN CONVERTER
101: REACTOR 103, 105: IPM
104, 106: INTERCONNECTION SUBSTRATE
107 TO 109: TEMPERATURE SENSOR
110: DC BUS
120: ELECTRICAL STORAGE MEANS
160: FIRST COOLING LIQUID CIRCULATING SYSTEM
170: SECOND COOLING LIQUID CIRCULATING SYSTEM
600: CONTROL UNIT
601: CASING
601a: CASING CONTAINER
601b: CASING COVER
602: CARD PLATE
603: HEAT SINK
603a, 603b: COOLING AREA
604: CONTROL CARD
605a, 605b, 615: CPU
606a, 606b: COOLING FAN
607: CONNECTOR
608: COOLING PIPE
609: POWER CARD
611: HEAT SINK
612: THERMAL CONDUCTIVE SHEET
613: CARD PLATE
614: THERMAL CONDUCTIVE PLATE
1001: EXCAVATOR
1030: CONTROLLER
1030A, 1030B, 1030C: INVERTER CONTROL UNIT
1030D: OVERALL CONTROL UNIT
1031, 1034: SUBTRACTOR
1032, 1035: CONTROL UNIT
1033: TORQUE RESTRICTING UNIT
1037: CURRENT CONVERTING UNIT
1038: TURNING OPERATION DETECTING UNIT
1040: SIGNAL GENERATING UNIT
1100: ELECTRICAL STORAGE MEANS
1101: BATTERY
1102: STEP-UP/DOWN CONVERTER
1300: BOOM REGENERATION GENERATOR
1310: HYDRAULIC MOTOR
2001: LIFTING MAGNET VEHICLE
2001B: WHEEL LOADER
2030: CONTROLLER
2060: SERVO CONTROL UNIT
2061: CONTROL UNIT
2062: STEP-UP/STEP-DOWN CONVERTER UNIT
2063 TO 2066: INVERTER UNIT
2068: HEAT SINK
2070a: POSITIVE BUSBAR
2070b: NEGATIVE BUSBAR
2080 TO 2082: FASTENING TOOL
2090: SUPPORT TOOL
G: LOADING

The invention claimed is:

1. A working machine comprising:
a running mechanism;
an engine configured to generate a hydraulic pressure;
an electrical generator configured to assist the engine;
a working motor which is driven by an operator's operation;
a DC busbar which is connected to the working motor via a first inverter circuit;
a storage battery which is connected to the DC busbar via a DC voltage converter and a switch;
a control unit which controls the first inverter circuit, the DC voltage converter, and the switch;
a second motor;
a rotation body which mounts the working motor, the engine, the electrical generator, and the second motor;
a boom and an arm which attach to the rotation body;
a hydraulic pump configured to be driven by the electrical generator or the engine; and
a motor driving circuit which is connected between the second motor and the DC busbar and is controlled by the control unit to drive the second motor,
wherein the control unit includes a busbar voltage lowering mode decreasing a voltage of the DC busbar when the operation of the working machine is stopped, and decreases the voltage of the DC busbar in a manner such that the motor driving circuit is operated after the switch enters a disconnection state to consume electricity in the second motor in the busbar voltage lowering mode.

2. The working machine according to claim 1, wherein the control unit stops the operation of the motor driving circuit when the voltage of the DC busbar becomes a predetermined value or less in the busbar voltage lowering mode.

3. The working machine according to claim 2,
wherein the control unit charges the storage battery by driving the DC voltage converter before the switch enters a disconnection state when the voltage of the DC busbar is higher than that of the storage battery upon starting the busbar voltage lowering mode.

4. The working machine according to claim 2,
wherein the control unit starts the busbar voltage lowering mode whenever the operation of the working machine is stopped.

5. The working machine according to claim 2,
wherein the control unit starts the busbar voltage lowering mode when there is an input from the operator while the operation of the working machine is stopped.

6. The working machine according to claim 1, wherein the control unit charges the storage battery by driving the DC voltage converter before the switch enters a disconnection state when the voltage of the DC busbar is higher than that of the storage battery upon starting the busbar voltage lowering mode.

7. The working machine according to claim 1, wherein the control unit starts the busbar voltage lowering mode whenever the operation of the working machine is stopped.

8. The working machine according to claim 1, wherein the control unit starts the busbar voltage lowering mode when there is an input from the operator while the operation of the working machine is stopped.

9. The working machine according to claim 1, further comprising:
an internal combustion engine;
a first cooling liquid circulating system which includes a first heat exchanger cooling the internal combustion engine; and
a second cooling liquid circulating system which includes a second heat exchanger provided separately from the first cooling liquid circulating system to cool the first inverter circuit and the DC voltage converter.

10. The working machine according to claim 9,
wherein the DC voltage converter includes a reactor, and
wherein the second cooling liquid circulating system cools the reactor.

11. The working machine according to claim 9, further comprising:
a plurality of driver units which includes an inverter unit having the first inverter circuit with an intelligent power module and a step-up/step-down converter unit having the DC voltage converter with an intelligent power module, wherein the plurality of driver units includes a second temperature sensor which is provided outside the intelligent power module to detect the temperature of the intelligent power module in addition to a first temperature sensor built in the intelligent power module, and wherein when a temperature detection result obtained by the second temperature sensor is higher than a predetermined first threshold value lower than a temperature where an overheat protection function of the intelligent power module is operated by the first temperature sensor, the control unit decreases a maximum driving current to the working motor when the driver unit is the inverter unit and decreases a maximum discharging current from the storage battery and/or a maximum charging current to the storage battery when the driver unit is the step-up/step-down converter unit.

12. The working machine according to claim 11,
wherein the DC voltage converter includes a reactor, and
wherein the second cooling liquid circulating system cools the reactor.

13. The working machine according to claim 1, further comprising:
a plurality of driver units which includes an inverter unit having the first inverter circuit with an intelligent power module and a step-up/step-down converter unit having the DC voltage converter with an intelligent power module, wherein the plurality of driver units includes a second temperature sensor which is provided outside the intelligent power module to detect the temperature of the intelligent power module in addition to a first temperature sensor built in the intelligent power module, and wherein when a temperature detection result obtained by the second temperature sensor is higher than a predetermined first threshold value lower than a temperature where an overheat protection function of the intelligent power module is operated by the first temperature sensor, the control unit decreases a maximum driving current to the working motor when the driver unit is the inverter unit and decreases a maximum discharging current from the storage battery and/or a maximum charging current to the storage battery when the driver unit is the step-up/step-down converter unit.

14. The working machine according to claim 13,
wherein the plurality of driver units each includes a casing accommodating the first inverter circuit or the DC voltage converter and is disposed in parallel along a predetermined direction, and
wherein the casings of the adjacent driver units are fixed to each other by a fastening tool.

15. The working machine according to claim 14,
wherein the control unit includes a casing which has a sealing structure, a plurality of CPUs which is provided inside the casing and controls the DC voltage converters and the inverter circuits of the plurality of driver units, and a cooling pipe which is thermally coupled to the plurality of CPUs and cools the plurality of CPUs by introducing a cooling liquid from the outside of the casing.

16. The working machine according to claim 14, further comprising:
a casing which fixes the inverter unit and the step-up/step-down converter unit, wherein an input terminal of the inverter unit and an input terminal of the step-up/step-down converter unit are connected to a DC bus formed as the DC busbar.

17. The working machine according to claim 16,
wherein the control unit includes a casing which has a sealing structure, a plurality of CPUs which is provided inside the casing and controls the DC voltage converters and the inverter circuits of the plurality of driver units, and a cooling pipe which is thermally coupled to the plurality of CPUs and cools the plurality of CPUs by introducing a cooling liquid from the outside of the casing.

18. The working machine according to claim 13,
wherein the control unit includes a casing which has a sealing structure, a plurality of CPUs which is provided inside the casing and controls the DC voltage converters and the inverter circuits of the plurality of driver units, and a cooling pipe which is thermally coupled to the plurality of CPUs and cools the plurality of CPUs by introducing a cooling liquid from the outside of the casing.

19. The working machine according to claim 13, further comprising:
a casing which fixes the inverter unit and the step-up/step-down converter unit,
wherein an input terminal of the inverter unit and an input terminal of the step-up/step-down converter unit are connected to a DC bus formed as the DC busbar.

20. The working machine according to claim 1, further comprising:
a cooling device which cools the first inverter circuit; and
a temperature detection means which detects the temperature of a refrigerant in the cooling device, wherein the first inverter circuit includes a mechanism which stops a supply of current for driving the working motor when detecting that the temperature of the first inverter circuit becomes a predetermined operation stop temperature or higher, wherein when the temperature of the refrigerant obtained from the temperature detection means is higher than a predetermined output suppressing temperature, the control unit compares the state with the case where the temperature of the refrigerant is the output suppressing temperature or lower and controls the first inverter circuit to decrease an upper limit value of a current supplied to the working motor, and wherein the output suppressing temperature is lower than the operation stop temperature.

21. A working machine comprising:
a working motor which is driven by an operator's operation;
a DC busbar which is connected to the working motor via a first inverter circuit;
a storage battery which is connected to the DC busbar via a DC voltage converter and a switch;
a control unit which controls the first inverter circuit, the DC voltage converter, and the switch;
a cooling motor which drives a cooling fan and/or a cooling liquid circulating pump used for cooling at least one of the first inverter circuit, the DC voltage converter, and the control unit; and
a cooling motor driving circuit which is connected between the cooling motor and the DC busbar and is controlled by the control unit to drive the cooling motor, wherein the control unit includes a busbar voltage lowering mode decreasing a voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode, and wherein the control unit charges the storage battery by driving the DC voltage converter before the switch enters a disconnection state when the voltage of the DC busbar is higher than that of the storage battery upon starting the busbar voltage lowering mode.

22. A working machine comprising:

a working motor which is driven by an operator's operation;

a DC busbar which is connected to the working motor via a first inverter circuit;

a storage battery which is connected to the DC busbar via a DC voltage converter and a switch;

a control unit which controls the first inverter circuit, the DC voltage converter, and the switch;

a cooling motor which drives a cooling fan and/or a cooling liquid circulating pump used for cooling at least one of the first inverter circuit, the DC voltage converter, and the control unit;

a cooling motor driving circuit which is connected between the cooling motor and the DC busbar and is controlled by the control unit to drive the cooling motor;

an internal combustion engine;

a first cooling liquid circulating system which includes a first heat exchanger cooling the internal combustion engine; and a second cooling liquid circulating system which includes a second heat exchanger provided separately from the first cooling liquid circulating system to cool the first inverter circuit and the DC voltage converter, wherein the control unit includes a busbar voltage lowering mode decreasing a voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode.

23. A working machine comprising:

a working motor which is driven by an operator's operation;

a DC busbar which is connected to the working motor via a first inverter circuit;

a storage battery which is connected to the DC busbar via a DC voltage converter and a switch;

a control unit which controls the first inverter circuit, the DC voltage converter, and the switch;

a cooling motor which drives a cooling fan and/or a cooling liquid circulating pump used for cooling at least one of the first inverter circuit, the DC voltage converter, and the control unit;

a cooling motor driving circuit which is connected between the cooling motor and the DC busbar and is controlled by the control unit to drive the cooling motor; and a plurality of driver units which includes an inverter unit having the first inverter circuit with an intelligent power module and a step-up/step-down converter unit having the DC voltage converter with an intelligent power module, wherein the plurality of driver units includes a second temperature sensor which is provided outside the intelligent power module to detect the temperature of the intelligent power module in addition to a first temperature sensor built in the intelligent power module, wherein when a temperature detection result obtained by the second temperature sensor is higher than a predetermined first threshold value lower than a temperature where an overheat protection function of the intelligent power module is operated by the first temperature sensor, the control unit decreases a maximum driving current to the working motor when the driver unit is the inverter unit and decreases a maximum discharging current from the storage battery and/or a maximum charging current to the storage battery when the driver unit is the step-up/step-down converter unit, and wherein the control unit includes a busbar voltage lowering mode decreasing a voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode.

24. A working machine comprising:

a working motor which is driven by an operator's operation;

a DC busbar which is connected to the working motor via a first inverter circuit;

a storage battery which is connected to the DC busbar via a DC voltage converter and a switch;

a control unit which controls the first inverter circuit, the DC voltage converter, and the switch;

a cooling motor which drives a cooling fan and/or a cooling liquid circulating pump used for cooling at least one of the first inverter circuit, the DC voltage converter, and the control unit; and a cooling motor driving circuit which is connected between the cooling motor and the DC busbar and is controlled by the control unit to drive the cooling motor, wherein the control unit includes a busbar voltage lowering mode decreasing a voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode, wherein the control unit stops the operation of the cooling motor driving circuit when the voltage of the DC busbar becomes a predetermined value or less in the busbar voltage lowering mode, and wherein the control unit charges the storage battery by driving the DC voltage converter before the switch enters a disconnection state when the voltage of the DC busbar is higher than that of the storage battery upon starting the busbar voltage lowering mode.

25. A working machine comprising:

a working motor which is driven by an operator's operation;

a DC busbar which is connected to the working motor via a first inverter circuit;

a storage battery which is connected to the DC busbar via a DC voltage converter and a switch;

a control unit which controls the first inverter circuit, the DC voltage converter, and the switch;

a cooling motor which drives a cooling fan and/or a cooling liquid circulating pump used for cooling at least one of the first inverter circuit, the DC voltage converter, and the control unit;

a cooling motor driving circuit which is connected between the cooling motor and the DC busbar and is controlled by the control unit to drive the cooling motor;

a cooling device which cools the first inverter circuit; and a temperature detection means which detects the temperature of a refrigerant in the cooling device, wherein the first inverter circuit includes a mechanism which stops a supply of current for driving the working motor when detecting that the temperature of the first inverter circuit becomes a predetermined operation stop temperature or higher, wherein when the temperature of the refrigerant obtained from the temperature detection means is higher than a predetermined output suppressing temperature, the control unit compares the state with the case where the temperature of the refrigerant is the output suppressing temperature or lower and controls the first inverter circuit to decrease an upper limit value of a current supplied to the working motor, wherein the output suppressing temperature is lower than the operation stop temperature, and wherein the control unit includes a busbar voltage lowering mode decreasing a voltage of the DC busbar when the operation of the working machine is stopped, and decreases the voltage of the DC busbar in a manner such that the cooling motor driving circuit is operated after the switch enters a disconnection state to consume electricity in the cooling motor in the busbar voltage lowering mode.

* * * * *